United States Patent [19]

Kilbane et al.

[11] 4,162,527
[45] Jul. 24, 1979

[54] NUMERICALLY CONTROLLED MACHINE TOOL SYSTEM WITH PROGRAMMABLE TOOL OFFSET

[75] Inventors: James C. Kilbane, Belmont; Samuel M. Hamill, III, Scituate, both of Mass.

[73] Assignee: Hamill Company, Inc., Norwell, Mass.

[21] Appl. No.: 820,230

[22] Filed: Jul. 29, 1977

[51] Int. Cl.$^2$ ..................... G06F 15/46; G05B 19/24
[52] U.S. Cl. ............................... 364/474; 364/107; 364/118
[58] Field of Search ............... 364/107, 118, 474; 318/572

[56] References Cited

U.S. PATENT DOCUMENTS

| | | | |
|---|---|---|---|
| 3,866,179 | 2/1975 | McGee et al. | 364/107 X |
| 3,878,983 | 4/1975 | Hamill et al. | 364/107 |
| 4,035,706 | 7/1977 | Cutler | 364/107 X |

Primary Examiner—Jerry Smith
Attorney, Agent, or Firm—Kenway & Jenney

[57] ABSTRACT

A numerically controlled machine tool system which is responsive to a succession of stored data sequences to control the position of a cutting element with respect to a workpiece affixed to a workpiece positioning table. Each data sequence is associated with a point on a desired workpiece contour and includes data representative of a desired offset path which is parallel to and offset from a direct path of a selected type which intersects that point. During the machining mode of operation, the system determines a path segment for the cutting element to follow in association with a selected current sequence. For the current sequence, the system addresses only sequences in a contiguous group of sequences that includes the current sequence, and that relates to an identified portion of the desired workpiece contour. The system considers that contiguous group of sequences as forming an endless loop wherein the last sequence of the group precedes the first sequence of the group. For a current sequence, the system looks ahead to the next subsequent sequence and looks behind to the next previous sequence, determines offset paths associated with those sequences (in accordance with the offset data stored in association with the respective sequences), identifies the point of intersection of those offset paths, and then controls the cutting element to this intersection point. This operation is repeated in the machining mode of operation for each sequence in succession as the respective ones of the sequences become the current sequence, thereby permitting automatic cutting element path control together with desired selection offset values for use with individual machining operations.

14 Claims, 6 Drawing Figures

NUMERICALLY CONTROLLED MACHINE TOOL SYSTEM WITH PROGRAMMABLE TOOL OFFSET

REFERENCE TO RELATED PATENT AND APPLICATIONS

The present application is related to U.S. Pat. No. 3,878,983 to Samuel M. Hamill III and James C. Kilbane, issued Apr. 22, 1975, and to U.S. Patent Application Ser. No. 652,143 of Samuel M. Hamill III, James C. Kilbane, filed Jan. 26, 1976 now U.S. Pat. No. 4,135,238, and U.S. Patent Application Ser. No. 688,891, of Samuel M. Hamill III, James C. Kilbane and Stanley F. Zamkow, filed May 21, 1976 and now U.S. Pat. No. 4,135,239. The above-referenced patent and application are incorporated by reference into the present application.

BACKGROUND OF THE INVENTION

This invention relates to numerically controlled machine tool systems, and more particularly, to numerically controlled machine tool systems having programmable tool offset.

Many machine tools, such as grinding machines and milling machines, include a workpiece positioning table and a rotating cutting element, with the cutting element having a cutting surface laterally disposed about the rotational axis of the cutting element. In operation, a workpiece is affixed to the positioning table. The machine tool controls the relative motion of the cutting element rotational axis with respect to the workpiece so that the cutting element is offset from a desired workpiece by the cutting element radius, establishing a contact point between the cutting surface and the desired contour. The motion of the cutting element is typically controlled so that the contact point lies in a plane perpendicular to the rotational axis of the cutting element. As the cutting element wears, its decrease in radius must be accommodated in order to maintain a contact point with the desired contour.

In addition to the effect of cutting element wear, various cutting elements exhibit differing cutting efficiencies, depending upon the cutting element material, the workpiece material, or the dynamics (such as direction-related efficiencies) of the cutting element driving servos. As a result of all of these factors, the establishing of control of the cutting element axis to achieve a desired workpiece contour is a complex problem.

A numerically controlled machine tool operator, or programmer, may work from a drawing of a part to be machined which defines edge points on a workpiece. Typically, the operator must generate data signals for the machine tool which define a desired path for the cutting element with respect to the workpiece so that the cutting surface of the cutting element includes a contact point in common with the desired workpiece contour at each of the points defined in the drawing, or other specification of the workpiece.

In one prior art approach to this programming procedure, the operator may calculate the location of points with respect to the workpiece which are offset from the desired workpiece contour by the current radius of the cutting element. By generating an appropriate number of these desired cutting element path points, and controlling the cutting element axis to follow that path, the workpiece may be machined to the desired contour. This approach requires substantial operator effort to work from the drawing and from the known cutting element radius to determine the precise points for that cutting element path.

In an alternative approach, a numerically controlled machine tool system may require the operator only to program in the coordinate values representative of selected points on the desired contour of the workpiece, together with a desired offset which the cutting element is to be displaced in a predetermined direction from the path defined by the programmed desired contour points. This approach is, of course, a much simpler task for the operator to perform compared with the previously mentioned approach wherein the operator must compute the actual offset path for the cutting element. In the latter approach, the machine tool system includes a computing apparatus which performs the necessary calculations to generate appropriate signals for directing the cutting element along the offset path. However, in this latter approach, the prior art systems are suitable only for providing a single offset value for complete programming machine tool operation. While this approach is effective for relatively short machining sequences and for sequences wherein the machine cutting is achieved with equal facility in different directions, there are substantial disadvantages in applications where it is desired to accomplish a series of different machining operations having different offset values.

In addition, many conventional machine tool systems are characterized by different efficiencies in different directions, for example, cutting along a first axis may be performed with one degree of efficiency while cutting along a second axis perpendicular to the first axis may be characterized by a somewhat different efficiency. In such cases, the prior art systems requiring a single offset value to be programmed for a set of operations are not suitable for these applications.

In some applications of machine tool systems, it is required to provide a milling or grinding operation along portions of a workpiece contour which may be characterized as locally convex, i.e. where interconnecting straight line segments for three successive points on the workpiece contour are defined by an angle exterior to the workpiece which is greater than 180 degrees. In some applications, the desired contour connecting three successive points $A_1$, $A_2$ and $A_3$ defining a locally convex contour is characterized by a piecewise continuous, or step, first derivative at point $A_2$ (for example, where the contour for $A_1$, $A_2$ and $A_3$ is piecewise linear, or where the contour is formed by two circular arcs of differing radius and intersecting at $A_2$, or where the contour is formed by a straight line segment and a circular arc intersecting at $A_2$). Using the conventional approach to perform such operations for points $A_1$, $A_2$ and $A_3$, the cutting element is controlled with respect to the workpiece so that the cutting element axis is directed along a first offset path substantially parallel to a first line segment joining points $A_1$ and $A_2$ (and which is offset from that line segment by the cutting element radius) to an intermediate point along that first path which is sufficiently beyond the point $A_2$ so that the cutting element axis may then be controlled to pass along a second offset path substantially parallel to a second line segment joining points $A_2$ and $A_3$ (and which is offset from that second line segment by the cutting element radius). With this approach, the line segments and corresponding offset paths may be either straight or curved.

In these cases, as the cutting element axis approaches the neighborhood of the intermediate point (corresponding to the intersection of the first and second offset paths), the cutting surface is separated from the desired workpiece contour (as defined by points $A_1$, $A_2$ and $A_3$) and thus the cutting element does not at all times maintain a contact point with the desired workpiece contour. As a result, in these applications, there is an inefficiency in time utilization in requiring the cutting element to travel while not maintaining a contact point with the workpiece.

A further disadvantage to this prior art technique arises when the cutting element is required to machine a workpiece at two points simultaneously, for example, when grinding a slot or groove. Where the desired slot or groove has a locally convex boundary that follows a curve having a piecewise continuous first derivative at one or more points, the above-noted approach requires that the cutting element cut a substantial amount of excess material from the side of the groove opposite to the locally convex portion while the cutting element is in the neighborhood of the intermediate point along the offset path. An alternative prior art approach to machining such a slot or groove is to program a circular motion for the cutting element axis at the locally convex portions. While this latter approach does reduce the requirement for the excess material cutting, the resultant groove has a smoothed contour at the step derivative points, rather than a sharp edge which may be achieved by the first noted approach of overshooting and then returning along a second line segment.

Accordingly, it is an object of the present invention to provide a numerically controlled machine tool system having a tool offset capability wherein selected points on a desired workpiece contour may be programmed for individually tailored offset characteristics.

A further object is to provide a numerically controlled machine tool system which may automatically accommodate programmed machining operations, with each machining operation having a characteristic tool offset.

Still another object is to provide a numerically controlled machine tool system which may accommodate sharp corner machining operations with minimum material cutting requirements.

SUMMARY OF THE INVENTION

Briefly, the present invention provides a numerically controlled machine tool system which controls the position of a cutting element with respect to a workpiece affixed to a workpiece positioning table. The relative position of the cutting element is controlled in response to a succession of stored data sequences. Each data sequence is associated with a point on a desired workpiece contour and includes data representative of a selected path type for the cutting element to approach the associated contour point, for example, straight line or circular. Each sequence further includes offset data representative of a desired offset path which is parallel to and offset from a direct path of the selected type which intersects that point. The offset data is representative of a magnitude and a direction for the offset of the offset path.

In one form of the invention, each sequence additionally includes data representative of the type of that sequence, with each sequence being either a start/stop type or an intermediate type. The start/stop type sequence denotes the first of a contiguous group of sequences where the associated spatial points of that group of sequences define a shape. The remaining sequences in that contiguous group are intermediate type sequences. The associated points of the workpiece contour associated with the contiguous group define a shape, with the shape being a closed shape when the points associated with the first and last sequences in the group are identical, and the shape being an open shape otherwise.

In this form of the invention, each of the sequences may be successively selected as a current sequence during a run or machining mode of operation. During the machining mode of operation, the system determines a path segment for the cutting element to follow in association with the current sequence. For the current sequence, the system effectively considers only sequences in the contiguous group that includes the current sequence, and considers those sequences as forming an endless loop wherein the last sequence of the group precedes the start/stop sequence of the group. For a current sequence, the system effectively looks ahead to the next subsequent sequence (i.e. following the current sequence in the contiguous group) and looks behind to the next previous sequence (i.e. preceding the current sequence in the contiguous group), determines offset paths associated with those sequences (in accordance with the offset data stored in association with the respective sequence), identifies the point of intersection of those offset paths, and then controls the cutting element to this intersection point. This operation is repeated in the machining mode of operation for each sequence in succession as the respective ones of the sequences become the current sequence, thereby permitting automatic cutting element path control together with desired selection offset values for use with individual machining operations.

In accordance with another aspect of the invention, a machine tool system may control a cutting element with respect to a workpiece in the manner maintaining a contact point on a locally convex portion of a desired workpiece contour at all times, even when the desired contour is characterized by a piece-wise continuous first derivative. To perform this operation, the system requires a succession of four data sequences associated with three successive points ($A_1$, $A_2$ and $A_3$, respectively) which define a locally convex portion of the desired contour. The four data sequences include coordinate data representative of the spatial points $A_1$, $A_2$, $A_2$ and $A_3$, respectively, offset data representative of the radius of the cutting element and an offset direction, path data for the third of the four data sequences which defines a circular path having a center at point $A_2$ and a zero radius, and path data for the first, second and fourth of the four data sequences defining either a straight line or circular path.

In this form of the invention, each of the for data sequences may be successively selected as a current sequence during the machining mode. In response to the selection of the first sequence as the current sequence, the system positions the cutting element axis to a first point $I_1$ lying along a first offset path which is parallel to a line segment connecting the points $A_1$ and $A_2$, and offset from that line segment by the radius of the cutting element. In response to the selection of the second sequence as the current sequence, the system controls the cutting element axis to pass along the first offset path until reaching the intersection point $I_2$ of that first offset path and a line segment extending from $A_2$ and which is perpendicular to the line segment connecting points $A_1$ and $A_2$ at point $A_2$.

In response to the selection of the third sequence as current sequence, the cutting element contact point is maintained at point $A_2$ and the cutting element is effectively rotated at about that point so that its axis passes from point $I_2$ to a point $I_3$ which is at the intersection of a second offset path (which is parallel to a line segment connecting the points $A_2$ and $A_3$ and offset from that line segment by the radius of the cutting element) and a line segment extending from $A_2$ which is perpendicular to the line segment connecting points $A_2$ and $A_3$ at point $A_2$. In response to the fourth sequence, the cutting element axis is controlled to pass from point $I_3$ and along the second offset path.

In accordance with this aspect of the invention, the cutting element effectively produces a sharp corner at the point of discontinuity of the first derivative of the workpiece contour. Furthermore, the machining time is minimized compared to the prior art techniques due to the reduction in distance that the cutting element must travel while precisely following the locally convex portion of the contour. In addition, in cases where the cutting element is required to cut two contours at once, as in a groove or slot, the amount of material required to be cut is minimized, permitting relatively high productivity compared to that of the prior art.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
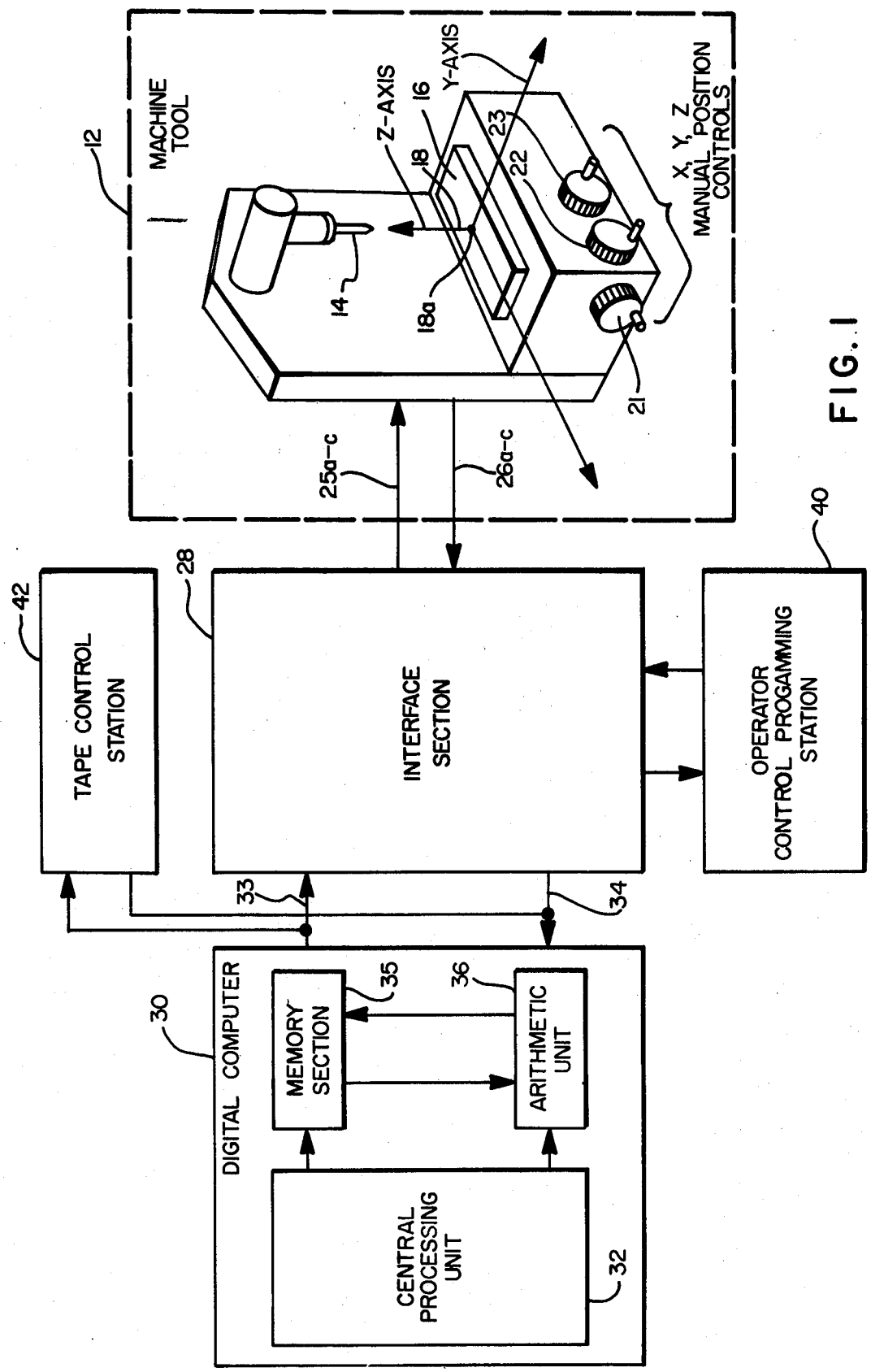
FIG. 1 shows in block diagram form, a numerically controlled machine tool system in accordance with the present invention.

The presently-described embodiment includes the system described in the above-referenced U.S. Pat. No. 3,878,983, incorporated by reference herein. Accordingly, FIGS. 1-3 from that patent are incorporated as FIGS. 1-3 of this application to depict portions of the preferred embodiment. Reference numerals used for identifying various components of the referenced patent are used herein to identify corresponding components of the present embodiment.

Figure 2:
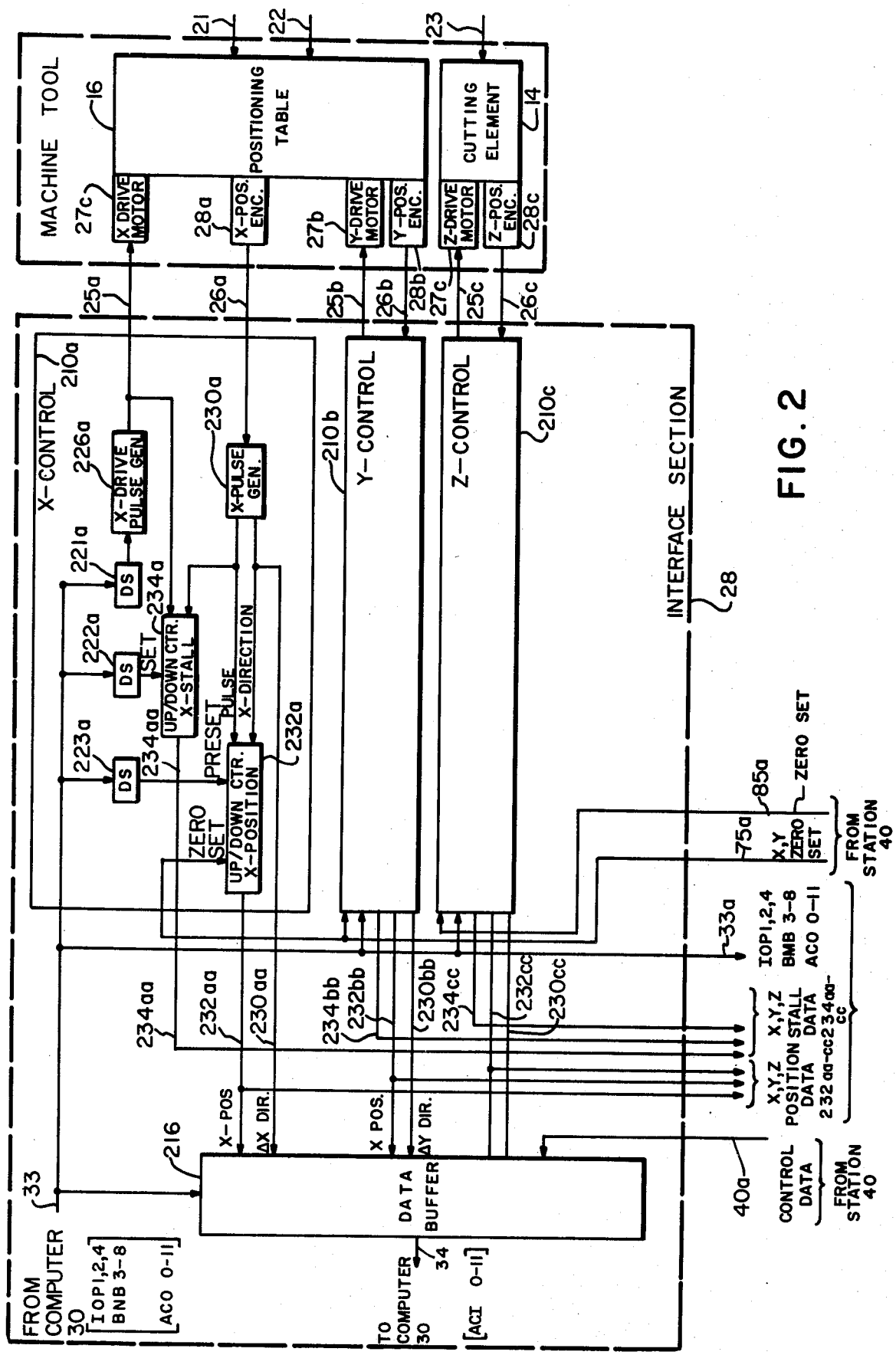
FIG. 2 shows in block diagram form a machine tool and interface section for the system of FIG. 1.
Figure 3:
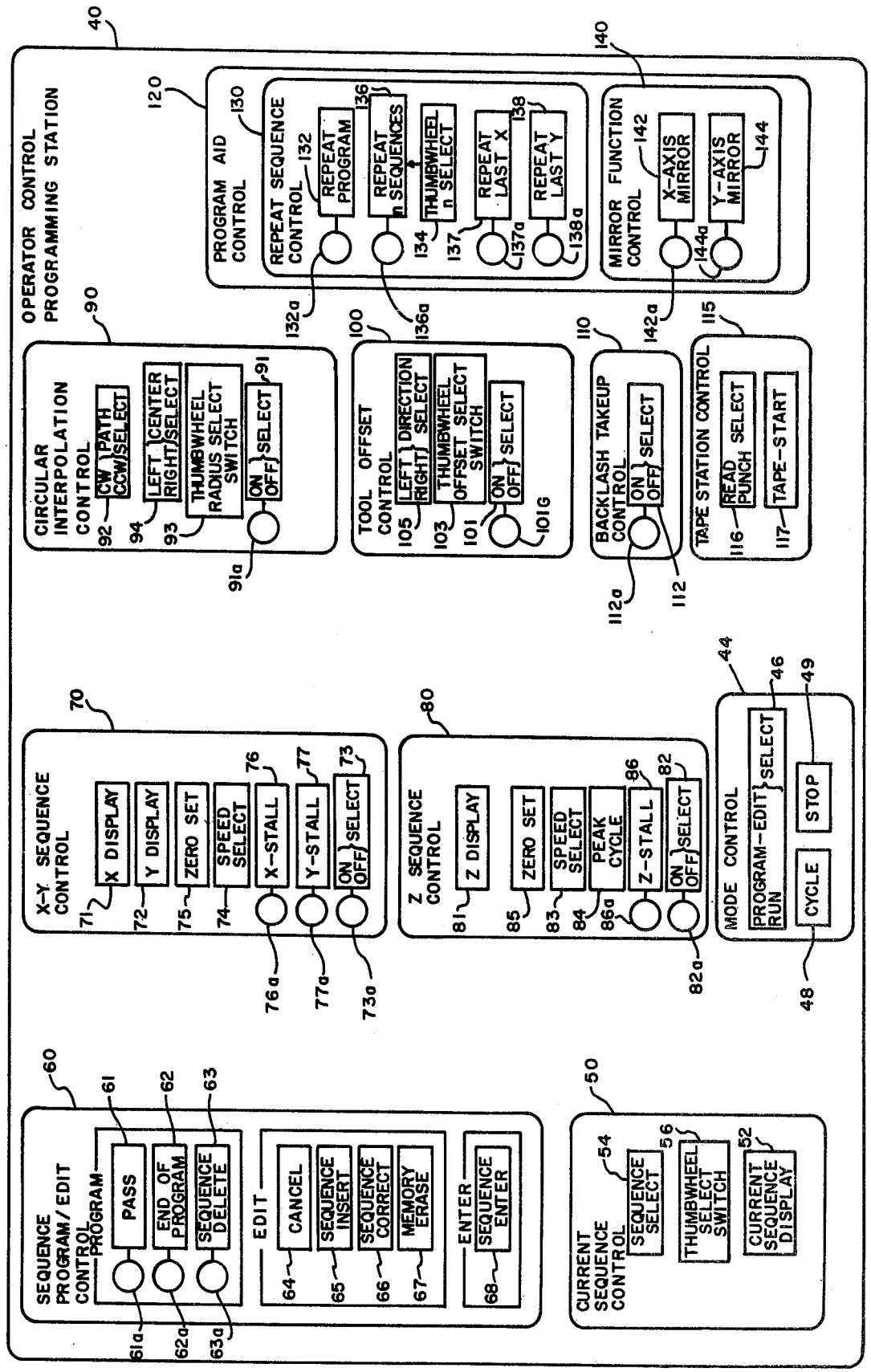
FIG. 3 shows a plan view of a portion of the operator control panel for use with the operator control/programming station of FIG. 1.

The preferred embodiment of the means for determining the offset paths from stored data sequences of the present invention, and the cutting element driving means responsive thereto, is incorporated in the embodiment of FIGS. 1-3. Alternatively, that means may be incorporated with other forms of prior art systems, for example, systems which control cutting element relative motion in response to stored data sequences programmed by way of a keyboard data entry means, or the like, or by way of operator controlled cutting element positioning operations.

The embodiment illustrated in FIG. 1 is that of a milling or a grinding machine tool as connected to the control means of the present invention. In this particular embodiment, the workpiece positioning table 16 may be translated in the horizontal X-Y plane, while the cutting element 14 is arranged to rotate about a vertical axis perpendicular to that X-Y plane and to reciprocate along that vertical axis in the Z direction. In addition, the table 16 may be rotated about the Z axis. In other embodiments, the table 16 may be configured to be rotated about the X or Y axes. Of course, as noted in the incorporated reference patent and applications, still other machine tools may be embodied in accordance with both the prior invention and with the present invention.

In the presently-described embodiment, all the components of the embodiment of FIGS. 1-3 may be the same as those in the incorporated reference, including: integrated circuits (flip-flops, shift registers, counters and logic gates), resistors, capacitors, push button and thumb wheel switches, indicator lamps and display devices. These devices are configured in a well-known manner to perform the functional operations described below and in the incorporated references. More particularly, as with the embodiment of the referenced patent, interface circuits associated with computer 30 are configured in accordance with the well-known interface techniques described in the Digital Equipment Corporation's PDP-8/L User's Handbook.

The digital computer 30 for the present embodiment of this invention is programmed in accordance with the computer program set forth in Appendix I to this application, providing features described in the incorporated reference patent and applications. In addition, the computer 30, when so programmed, includes a specific portion of the random access memory of memory section 35 dedicated to provide the means for controlling the functional operation of the system in accordance with the present invention. This specific portion of the memory section 35 includes memory cells set to binary states that are not changed during normal operation of the system. This portion of the memory in effect is hardwired, and may in alternative configurations be replaced by an equivalent point-to-point wired matrix panel or by a read-only memory, having the same interconnection pin configuration as the random access memory portion of section 35. In operation, this specific portion of the memory section 35 interacts with the remainder of the system, in a conventional manner, to implement the cutting element path determining functions of the invention.

In this form of the invention, the memory section 35 also stores an ordered succession of data sequences, entered by an operator, for example, by keyboard, tape, or manual positioning operations. The sequences may be two coordinate or one coordinate sequences for defining cutting element motion in a plane or direction, respectively. While in the present embodiment, the two coordinate sequences define motion in the X-Y plane and the one coordinate sequences define motion in the Z plane, other embodiments of the present invention may readily provide motion definition in alternative planes and axes. In operation, in the run mode, the computer 30 controls the motion of cutting element 14 along a path defined by one sequence at a time from the succession of stored sequences which may include interleaved two and one coordinate sequences, as described more fully in the incorporated references. The present invention relates to cutting element motion control in a plane, and so in the following description, the described sequences are two coordinate sequences unless explicitly stated to be one coordinate sequence.

In the present embodiment, each stored sequence includes identification data representative of the relative position of that sequence in the ordered succession, coordinate data representative of an associated spatial point measured with respect to the positioning table 16, and path data representative of a selected path type for the cutting element 14 to approach its associated spatial point. Each sequence also includes offset data and sequence type data. The offset data is representative of an offset path which is parallel to and offset from a direct path of the selected type which intersects the spatial point associated with the sequence, where the offset data is representative of a magnitude and direction for the offset of the offset path. The sequence type data representative of the type of the sequence, where a sequence is defined to be start/stop type when the sequence is the first of a contiguous group of sequences in the succession, which is terminated by the sequence immediately preceding the next start/stop type sequence in the succession and where the sequence is defined to be an intermediate type when it is one of the other sequences in the contiguous group. In the present embodiment, the offset data and sequence type data are related so that the start/stop sequences include offset data representative of a zero offset, and intermediate type sequences include offset data representative of some finite offset. In alternative systems, the start/stop and intermediate type sequences may be distinguished by a specific data word associated with the respective sequences.

With this data sequence format, the associated spatial points of each of said contiguous group define a shape, where the shape is a closed shape when the spatial points associated with the first and last sequences in the group are identical, and where the shape is an open shape otherwise.

In the run mode, the computer 30 selects one of said succession of sequences as a current sequence, and then, in conjunction with the path determining portion of memory section 35, determines a tool path to be followed by said cutting element 14 for that current sequence comprising a line segment extending from the current coordinates of the cutting element to a final point.

When the current sequence is a start/stop type, and the shape defined by the contiguous group including the current sequence is open, the final point is defined by the intersection of an offset path defined by the next subsequent sequence and a straight line segment. The offset path is uniformly separated from a direct path which connects the spatial points associated with the current and next subsequent sequences, and which is the type specified by the path data of the next subsequent sequence, with the separation being in accordance with the offset data of that next subsequent sequence. The straight line segment is perpendicular to the direct path at the spatial point associated with the current sequence.

When the current sequence is a start/stop sequence and the shape defined by the contiguous group is closed, the final point is defined by the intersection of a first offset path defined by the next subsequent sequence and a second offset path defined by the last sequence in the contiguous group including the current sequence. The first offset path is uniformly separated from a first direct path which connects spatial points associated with the current and next subsequent sequences and which is the type specified by the path data of the next subsequent sequence, with the separation being in accordance with the offset data of that next subsequent sequence. The second offset path is uniformly separated from a second direct path which connects the spatial points associated with the last and next to last sequences of the contiguous group of the current sequence, and which is the type specified by the path data of the last sequence in the contiguous group, with the separation being in accordance with the offset data of that last sequence.

When the current sequence and the next subsequent sequence are intermediate types, the final point is defined by the intersection of a first offset path defined by the current sequence and a second offset path defined by the next subsequent sequence. The first offset path is uniformly separated from a direct path which connects the spatial points associated with the current and next previous sequences and which is the type specified by the path data of the current sequence in accordance with the offset data of that current sequence. The second offset path is uniformly separated from a direct path which connects the spatial points associated with the current and next subsequent sequences, and which is the type specified by the path data of the current sequence in accordance with the offset data of the next subsequent sequence.

When the current sequence is an intermediate type and the next subsequent sequence is a start/stop type, and the shape defined by the contiguous group including the current sequence is open, the final point is defined by the intersection of an offset path defined by the current sequence and a straight line segment. The offset path is uniformly separated from the direct path which connects the spatial points associated with the current and next previous sequences, and which is of the type specified by the path data of the current sequence with the separation in accordance with the offset data of that current sequence. The straight line segment is perpendicular to the direct path at the spatial point associated with the current sequence.

When the current sequence is an intermediate type, and the next subsequent sequence is a start/stop type, and the shape defined by the contiguous group including the current sequence is closed, the final point is defined by the intersection of a first offset path defined by the current sequence and a second offset path defined by the first intermediate sequence of the contiguous group including the current sequence. The first offset path is uniformly separated from a direct path which connects the spatial points associated with the current and next previous sequences, and which is of the type specified by the path data of the current sequence in accordance with the offset data of the current sequence. The second offset path is uniformly separated from a direct path which connects the points associated with the current and first intermediate sequence of the contiguous group, and which is of the type specified by the path data of that first intermediate sequence in accordance with the offset data of that first intermediate sequence.

Following the determination of the tool path for each sequence, the computer 30 controls the relative motion of the cutting element 14 along that path in the same manner as described in conjunction with the incorporated references.

Figure 4:
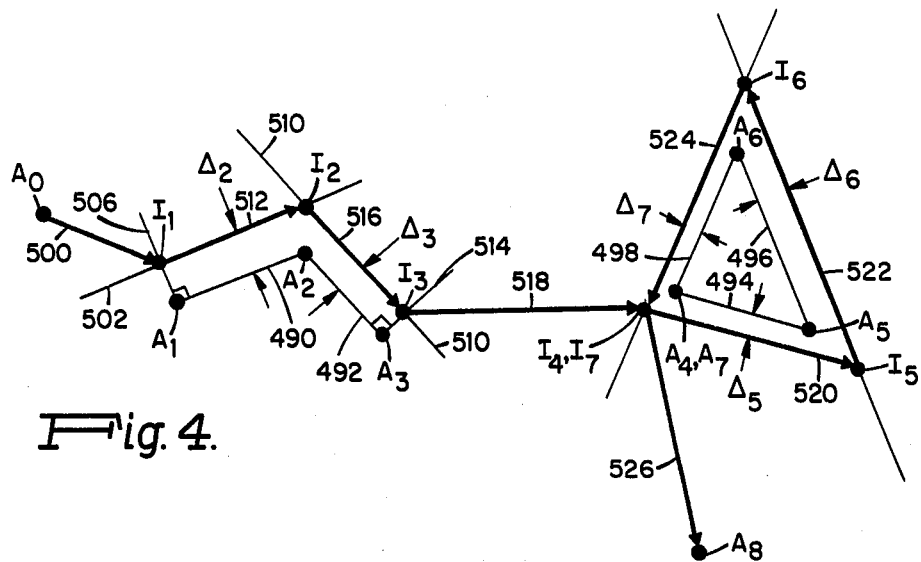
FIGS. 4-6 show exemplary trajectories of the relative motion of the cutting element of FIG. 1 in response to an exemplary succession of data sequences.

FIG. 4 shows two exemplary piecewise linear workpiece contours: the first defined by the direct path straight line segments 490 (connecting points $A_1$ and $A_2$) and 492 (connecting points $A_2$ and $A_3$), and the second defined by the direct path straight line segments 494 (connecting points $A_4$ and $A_5$), 496 (connecting points $A_5$ and $A_6$), and 498 (connecting points $A_6$ and $A_7$), where points $A_4$ and $A_7$ are identical. FIG. 4 also shows an initial point $A_0$ and a final point $A_8$ for the cutting element. In this example, it is desired that the cutting first pass from point $A_0$ to an intermediate point $I_1$ without offset and then along a path offset by $\Delta_2$ to the left of the direct path 490 and then pass along a path offset by $\Delta_3$ to the left of direct path 492, and then to an intermediate point $I_4$ without offset and thereafter pass along a path offset by $\Delta_5$ to the right of direct path 494, pass along a path offset by $\Delta_6$ to the right by an increment of direct path 496, and pass along a path offset by $\Delta_7$ to the right of direct path 498, before finally passing to the point $A_8$ without offset.

Table I illustrates an exemplary set of partial data sequences suitable for performing this operation with the present embodiment. Each sequence is identified with ordered sequence number data, coordinate point data representative of one of the coordinate points $A_1$ through $A_8$, a sequence type data, either start/stop (S/S) or intermediate (I), offset data having magnitude and direction either left (L) or right (R), and path type data, which in this example is denoted by ST, representing straight line paths. In accordance with the present invention, the sequences 1 through 7 form two contiguous groups set off by start/stop sequences (i.e. sequences 1 and 4) with the first group defining an opening shape (since the initial and final points of the shape defined by $A_1$, $A_2$, $A_3$ are not identical) the second group defining a closed shape (since the initial and final points of the shape defined by $A_4$, $A_5$, $A_6$, $A_7$ are identical). The sequence 8 is assumed to be the first sequence of another contiguous group defining a subsequent shape to be machined.

TABLE I

| SEQ NO | COORD PT | SEQ TYPE | OFFSET MAG | OFFSET DIR | PATH TYPE |
|---|---|---|---|---|---|
| 1 | $A_1$ | S/S | 0 | — | ST |
| 2 | $A_2$ | I | $\Delta_2$ | L | ST |
| 3 | $A_3$ | I | $\Delta_3$ | L | ST |
| 4 | $A_4$ | S/S | 0 | — | ST |
| 5 | $A_5$ | I | $\Delta_5$ | R | ST |
| 6 | $A_6$ | I | $\Delta_6$ | R | ST |
| 7 | $A_7$ | I | $\Delta_7$ | R | ST |
| 8 | $A_8$ | S/S | 0 | — | ST |

In operation, in response to the selection of sequence 1 as the current sequence in the run mode, the cutting element 14 is directed along a direct path (denoted by arrow 500) to the point $I_1$ at the intersection of the offset segment 502 (which is parallel to and offset by $\Delta_2$ to the left of direct path 490) and line segment 506 (which is perpendicular to the direct path 490 at point $A_1$). When sequence 2 is selected as the current sequence, the cutting element is directed to the point $I_2$ defined by the intersection of line segment 502 and line segment 510 (which is parallel to and offset by $\Delta_3$ to the left of the direct path 492). When the cutting element 14 is located at point $I_1$ at the time sequence 2 is selected as the current sequence, the cutting element passes from $I_1$ to point $I_2$ along the path denoted by arrow 512. When the sequence is selected as the current sequence, the cutting element is directed to a point $I_3$ defined by the intersection of line segment 510 and line segment 514 (which is perpendicular to the direct path 492 at point $A_3$. When cutting element 14 is located at point $I_2$ at the time sequence 3 is selected as the current sequence, the cutting element passes from point $I_2$ to point $I_3$ along the path denoted by arrow 516.

When sequence 4 is selected as the current sequence, the cutting element 14 is directed without offset from its current location to point $I_4$ defined by the intersection of offset paths 520 and 524, parallel to direct paths 494 and 498 respectively. When cutting element 14 is located at point $I_3$ when sequence 4 is selected as the current sequence, the cutting element passes from point $I_3$ to point $I_4$ along the path denoted by arrow 518. Furthermore, for the operation when the respective ones of sequences 5, 6, 7 and 8 are selected as current sequence, the cutting element 14 is directed to intermediate points $I_5$, $I_6$ and $I_7$, respectively. When these sequences are selected in succession following sequence 4, the cutting element follows the path denoted by arrows 520, 522, 524 and 526. The points $I_5$, $I_6$, $I_7$ and $A_8$ for these path segments are determined in accordance with the offset and path type data associated with the respective sequences in a manner similar to those noted above.

Accordingly, with this form of the present invention, each of the path segments for cutting element 14 may be separately adjusted to provide an individual offset from the associated direct path. In applications wherein a plurality of contour portions are to be machined such as those defined by the two contiguous groups of the above-noted example, the present system provides a means for automatically computing the cutting element offset path for performing these machining operations, as well as for controlling the movement of the cutting element between the respective machining operations without offset (e.g. path 518 in FIG. 4). With respect to controlled motion between machining operations, it should be noted that generally there would be no offset associated with such motion. Accordingly, in the present embodiment, a zero value for the offset magnitude data of a sequence denotes that sequence as a start/stop sequence, while finite value offset magnitude data denotes that sequence as an intermediate sequence.

Figure 5:
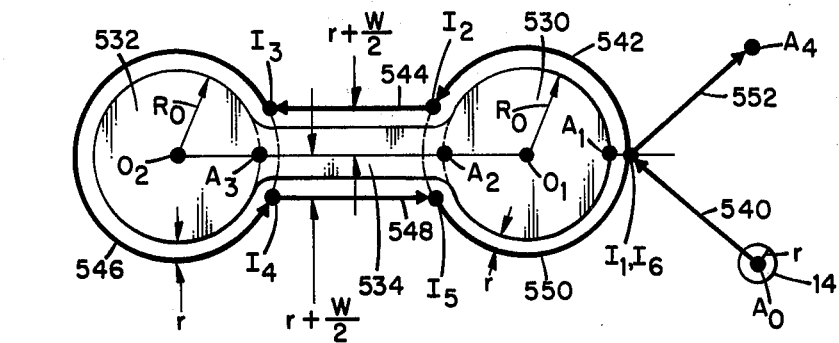

FIG. 5 illustrates another exemplary tool path for machining a complex contour associated with a pair of discs 530 and 532 (having radius $R_0$ and center points $O_1$ and $O_2$) coupled by a web 534 (having width W and being symmetrically disposed about the line segment connecting the points $O_1$ and $O_2$). FIG. 5 also shows an initial point $A_0$ and a final point $A_4$ for the cutting element. Table II illustrates a succession of sequences suitable for generating this contour with a cutting element 14 having a radius r.

Table II shows an exemplary set of sequences suitable for controlling this machining operation. Sequences 1-6 are a contiguous group which define the cutting element path from a general point $A_0$ along straight line path segment denoted by arrow 540 to point $I_1$ (sequence 1), and then to point $I_2$ along offset circular path segment denoted by arrow 542 (sequence 2), to point $I_3$ along offset straight line path segment denoted by arrow 544 (sequence 3), to point $I_4$ along offset circular path segment denoted by arrow 546 (sequence 4), to point $I_5$ along offset straight line path segment denoted by arrow 548 (sequence 5), and to point $I_6$ along offset circular path segment denoted by arrow 550 (sequence 6). The circular path sequences are denoted as such by the circular interpolation path type designation CI, together with data representative of the center point radius and clockwise/counter-clockwise (CW/CCW) direction data. Sequence 7 defines the cutting element path to point $A_4$ along straight line path segment denoted by arrow 552, which may lead to the next shape to be machined.

sequence, the cutting element is directed from point $I_1$ along path 562 (arrow 566) to point $I_2$. Point $I_2$ is defined by the intersection of the offset path 562 and the offset path 568 associated with sequence 3. Since sequence 3 defines a circular path having zero radius with an offset r and a center at point $A_2$, then the point $I_3$ is located on the circular line segment 568 which is a

TABLE II

| SEQ NO | COORD PT | SEQ TYPE | OFFSET MAG | OFFSET DIR | PATH TYPE | CTR | RAD | DIR |
|---|---|---|---|---|---|---|---|---|
| 1 | $A_1$ | S/S | 0 | — | ST | — | — | — |
| 2 | $A_2$ | I | r | R | CI | $0_1$ | $R_0$ | CCW |
| 3 | $A_3$ | I | $r + \frac{W}{2}$ | R | ST | — | — | — |
| 4 | $A_3$ | I | r | R | CI | $0_2$ | $R_0$ | CCW |
| 5 | $A_2$ | I | $r + \frac{W}{2}$ | R | ST | — | — | — |
| 6 | $A_1$ | I | r | R | CI | $0_1$ | $R_0$ | CCW |
| 7 | $A_4$ | S/S | 0 | — | ST | — | — | — |

Accordingly, with the present invention, the complex contour illustrated in FIG. 5 may be machined with only six sequences (since sequence 7 may be considered to be the first sequence of another shape), which require only specification of the cutting element radius and location of the desired workpiece contour (e.g. as specified by points $A_1$, $A_2$, $A_3$). The remaining information may be readily utilized by an operator from a drawing of the part to be machined together with appropriate offset data, so that the system may determine the path as shown in FIG. 5.

Figure 6:
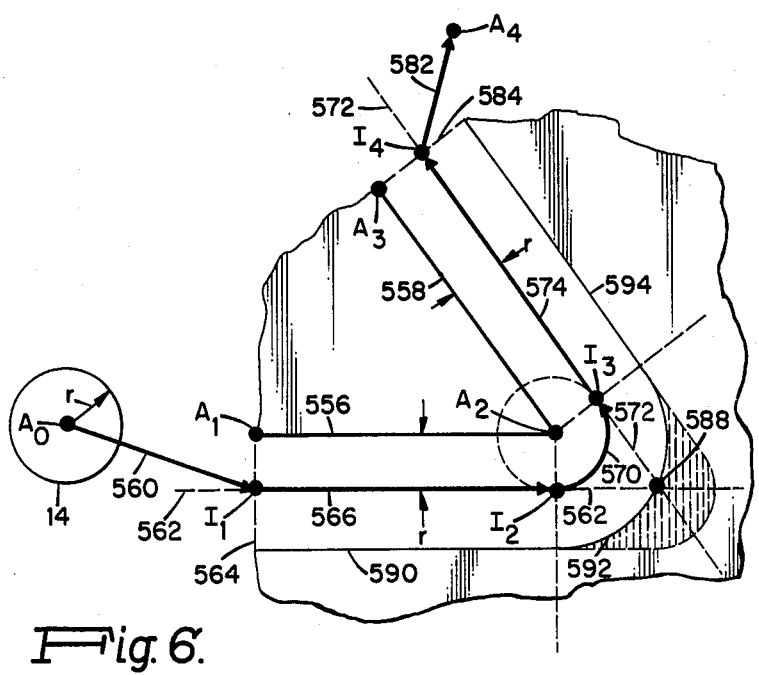

FIG. 6 illustrates the cutting element movement for a cutting element (having radius r) for machining a locally convex, piecewise workpiece contour defined by the direct path line segments 556 (connecting points $A_1$ and $A_2$) and 558 (connecting points $A_2$ and $A_3$). FIG. 6 also shows an initial point $A_0$ and a final point $A_4$ for the cutting element. Table III shows an exemplary set of sequences suitable for controlling this machining operation with the present embodiment. Sequences 1–4 define the cutting element offset path from a general point $A_0$ along straight line segment denoted by arrow 560 to point $I_1$ (sequence 1), and then to point $I_2$ along offset straight line path segment denoted by arrow 566 (sequence 2), to point $I_3$ along offset circular path segment denoted by arrow 570 (sequence 3), to point $I_4$ along offset path segment denoted by arrow 574 (segment 4). Sequence 5 defines the cutting element path to point $A_4$ along straight line path segment denoted by arrow 582 (sequence 5), which may lead to the next shape to be machined.

circle of radius r about point $A_2$. Accordingly, point $I_2$ is the tangent point of circular segment 568 with line segment 562.

When sequence 3 is selected as the current sequence, the cutting element is directed from point $I_2$ to point $I_3$ along the portion of segment 568 denoted by arrow 570. Point $I_3$ is defined in a similar manner as point $I_2$ and, more particularly, by the intersection of the offset path 572 associated with sequence 4 (whereline segment 572 is parallel to an offset by r from the direct path 558) with the circular line segment 568. When sequence 4 is selected as the current sequence, the cutting element is directed from point $I_3$ along path 572 (arrow 574) to point $I_4$ (which is defined as the intersection of line segment 572 and line segment 584 (which is perpendicular to direct path 558 at point $A_3$). When sequence 5 is selected as the current sequence, the cutting element is directed from point $I_4$ along the path denoted by arrow 584.

Accordingly, in this example, the composite cutting element path established by sequences 1–4 is denoted by arrows 560, 570, 574 and 582. With this cutting element path, the cutting element effectively maintains a point in contact with the desired workpiece contour between points $A_1$ and $A_2$, and then, while maintaining that contact point, rotates about point $A_2$ and then continues along the desired contour while maintaining a contact point between the points $A_2$ and $A_3$. In this configuration, the resultant contour on the locally convex portion defined by points $A_1$, $A_2$ and $A_3$ has a piecewise continuous derivative at point $A_2$. As noted above, in order to

TABLE III

| SEQ NO | COORD PT | SEQ TYPE | OFFSET MAG | OFFSET DIR | PATH TYPE | CTR | RAD | DIR |
|---|---|---|---|---|---|---|---|---|
| 1 | $A_1$ | S/S | O | — | ST | — | — | — |
| 2 | $A_2$ | I | r | R | ST | — | — | — |
| 3 | $A_2$ | I | r | R | CI | $A_2$ | O | CCW |
| 4 | $A_3$ | I | r | R | ST | — | — | — |
| 5 | $A_4$ | S/S | O | — | ST | — | — | — |

The following operations are performed when in response to the successive selection of sequences 1–5 as current sequences in the run mode. When sequence 1 is selected as the current sequence, the cutting element 14 is directed to the point $I_1$ (where point $I_1$ is defined by the intersection of the line segment 562 which is parallel to and offset by r from the direct path 566) and the line segment 564 (which is perpendicular to direct path 566 at point $A_1$. When sequence 2 is selected as the current achieve such a contour in the prior art, it would be necessary for the cutting element to pass along path 562 to the intersection point 588 of path 562 and path 572 before continuing on path 572 toward point $A_3$. Under such circumstances, the cutting element passes a somewhat longer path than that for the present invention since the point 588 is bypassed in the present invention by the path 570. Furthermore, in contrast to the prior art systems, the present system maintains a contact point at all times between the cutting element and the workpiece contour, even when the cutting element is in the vicinity of point 588.

Furthermore, in applications where it is desired that the cutting element cut a groove while maintaining two contact points with the workpiece, the present invention may control the cutting element in the manner described in conjunction with FIG. 6 to machine the groove defined on one side by line segments 556 and 558 and on the other side by straight line segments 590 and 594 and circular line segment 592. This path for the cutting element provides a minimum material cutting requirement and path length. In contrast, the prior art systems require passage along the longer path 562 to point 580 before continuing along path 572. In the latter case, the cutting element must cut considerably more material than in the former case, with the excess material denoted in FIG. 6 by the shaded area.

In accordance with another aspect of the present invention, a portion of memory section 35 is adapted to permit an operator in the program-edit mode to readily generate and store a new set of n sequences which are substantially identical to a previously stored set of n sequences except for the offset magnitude data.

In one form, the offset magnitude data for each intermediate type sequence in the newly-generated set is changed to a selected new value, with the new sequences being the same as the corresponding original sequences otherwise. For the present embodiment, as augmented by a data format control 222 such as described in the referenced applications, the operator may achieve this operation by selectively activating controls 46, 54, 56, 101, 103, 105, 134, 136, and 222.

In a second form, the offset magnitude data for each intermediate type sequence in the newly-generated set is changed to a new value which differs from the offset magnitude value of the corresponding original sequence by a selected increment, with the new sequences being the same as the corresponding original sequences otherwise. For the present embodiment, as augmented by a data format control 224 such as described in the referenced applications, the operator may achieve this operation by selectively activating controls 46, 54, 56, 101, 103, 105, 134, 136, and 224.

Subsequently, when selected as a current sequence in the run mode, each of these new sequences is transformed to appropriate cutting element drive signals in the same manner as any other sequence.

As a result of this feature, an operator may work with an existing set of sequences for controlling a machining operation (which may comprise one or more shapes, either open or closed), and generate related new sequences, for finishing operations for example, by simply adjusting the offset data along, while maintaining the sequences otherwise unchanged. Since only the intermediate sequences are changed, there is no requirement that the operator manually tailor the various sequences, even those which control cutting element motion between shapes (i.e. start/stop sequences). In response to the selection of these new sequences as current sequences in the run mode, the cutting element is automatically controlled to pass in a path based on the amended offset data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX I

```
 1              .TITLE HAMILL CO. HANC-4 13-APR-77
 2              .SBTTL PROGRAMMED BY J. C. KILHANE.
 3
 4       0000   FIELD 0
 5
 6              .DSABL PNC
 7
 8       0006   *6
 9
10  00006 0000  RHODE,0
11  00007 0000  0
12
13       0020   *20
14
15  00020 0000  EXP,0
16  00021 0000  HORD,0
17  00022 0000  LORD,0
18
19  00023 0000  F.NUM,0
20  00024 0000  F.TYPE,0
21  00025 0000  F.AUX,0
22  00026 0000  F.AXIS,0
23  00027 0000  F.DEL,0
24  00030 0000  F.EOP,0
25  00031 0000  F.HOLD,0
26  00032 0000  F.OFF,0
27  00033 0000  F.SENS,0
28  00034 0000  F.AUTO,0
29  00035 0000  F.CCW,0
30  00036 0000  F.CENT,0
31  00037 0000  F.STRT,0
32  00040 0000  F.FOF,0
33  00041 0000  B.ADX,0
34  00042 0000  B.ADY,0
35  00043 0000  B.ADZ,0
36  00044 0000  B.ANTH,0
37  00045 0000  AUX.TH,0
38  00046 0000  AUX.Z,0
39  00047 0000  AUX.Y,0
40  00050 0000  AUX.X,0
41  00051 0000  M.TH,0
42  00052 0000  M.Z,0
43  00053 0000  M.Y,0
44  00054 0000  M.X,0
45  00055 0000  W.NUM,0
46  00056 0000  W.TYPE,0
47  00057 0000  W.AUX,0
48  00060 0000  W.AXIS,0
49  00061 0000  W.DEL,0
50  00062 0000  W.EOP,0
51  00063 0000  W.HOLD,0
52  00064 0000  W.OFF,0
53  00065 0000  W.SENS,0
54  00066 0000  W.AUTO,0
55  00067 0000  W.CCW,0
56  00070 0000  W.CENT,0
57  00071 0000  W.EOF,0
58  00072 0000  NEXTF,0
59  00073 0000  ANYOFF,0
60  00074 0000  FOUNDF,0
61  00075 0000  FFOUND,0
62  00076 0000  RECI,0
63  00077 0000  FRFC,0
64  00100 0000  PTA,0
65  00101 0000  0
66  00102 0000  FILES,0
67  00103 0000  0
68  00104 0000  PTROT,0
69  00105 0000  0
70  00106 0000  P1,0
71  00107 0000  0
72  00110 0000  P2,0
73  00111 0000  0
74
75       0014   MAXRS=12,
76
77  00112        RBUFF,.BLKW MAXRS
78
79  00126 0000  INTVAL,0
80  00127 0000  VMASK,0
81  00130 0000  RETRN,0
82  00131 0000  STYPE,0
83  00132 0000  ITYPE,0
84  00133 0000  FROMA,0
85  00134 0000  TOA,0
```

```
86   00135 0000  FROMA,0
87   00136 0000  TOB,0
88   00137 0000  PWPUP,0
89
90         0160  *160
91
92   00160 0000  T,0,0
93   00161 0000  T,1,0
94   00162 0000  T,2,0
95   00163 0000  T,3,0
96   00164 0004  T,4,4
97   00165 0005  T,5,5
98   00166 0006  T,6,6
99   00167 0007  T,7,7
100  00170 0000  T,10,0
101  00171 0000  T,11,0
102  00172 0000  T,12,0
103  00173 0000  T,13,0
104  00174 0000  T,14,0
105  00175 0000  T,15,0
106  00176 0000  T,16,0
107  00177 0000  T,17,0
108
109        0001  FIELD 1
110
111        0000  *0
112
113  10000 7402  RAMPSI,HLT
114  10001 0000  CIRCLE,0
115  10002 0000  RAMPS,0
116  10003 0000  FUTSCH,0
117
118        0044  *44
119
120  10044 0000  .STYPE,0
121  10045 0000  .ITYPE,0
122  10046 0000  .FROMA,0
123  10047 0000  .TOA,0
124  10050 0000  .FROMB,0
125  10051 0000  .TOB,0
126  10052 0000  U.TYPE,0
127  10053 0000  U.OFF,0
128  10054 0000  U.SENS,0
129  10055 0000  U.AUTO,0
130  10056 0000  U.CCW,0
131  10057 0000  U.CENT,0
132  10060 0000  U.CCWI,0
133  10061 0000  STPLOC,0
134  10062 0002  WHENLC,2
135

1          0000  F,SPD=0
2          0001  F,X=1
3          0002  D,X=2
4          0003  F,Y=3
5          0004  D,Y=4
6          0005  F,Z=5
7          0006  D,Z=6
8          0007  F,THET=7
9          0010  D,THET=10
10         0011  F,SSP=11
11         0012  F,THIS=12
12         0013  F,NEXT=13
13         0014  C,X=14
14         0015  C,Y=15
15         0016  C,Z=16
16         0017  C,THET=17
17         0020  W,SEQ=20
18         0021  F,PECK=21
19         0022  F,RAD=22
20         0023  F,OFFS=23
21         0024  F,N=24
22         0025  E,NUM=25
23         0026  F,THPI=26
24         0027  SPARE=27
25
26         0030  FP,ZIP=30
27         0031  FP,ONE=31
28         0032  FP,TEN=32
29         0033  FP,C=33
30         0034  FP,M=34
31         0035  FP,XM=35
32         0036  FP,SM=36
33         0037  FP,SF=37
34         0040  FP,MM=40
35         0041  FP,LC=41
36         0042  FP,CM=42
37         0043  EPSILN=43
38         0044  SP,MAX=44
39         0045  YCNTP=45
40         0046  XPOSA=46
41         0047  YPOSA=47
42         0050  STRTSP=50
43         0051  STOPSP=51
44         0052  STEPS=52
45         0053  WFT,0=53
46         0054  WFT,1=54
47         0055  NRECS=55
48         0056  FT,0=56
49         0057  FT,1=57
50         0060  FT,2=60
51         0061  FT,3=61
52         0062  FT,4=62
53         0063  FT,5=63
54         0064  FT,6=64
55         0065  FT,7=65
56         0066  FT,8=66
57         0067  FT,9=67
58         0070  FT,10=70
59         0071  FT,11=71
60         0072  FT,12=72
61         0073  FT,13=73
62         0074  FT,14=74
63         0075  FT,15=75
64         0076  FT,16=76
65         0077  FT,17=77
66         0100  XCNTP=100
67         0101  X,COMP=101
68         0102  Y,COMP=102
69         0103  K,COMP=103
70         0104  SIN,L=104
71         0105  COS,L=105
72         0106  KERF=106
73         0107  XCA=107
74         0110  YCA=110
75         0111  XPRA=111
76         0112  YPRA=112
77         0113  RADA=113
78         0114  LAST,X=114
79         0115  LAST,Y=115
80         0116  F,LITE=116
81
82         0016  WZPOS=C,Z
83         0005  FZPOS=F,Z
84         0021  FZPK=F,PECK
85         0073  DELTAZ=FT,13
86         0072  ZINK=FT,12
87         0071  ZINC=FT,11
88         0001  ZDELT=F,X
89         0001  XDEST=F,X
90         0070  ZDETL=FT,10
91         0003  YDEST=F,Y
92         0015  WYPOS=C,Y
93         0014  WXPOS=C,X
94         0056  CIRXM=FT,0
95         0057  CIRYM=FT,1
96         0060  CIRAR=FT,2
97         0061  CIRNC=FT,3
98         0022  FRAD=F,RAD
99         0001  THDEL=F,X
100
101        0010  XR0=10
102        0011  XR1=11
103        0012  XR2=12
104        0013  XR3=13
105        0014  XR4=14
106        0015  XR5=15
107        0016  XR6=16
108        0017  XR7=17
109        0017  XRA=17
110
111        0000  FEXT=0
112        0003  FSIN=3
113        0004  FCOS=4
114        0001  ETZ=1
115        0004  LTZ=4
116        0017  FNOR=17
117        0006  FABS=6
118
119              .ENABL PNC

1                .TITLE HAMILL CO. BANC-4 13-MAY-77
2                .SBTTL PROGRAMMED BY J. C. KILBANE
3
4          0001  FIELD 1
5
6          0000  *0
7
8    10000 7402  HLT
9
10         0000  FIELD 0
11
12         0102  *FILES
13
14   00102 6211  CDF 10
15   00103 7300  7300
16
17         4000  SUBM=4000
18
19         0200  *200
20
```

```
 21                        .ENABL LSR
 22
 23   00200 3021    START,DCA WORD/START UP
 24   00201 3022    DCA LORD
 25   00202 3020    DCA EXP
 26   00203 3263    DCA 1S
 27
 28   00204 4407    2S,FFNT
 29   00205 0016    RNM
 30   00206 6663    FPUT I 1S
 31   00207 0000    FEXT
 32   00210 2263    ISZ 1S
 33   00211 1263    TAD 1S
 34   00212 1377    TAD (-FP.ZIP)
 35   00213 7750    SPA SNA CLA
 36   00214 5204    JMP 2S
 37   00215 4407    FENT
 38   00216 5264    FGET 3S
 39   00217 0017    FNOR
 40   00220 6052    FPUT STEPS
 41   00221 5430    FGET FP.ZIP
 42   00222 6055    FPUT NRECS
 43   00223 5267    FGET 4S
 44   00224 6116    FPUT F.LITE
 45   00225 6043    FPUT EPSILN
 46   00226 0000    FEXT
 47   00227 4776    JMS LTSOFF
 48   00230 4775    JMS PTAG
 49   00231 0102    FILES
 50   00232 3055    DCA W.NUM
 51   00233 3130    DCA RETRO
 52   00234 3076    DCA RECI
 53   00235 3072    DCA NEXTF
 54   00236 3075    DCA FFOUND
 55   00237 3127    DCA VMASK
 56   00240 3126    DCA INTVAL
 57   00241 6007    6007
 58   00242 6432    6432
 59   00243 6430    6430
 60
 61   00244 1374   R.MEMC,TAD (162)
 62   00245 4773    JMS PUT
 63   00246 0100    PTA
 64   00247 4772    JMS INC
 65   00250 0100    PTA
 66   00251 4771    JMS PTAP
 67   00252 0104    PTROT
 68   00253 1370    TAD (10)
 69   00254 4773    JMS PUT
 70   00255 0100    PTA
 71   00256 4767    JMS DEC
 72   00257 0100    PTA
 73   00260 6603    6603
 74   00261 3766    DCA WAXIS
 75   00262 5765    JMP R.SSS
 76
 77   00263 0000   1S,0
 78   00264 0027   3S,27;0;32
      00265 0000
      00266 0032
 79   00267 0001   4S,1;3000;0
      00270 3000
      00271 0000
 80
 81   00272 0000   ISAVE,0/SAVE COUNTERS ON POWER FAIL
 82   00273 1564    TAD (7600-1)
 83   00274 3010    DCA XR0
 84
 85         0000    0=0
 86
 87         0004    .REPT 4
 88
 89                 6502+D
 90                 DCA I XR0
 91                 6503+D
 92                 DCA I XR0
 93                 RAL
 94                 DCA I XR0
 95
 96                 D=D+10
 97
 98                 .ENDR
 99
100   00325 5672    JMP I ISAVE
101
102                 .DSABL LSR
103
      00364 7577
      00365 4603
      00366 5051
      00367 1645
      00370 0010
      00371 1456
      00372 1621
      00373 1600
      00374 0162
      00375 1470
```

```
      00376 2307
      00377 7750
104   00400          PAGE 1            0400   PT=.
  2
  3            0001   *1
  4
  5   00001 5402   JMP I .+1
  6   00002 0403   IPROC
  7   00003 7000   PWUP
  8   00004 1356   RPVEC
  9
 10            0400   *PT
 11
 12                   .ENABL LSR
 13
 14   00400 6233   RKPNT,CDI 30
 15   00401 5777   JMP I (6400)
 16   00402 5226   JMP 3S
 17
 18   00403 3330   IPROC,DCA ACCUM/INTERRUPT HANDLER
 19   00404 6004   GTF
 20   00405 3331   DCA LINK
 21   00406 1000   TAD 0
 22   00407 3332   DCA PCNOW
 23   00410 7701   ACL
 24   00411 3333   DCA MQST
 25   00412 6102   6102
 26   00413 5222   JMP 1S
 27   00414 1010   TAD XR0
 28   00415 3334   DCA SXR0
 29   00416 4776   JMS ISAVE
 30   00417 1375   TAD (JMP I 3)
 31   00420 3000   DCA 0
 32   00421 7402   HLT
 33
 34   00422 6435   1S,6435
 35   00423 5235   JMP 5S
 36   00424 7001   IAC
 37   00425 3774   DCA AUXDUN
 38
 39            0426   RETPUP=.
 40
 41   00426 1331   3S,TAD LINK
 42   00427 6005   RTF
 43   00430 7200   CLA
 44   00431 1333   TAD MQST
 45   00432 7421   MQL
 46   00433 1330   TAD ACCUM
 47   00434 5732   JMP I PCNOW
 48
 49   00435 6031   5S,KSF
 50   00436 5244   JMP 6S
 51   00437 6036   KRB
 52   00440 1573   TAD (-204)
 53   00441 7640   SZA CLA
 54   00442 5226   JMP 3S
 55   00443 5200   JMP RKPNT
 56
 57   00444 6041   6S,TSF
 58   00445 5250   JMP 7S
 59   00446 6042   TCF
 60   00447 5226   JMP 3S
 61
 62   00450 6431   7S,6431
 63   00451 5226   JMP 3S
 64   00452 6433   6433
 65   00453 3126   DCA INTVAL
 66   00454 6432   6432
 67   00455 1006   TAD RMODE
 68   00456 7650   SNA CLA
 69   00457 5272   JMP 8S
 70   00460 1126   TAD INTVAL
 71   00461 0372   AND (7770)
 72   00462 7640   SZA CLA
 73   00463 5304   JMP 19S
 74   00464 2126   ISZ INTVAL
 75   00465 1126   TAD INTVAL
 76   00466 1127   TAD VMASK
 77   00467 7640   SZA CLA
 78   00470 5226   JMP 3S
 79   00471 5771   JMP ZLIMIT
 80
 81   00472 1126   8S,TAD INTVAL
 82   00473 0372   AND (7770)
 83   00474 7440   SZA
 84   00475 5320   JMP 13S
 85   00476 7240   STA
 86   00477 1126   TAD INTVAL
 87   00500 7650   SNA CLA
 88   00501 1370   TAD (20)
 89
 90   00502 3126   18S,DCA INTVAL
 91   00503 5226   JMP 3S
 92
```

```
93  00504 1126    19$,TAD INTVAL
94  00505 1367    TAD (-100)
95  00506 7510    SPA
96  00507 5314    JMP 20$
97  00510 7002    BSW
98  00511 0367    AND (7700)
99  00512 1366    TAD (7)
100 00513 5302    JMP 18$
101
102 00514 1365    20$,TAD (100-14)
103 00515 7650    SNA CLA
104 00516 1364    TAD (6)
105 00517 5302    JMP 18$
106
107 00520 1367    13$,TAD (-100)
108 00521 7700    SMA CLA
109 00522 5226    JMP 3$
110 00523 1126    TAD INTVAL
111 00524 1363    TAD (-17)
112 00525 7740    SMA SZA CLA
113 00526 5302    JMP 18$
114 00527 5226    JMP 3$
115
116 00530 0000    ACCUM,0
117 00531 0000    LINK,0
118 00532 0000    PCNOW,0
119 00533 0000    MQST,0
120 00534 0000    SXRO,0
121
122                .DSABL LSB
123
    00563 7761
    00564 0006
    00565 0064
    00566 0007
    00567 7700
    00570 0020
    00571 5546
    00572 7770
    00573 7574
    00574 6066
    00575 5403
    00576 0272
    00577 6400
124 00600

1   00600 0000    FETCH,0/FETCH RECORD (F,NUM)
2   00601 3040    DCA F.EOF
3   00602 1023    TAD F.NUM
4   00603 3077    DCA FREC
5   00604 4777    JMS FETS
6   00605 1113    TAD RBUFF+1
7   00606 4776    JMS BITSEP
8   00607 0013    11.
9   00610 0025    F.AUX
10  00611 1113    TAD RBUFF+1
11  00612 0575    AND (3)
12  00613 3026    DCA F.AXIS
13  00614 1112    TAD RBUFF
14  00615 7002    BSW
15  00616 7012    RTR
16  00617 0374    AND (17)
17  00620 3025    DCA F.AUX
18  00621 1112    TAD RBUFF
19  00622 7012    RTR
20  00623 7012    RTR
21  00624 0374    AND (17)
22  00625 3024    DCA F.TYPE
23  00626 1024    TAD F.TYPE
24  00627 1373    TAD (JMP I 1$)
25  00630 3231    DCA .+1
26  00631 7402    HLT
27
28  00632 0642    1$,10$/XY
29  00633 0656    20$/CIR
30  00634 0664    30$/Z
31  00635 0675    40$/A
32  00636 0703    50$/SPEED
33  00637 0707    60$/TOOL CHANGE
34  00640 0715    70$
35  00641 0716    80$/EOF
36
37  00642 4320    10$,JMS FOFFX
38  00643 0121    RBUFF+7
39
40  00644 4772    12$,JMS DFLOAT
41  00645 0115    RBUFF+3
42  00646 0001    F.X
43  00647 4772    JMS DFLOAT
44  00650 0117    RBUFF+5
45  00651 0003    F.Y
46
47  00652 4771    15$,JMS SFLOAT
48  00653 0114    RBUFF+2
49  00654 0000    F.SPD
50  00655 5600    JMP I FETCH
51

52  00656 4320    20$,JMS FOFFX
53  00657 0123    RBUFF+9.
54  00660 4772    JMS DFLOAT
55  00661 0121    RBUFF+7
56  00662 0022    F.RAD
57  00663 5244    JMP 12$
58
59  00664 4772    30$,JMS DFLOAT
60  00665 0115    RBUFF+3
61  00666 0005    F.Z
62  00667 4320    JMS FOFFX
63  00670 0120    RBUFF+6
64  00671 4771    JMS SFLOAT
65  00672 0117    RBUFF+5
66  00673 0021    F.PECK
67  00674 5252    JMP 15$
68
69  00675 4772    40$,JMS DFLOAT
70  00676 0115    RBUFF+3
71  00677 0007    F.THET
72  00700 4320    JMS FOFFX
73  00701 0117    RBUFF+5
74  00702 5252    JMP 15$
75
76  00703 4771    50$,JMS SFLOAT
77  00704 0114    RBUFF+2
78  00705 0011    F.SSP
79  00706 5600    JMP I FETCH
80
81  00707 4771    60$,JMS SFLOAT
82  00710 0114    RBUFF+2
83  00711 0012    F.THIS
84  00712 4771    JMS SFLOAT
85  00713 0115    RBUFF+3
86  00714 0013    F.NEXT
87
88  00715 5600    70$,JMP I FETCH
89
90  00716 2040    80$,ISZ F.EOF
91  00717 5600    JMP I FETCH
92
93  00720 0000    FOFFX,0/CHECK FOR OFFSET
94  00721 1720    TAD I FOFFX
95  00722 2320    ISZ FOFFX
96  00723 3330    DCA 1$
97  00724 1032    TAD F.OFF
98  00725 7650    SNA CLA
99  00726 5720    JMP I FOFFX
100 00727 4772    JMS DFLOAT
101
102 00730 0000    1$,0
103 00731 0023    F.OFFS
104 00732 5720    JMP I FOFFX
105
106 00733 0000    .XIOS,0/CHECK INVERT OFFSET SENSE
107 00734 1056    TAD W.TYPE
108 00735 1370    TAD (JMP I 1$)
109 00736 3537    DCA .+1
110 00737 7402    HLT
111
112 00740 1054    2$,TAD M.X
113 00741 7640    SZA CLA
114 00742 4353    JMS 10$ 115 00743 1053    TAD M.Y
116
117 00744 7640    20$,SZA CLA
118 00745 4353    JMS 10$
119 00746 5733    JMP I .XIOS
120
121 00747 1052    3$,TAD M.Z
122 00750 5344    JMP 20$
123
124 00751 1051    4$,TAD M.TH
125 00752 5344    JMP 20$
126
127 00753 0000    10$,0
128 00754 1065    TAD W.SENS
129 00755 7650    SNA CLA
130 00756 7001    IAC
131 00757 3065    DCA W.SENS
132 00760 5753    JMP I 10$
133
134 00761 0740    1$,2$/2$/3$/4$
    00762 0740
    00763 0747
    00764 0751
135
    00770 5761
    00771 2000
    00772 2021
    00773 5632
    00774 0417
    00775 0003
    00776 2037
    00777 1534
136 01000
```

```
1    01000 0000      INSEPT,0/INSERT RECORD
2    01001 3071      DCA W.EOF
3    01002 1057      TAD W.AUX
4    01003 7106      CLL RTL
5    01004 7006      RTL
6    01005 1056      TAD W.TYPE
7    01006 7106      CLL RTL
8    01007 7120      STL
9    01010 7006      RTL
10   01011 3112      DCA RBUFF
11   01012 1056      TAD W.TYPE
12   01013 1377      TAD (JMP I 1$)
13   01014 3215      DCA .+1
14   01015 7402      HLT
15
16   01016 4347      10$,JMS WOFFX
17   01017 0121      RBUFF+7
18   01020 4776      JMS XFSOS
19
20   01021 4775      11$,JMS MIRROR
21   01022 4774      JMS DUNFL
22   01023 0001      F,X
23   01024 0115      RBUFF+3
24   01025 4774      JMS DUNFL
25   01026 0003      F,Y
26   01027 0117      RBUFF+5
27   01030 7107      CLL IAC RTL
28   01031 1112      TAD RBUFF
29   01032 3112      DCA RBUFF
30
31   01033 4773      12$,JMS SUNFL
32   01034 0000      F,SPD
33   01035 0114      RBUFF+2
34
35   01036 2112      14$,ISZ RBUFF
36   01037 4772      JMS HITPAK
37   01040 0011      9.
38   01041 0061      W.DEL
39   01042 7106      CLL RTL
40   01043 1060      TAD W.AXIS
41   01044 3113      DCA RBUFF+1
42   01045 4771      JMS INSRT
43
44   01046 5600      13$,JMP I INSERT
45
46   01047 1016      1$,10$
47   01050 1055      2$
48   01051 1066      3$
49   01052 1114      4$
50   01053 1133      5$
51   01054 1137      6$
52
53   01055 4347      20$,JMS WOFFX
54   01056 0123      RBUFF+9.
55   01057 4770      JMS HCWPS
56
57   01060 4774      21$,JMS DUNFL
58   01061 0022      F,RAD
59   01062 0121      RBUFF+7
60   01063 2112      ISZ RBUFF
61   01064 2112      ISZ RBUFF
62   01065 5221      JMP 11$
63
64   01066 4347      30$,JMS WOFFX
65   01067 0120      RBUFF+6
66   01070 4773      JMS SUNFL
67   01071 0021      F,PECK.
68   01072 0117      RBUFF+5
69   01073 4407      FENT
70   01074 5030      FGET FP,ZIP
71   01075 6021      FPUT F,PECK
72   01076 0000      FEXT
73   01077 1052      TAD W,Z
74   01100 7650      SNA CLA
75   01101 5307      JMP 31$
76   01102 4407      FENT
77   01103 5005      FGET F,Z
78   01104 0014      FNEG
79   01105 6005      FPUT F,Z
80   01106 0000      FEXT
81
82   01107 4774      31$,JMS DUNFL
83   01110 0005      F,Z
84   01111 0115      RBUFF+3
85   01112 7125      STL IAC RAL
86   01113 5231      JMP 12$-2
87
88   01114 4347      40$,JMS WOFFX
89   01115 0117      RBUFF+5
90   01116 1051      TAD W,TH
91   01117 7650      SNA CLA
92   01120 5326      JMP 41$
93   01121 4407      FENT
94   01122 5007      FGET F,THET
95   01123 0014      FNEG
96   01124 6007      FPUT F,THET
97   01125 0000      FEXT
98
99   01126 4774      41$,JMS DUNFL
100  01127 0007      F,THET
101  01130 0115      RBUFF+3
102  01131 7126      STL RTL
103  01132 5231      JMP 12$-2
104
105  01133 4773      50$,JMS SUNFL
106  01134 0011      F,SSP
107  01135 0114      RBUFF+2
108  01136 5236      JMP 14$
109
110  01137 4773      60$,JMS SUNFL
111  01140 0012      F,THIS
112  01141 0114      RBUFF+2
113  01142 4773      JMS SUNFL
114  01143 0013      F,NEXT
115  01144 0115      RBUFF+3
116  01145 2112      ISZ RBUFF
117  01146 5236      JMP 14$
118
119  01147 0000      WOFFX,0/CHECK FOR OFFSET
120  01150 1747      TAD I WOFFX
121  01151 2347      ISZ WOFFX
122  01152 3363      DCA 1$
123  01153 1064      TAD W,OFF
124  01154 7650      SNA CLA
125  01155 5747      JMP I WOFFX
126  01156 4767      JMS .XIOS
127  01157 2112      ISZ RBUFF
128  01160 2112      ISZ RBUFF
129  01161 4774      JMS DUNFL
130  01162 0023      F,OFFS
131
132  01163 0000      1$,0
133  01164 5747      JMP I WOFFX
134
     01167 0733
     01170 3127
     01171 1200
     01172 2061
     01173 2114
     01174 2132
     01175 6400
     01176 1735
     01177 5647
135  01200

1    01200 0000      INSRT,0/INSERT RECORD
2    01201 2112      ISZ RBUFF
3    01202 1112      TAD RBUFF
4    01203 0377      AND (17)
5    01204 3355      DCA RSIZE
6    01205 1355      TAD RSIZE
7    01206 1376      TAD (RBUFF-1)
8    01207 3311      DCA GET
9    01210 1355      TAD RSIZE
10   01211 3711      DCA I GET
11   01212 1105      TAD PTROT+1
12   01213 3107      DCA P1+1
13   01214 1104      TAD PTBOT
14   01215 3232      DCA 6$
15   01216 4407      FENT
16   01217 5055      FGET NRECS
17   01220 1031      FADD FP,ONE
18   01221 6055      FPUT NRECS
19   01222 0000      FEXT
20   01223 1355      TAD RSIZE
21   01224 4775      JMS INC
22   01225 0104      PTROT
23   01226 1104      TAD PTROT
24   01227 3234      DCA 7$
25   01230 1105      TAD PTROT+1
26   01231 3111      DCA P2+1
27
28   01232 7402      6$,HLT
29   01233 1507      TAD I P1+1
30
31   01234 7402      7$,HLT
32   01235 3511      DCA I P2+1
33   01236 6201      CDF 00
34   01237 1101      TAD PTA+1
35   01240 7041      CIA
36   01241 1107      TAD P1+1
37   01242 7640      SZA CLA
38   01243 5251      JMP 2$
39   01244 1100      TAD PTA
40   01245 7041      CIA
41   01246 1232      TAD 6$
42   01247 7650      SNA CLA
43   01250 5272      JMP 3$
44
45   01251 7340      2$,STA CLL
46   01252 1107      TAD P1+1
47   01253 3107      DCA P1+1
48   01254 7430      SZL
49   01255 5261      JMP 8$
```

```
50  01256 1374    TAD (-10)
51  01257 1232    TAD 6S
52  01260 3232    DCA 6S
53
54  01261 7340    6S,STA CLL
55  01262 1111    TAD P2+1
56  01263 3111    DCA P2+1
57  01264 7430    SZL
58  01265 5232    JMP 6S
59  01266 1374    TAD (-10)
60  01267 1234    TAD 7S
61  01270 3234    DCA 7S
62  01271 5232    JMP 6S
63
64  01272 4773    3S,JMS PTAP
65  01273 0106    P1
66  01274 1355    TAD RSIZE
67  01275 7041    CIA
68  01276 3555    DCA RSIZE
69  01277 1376    TAD (RBUFF-1)
70  01300 3014    DCA XR4
71
72  01301 1414    5S,TAD I XR4
73  01302 4772    JMS PUT
74  01303 0106    P1
75  01304 4775    JMS INC
76  01305 0106    P1
77  01306 2355    ISZ RSIZE
78  01307 5301    JMP 5S
79  01310 5600    JMP I INSRT
80
81  01311 0000    GET,0/FETCH WORD
82  01312 1711    TAD I GET
83  01313 2311    ISZ GET
84  01314 3326    DCA 1S
85  01315 1726    TAD I 1S
86  01316 3322    DCA 2S
87  01317 2326    ISZ 1S
88  01320 1726    TAD I 1S
89  01321 3326    DCA 1S
90
91  01322 7402    2S,HLT
92  01323 1726    TAD I 1S
93  01324 6201    CDF 00
94  01325 5711    JMP I GET
95
96  01326 0000    1S,0
97
98  01327 0000    ARROW,0/PUNCH ARROW
99  01330 1371    TAD (1S-1)
100 01331 3014    DCA XR4
101
102 01332 1414    2S,TAD I XR4
103 01333 7450    SNA
104 01334 5337    JMP 3S
105 01335 4770    JMS PNCH
106 01336 5332    JMP 2S
107
108 01337 1367    3S,TAD (-80,)
109 01340 3014    DCA XR4
110 01341 4770    JMS PNCH
111 01342 2014    ISZ XR4
112 01343 5341    JMP .-2
113 01344 5727    JMP I ARROW
114
115 01345 0002    1S,217
    01346 0007
116
117        0005    .REPT 5,
118
119                2
120
121                .ENDR
122
123 01354 0000    0
124 01355 0000    RSIZE,0
125
126 01356 0000    BPVEC,0
127 01357 0000    0
128 01360 0000    0
129
    01367 7660
    01370 2706
    01371 1344
    01372 1600
    01373 1456
    01374 7770
    01375 1621
    01376 0111
    01377 0017
130 01400

1   01400 0000    SQEEZE,0/CONTRACT FILE
2   01401 4256    JMS PTAP
3   01402 0106    P1
4   01403 4256    JMS PTAP 5   01404 0110    P2
6   01405 4777    JMS GET
7   01406 0100    PTA
8   01407 0376    AND (17)
9   01410 7421    MQL
10  01411 7701    ACL
11  01412 4775    JMS INC
12  01413 0110    P2
13  01414 1110    TAD P2
14  01415 3220    DCA 4S
15  01416 1106    TAD P1
16  01417 3222    DCA 5S
17
18  01420 7402    4S,HLT
19  01421 1511    TAD I P2+1
20
21  01422 7402    5S,HLT
22  01423 3507    DCA I P1+1
23  01424 6201    CDF 00
24  01425 1111    TAD P2+1
25  01426 7041    CIA
26  01427 1105    TAD PTBOT+1
27  01430 7640    SZA CLA
28  01431 5237    JMP 2S
29  01432 1220    TAD 4S
30  01433 7041    CIA
31  01434 1104    TAD PTBOT
32  01435 7650    SNA CLA
33  01436 5252    JMP 3S
34
35  01437 2107    2S,ISZ P1+1
36  01440 5204    JMP 6S
37  01441 1374    TAD (10)
38  01442 1222    TAD 5S
39  01443 3222    DCA 5S
40
41  01444 2111    6S,ISZ P2+1
42  01445 5220    JMP 4S
43  01446 1374    TAD (10)
44  01447 1220    TAD 4S
45  01450 3220    DCA 4S
46  01451 5220    JMP 4S
47
48  01452 7701    3S,ACL
49  01453 4773    JMS DEC
50  01454 0104    PTBOT
51  01455 5600    JMP I SQEEZE
52
53                .ENABL LSB
54
55  01456 0000    PTAP,0/SAVE PTA
56  01457 1656    TAD I PTAP
57  01460 3357    DCA 1S
58  01461 2256    ISZ PTAP
59  01462 1100    TAD PTA
60  01463 3757    DCA I 1S
61  01464 2357    ISZ 1S
62  01465 1101    TAD PTA+1
63  01466 3757    DCA I 1S
64  01467 5656    JMP I PTAP
65
66  01470 0000    PTAG,0/RESTORE PTA
67  01471 1670    TAD I PTAG
68  01472 3357    DCA 1S
69  01473 2270    ISZ PTAG
70  01474 1757    TAD I 1S
71  01475 3100    DCA PTA
72  01476 2357    ISZ 1S
73  01477 1757    TAD I 1S
74  01500 3101    DCA PTA+1
75  01501 5670    JMP I PTAG
76
77  01502 0000    XROOM,0/CHECK ROOM FOR
                                 MAX LENGTH RECORD
78  01503 1372    TAD (MAXRS)
79  01504 4775    JMS INC
80  01505 0104    PTBOT
81  01506 7100    CLL
82  01507 1561    TAD SPACE+1
83  01510 1105    TAD PTBOT+1
84  01511 7630    SZL CLA
85  01512 1374    TAD (10)
86  01513 1360    TAD SPACE
87  01514 1104    TAD PTBOT
88  01515 7710    SPA CLA
89  01516 2302    ISZ XROOM
90  01517 1372    TAD (MAXRS)
91  01520 4773    JMS DEC
92  01521 0104    PTBOT
93  01522 5702    JMP I XROOM
94
95  01523 0000    FFN,0/FAST FETCH NEXT
96  01524 1030    TAD F.EOP
97  01525 7640    SZA CLA
98  01526 5332    JMP 111S
99  01527 2023    ISZ F.NUM
100 01530 4771    JMS FFETCH
```

```
101 01531 5723    JMP I FFN
102
103 01532 4770    111$,JMS FSTRT
104 01533 5723    JMP I FFN
105
106 01534 0000    FETS,0/MOVE FOUND RECORD INTO BUFFER
107 01535 4767    JMS FIND
108 01536 4256    JMS PTAP
109 01537 0106    P1
110 01540 4777    JMS GET
111 01541 0100    PTA
112 01542 0376    AND (17)
113 01543 7041    CIA
114 01544 3357    DCA 1$
115 01545 1366    TAD (RBUFF-1)
116 01546 3014    DCA XR4
117
118 01547 4777    2$,JMS GET
119 01550 0106    P1
120 01551 3414    DCA I XR4
121 01552 4775    JMS INC
122 01553 0106    P1
123 01554 2357    ISZ 1$
124 01555 5347    JMP 2$
125 01556 5734    JMP I FETS
126
127 01557 0000    1$,0
128 01560 1537    SPACE,-6241=7777
    01561 0001
129
130              .OSABL LSB
131
    01566 0111
    01567 2506
    01570 3266
    01571 1674
    01572 0014
    01573 1645
    01574 0010
    01575 1621
    01576 0017
    01577 1311
132 01600

1   01600 0000    PUT,0/STORE WORD
2   01601 3217    DCA 1$
3   01602 1600    TAD I PUT
4   01603 2200    ISZ PUT
5   01604 3220    DCA 2$
6   01605 1620    TAD I 2$
7   01606 3213    DCA 3$
8   01607 2220    ISZ 2$
9   01610 1620    TAD I 2$
10  01611 3220    DCA 2$
11  01612 1217    TAD 1$
12
13  01613 6201    3$,CDF
14  01614 3620    DCA I 2$
15  01615 6201    CDF 00
16  01616 5600    JMP I PUT
17
18  01617 0000    1$,0
19  01620 0000    2$,0
20
21               .ENABL LSB
22
23  01621 0000    INC,0/INCREMENT APS
24  01622 7450    SNA
25  01623 7001    IAC
26  01624 3271    DCA 1$
27  01625 1621    TAD I INC
28  01626 2221    ISZ INC
29  01627 3272    DCA 2$
30  01630 1272    TAD 2$
31  01631 7001    IAC
32  01632 3273    DCA 3$
33  01633 1673    TAD I 3$
34  01634 7100    CLL
35  01635 1271    TAD 1$
36  01636 3673    DCA I 3$
37  01637 7420    SNL
38  01640 5621    JMP I INC
39  01641 1377    TAD (10)
40  01642 1672    TAD I 2$
41  01643 3672    DCA I 2$
42  01644 5621    JMP I INC
43
44  01645 0000    DEC,0/DECREMENT APS
45  01646 7450    SNA
46  01647 7001    IAC
47  01650 7101    CIA CLL
48  01651 3271    DCA 1$
49  01652 1645    TAD I DEC
50  01653 2245    ISZ DEC
51  01654 3272    DCA 2$
52  01655 1272    TAD 2$
53  01656 7001    IAC
54  01657 3273    DCA 3$
55  01660 1673    TAD I 3$
56  01661 1271    TAD 1$
57  01662 3673    DCA I 3$
58  01663 7430    SZL
59  01664 5645    JMP I DEC
60  01665 1376    TAD (-10)
61  01666 1672    TAD I 2$
62  01667 3672    DCA I 2$
63  01670 5645    JMP I DEC
64
65  01671 0000    1$,0
66  01672 0000    2$,0
67  01673 0000    3$,0
68
69               .OSABL LSB
70
71  01674 0000    FFETCH,0/FAST FETCH
72  01675 1023    TAD F.NUM
73  01676 3077    DCA FREC
74  01677 4775    JMS FIND
75  01700 4774    JMS GET
76  01701 0100    PTA
77  01702 7012    RTR
78  01703 7012    RTR
79  01704 0373    AND (17)
80  01705 3024    DCA F.TYPE
81  01706 4221    JMS INC
82  01707 0100    PTA
83  01710 4774    JMS GET
84  01711 0100    PTA
85  01712 3334    DCA 1$
86  01713 1334    TAD 1$
87  01714 7012    RTR
88  01715 4772    JMS HITSEP
89  01716 0000    0
90  01717 0027    F.DEL
91  01720 4245    JMS DEC
92  01721 0100    PTA
93  01722 3040    DCA F.EOF
94  01723 1024    TAD F.TYPE
95  01724 1371    TAD (-7)
96  01725 7650    SNA CLA
97  01726 2040    ISZ F.EOF
98  01727 1334    TAD 1$
99  01730 7006    RTL
100 01731 7204    CLA RAL
101 01732 3037    DCA F.STRT
102 01733 5674    JMP I FFETCH
103
104 01734 0000    1$,0
105
106 01735 0000    XFSOS,0/CHECK FOR START OF SHAPE
107 01736 1064    TAD W.OFF/AT INSERT TIME
108 01737 7650    SNA CLA
109 01740 5735    JMP I XFSOS
110 01741 1121    TAD RBUFF+7
111 01742 7640    SZA CLA
112 01743 5735    JMP I XFSOS
113 01744 1122    TAD RBUFF+8.
114 01745 7650    SNA CLA
115 01746 2071    ISZ W.EOF
116 01747 5735    JMP I XFSOS
117
118 01750 7747    PWR,10,7747/POWERS OF TEN FOR POTWU
119 01751 4540    4540
120 01752 7775    7775
121 01753 4360    4360
122 01754 7777    7777
123 01755 6030    6030
124 01756 7777    7777
125 01757 7634    7634
126 01760 7777    7777
127 01761 7766    7766
128
    01771 7771
    01772 2037
    01773 0017
    01774 1311
    01775 2506
    01776 7770
    01777 0010
129 02000

1               .ENABL LSB
2
3   02000 0000    SFLOAT,0/SINGLE WORD FIX TO FLOAT
4   02001 1600    TAD I SFLOAT
5   02002 3235    DCA 1$
6   02003 2200    ISZ SFLOAT
7   02004 1600    TAD I SFLOAT
8   02005 2200    ISZ SFLOAT
9   02006 3236    DCA 2$
10
11  02007 3021    3$,DCA WORD
```

```
12  02010  1635         TAD I 1S
13  02011  3022         DCA LORD
14  02012  1377         TAD (27)
15  02013  3020         DCA EXP
16  02014  4407         FENT
17  02015  0017         FNOR
18  02016  6636         FPUT I 2S
19  02017  0000         FEXT
20  02020  5600         JMP I SFLOAT
21
22  02021  0000   DFLOAT,0/DOUBLE WORD FIX TO FLOAT
23  02022  1621         TAD I DFLOAT
24  02023  3235         DCA 1S
25  02024  2221         ISZ DFLOAT
26  02025  1621         TAD I DFLOAT
27  02026  2221         ISZ DFLOAT
28  02027  3236         DCA 2S
29  02030  1221         TAD DFLOAT
30  02031  3200         DCA SFLOAT
31  02032  1635         TAD I 1S
32  02033  2235         ISZ 1S
33  02034  5207         JMP 3S
34
35  02035  0000         1S,0
36  02036  0000         2S,0
37
38  02037  0000   BITSEP,0/UNPACK BIT STRING
39  02040  3236         DCA 2S
40  02041  1637         TAD I BITSEP
41  02042  2237         ISZ BITSEP
42  02043  7041         CIA
43  02044  3235         DCA 1S
44  02045  7240         STA
45  02046  1637         TAD I BITSEP
46  02047  2237         ISZ BITSEP
47  02050  3014         DCA XR4
48
49  02051  1236   4S,TAD 2S
50  02052  7010         RAR
51  02053  3236         DCA 2S
52  02054  7004         RAL
53  02055  3414         DCA I XR4
54  02056  2235         ISZ 1S
55  02057  5251         JMP 4S
56  02060  5637         JMP I BITSEP
57
58  02061  0000   BITPAK,0/PAK BIT STRING
59  02062  1661         TAD I BITPAK
60  02063  7041         CIA
61  02064  3235         DCA 1S
62  02065  1661         TAD I BITPAK
63  02066  2261         ISZ BITPAK
64  02067  1661         TAD I BITPAK
65  02070  2261         ISZ BITPAK
66  02071  3237         DCA BITSEP
67
68  02072  3304   5S,DCA DELETE
69  02073  7240         STA
70  02074  1237         TAD BITSEP
71  02075  3237         DCA BITSEP
72  02076  1304         TAD DELETE
73  02077  7104         CLL RAL
74  02100  1637         TAD I BITSEP
75  02101  2235         ISZ 1S
76  02102  5272         JMP 5S
77  02103  5661         JMP I BITPAK
78
79  02104  0000   DELETE,0/DELETE RECORD
80  02105  4776         JMS SQEEZE
81  02106  4407         FENT
82  02107  5055         FGET NRECS
83  02110  2031         FSUB FP.ONE
84  02111  6055         FPUT NRECS
85  02112  0000         FEXT
86  02113  5704         JMP I DELETE
87
88  02114  0000   SUNFL,0/SINGLE WORD UNFLOAT
89  02115  1714         TAD I SUNFL
90  02116  2314         ISZ SUNFL
91  02117  3235         DCA 1S
92  02120  1714         TAD I SUNFL
93  02121  2314         ISZ SUNFL
94  02122  3236         DCA 2S
95  02123  4407         FENT
96  02124  5635         FGET I 1S
97  02125  0011         UNNOR
98  02126  0000         FEXT
99  02127  1022         TAD LORD
100 02130  3636         DCA I 2S
101 02131  5714         JMP I SUNFL
102
103 02132  0000   DUNFL,0/DOUBLE WORD UNFLOAT
104 02133  1732         TAD I DUNFL
105 02134  2332         ISZ DUNFL
106 02135  3235         DCA 1S
107 02136  1732         TAD I DUNFL
108 02137  2332         ISZ DUNFL
109 02140  3236         DCA 2S
110 02141  4407         FENT
111 02142  5635         FGET I 1S
112 02143  0011         UNNOR
113 02144  0000         FEXT
114 02145  1021         TAD HORD
115 02146  3636         DCA I 2S
116 02147  2236         ISZ 2S
117 02150  1022         TAD LORD
118 02151  3636         DCA I 2S
119 02152  5732         JMP I DUNFL
120
121 02153  0000         Z,N0,0
122 02154  0000         Z,N1,0
123 02155               ENVTAB,,BLKW 7,
124
125                     .DSABL LSB
126
    02176  1400
    02177  0027
127 02200

1   02200  0000   WORLD,0/READ WORLD
2   02201  7640         SZA CLA
3   02202  5213         JMP 5S
4   02203  4777         JMS INCON
5   02204  0014         C,X
6   02205  4777         JMS INCON
7   02206  0015         C,Y
8   02207  4777         JMS INCON
9   02210  0016         C,Z
10  02211  4777         JMS INCON
11  02212  0017         C,THET
12
13  02213  1376   5S,TAD (100)
14  02214  6400         6400
15  02215  1375         TAD (DSPTCH-101)
16  02216  3014         DCA XR4
17
18  02217  1414   1S,TAD I XR4
19  02220  7450         SNA
20  02221  5226         JMP 3S
21  02222  3321         DCA LTSON
22  02223  6417         6417
23  02224  3721         DCA I LTSON
24  02225  5217         JMP 1S
25
26  02226  1040   3S,TAD F.EOF
27  02227  3071         DCA W,EOF
28  02230  4774         JMS BITPAK
29  02231  0004         4
30  02232  2303         B,AUX1
31  02233  3057         DCA W,AUX
32  02234  1773         TAD WAXIS
33  02235  3060         DCA W,AXIS
34  02236  6604         6604
35  02237  4772         JMS BITSEP
36  02240  0004         4
37  02241  0051         M,TH
38  02242  6605         6605
39  02243  4772         JMS BITSEP
40  02244  0004         4
41  02245  0045         AUX,TH
42  02246  5600         JMP I WORLD
43
44  02247  2302         DSPTCH,B,CIS
45  02250  0070         W,CENT
46  02251  0067         W,CCW
47  02252  0064         W,OFF
48  02253  0065         W,SENS
49  02254  0061         W,DEL
50  02255  0063         W,HOLD
51  02256  0062         W,EOP
52  02257  2301         B,Z
53  02260  2300         B,TH
54  02261  0066         W,AUTO
55  02262  2277         B,SSP
56  02263  0041         B,ADX
57  02264  0042         B,ADY
58  02265  0043         B,ADZ
59  02266  0044         B,ADTH
60  02267  2303         B,AUX1
61  02270  2304         B,AUX2
62  02271  2305         B,AUX3
63  02272  2306         B,AUX4
64  02273  2276         B,TS
65  02274  0071         W,EOF
66  02275  0000         DSPEND,0
67
68  02276  0000         B,TS,0
69  02277  0000         B,SSP,0
70  02300  0000         B,TH,0
71  02301  0000         B,Z,0
72  02302  0000         B,CIS,0
73  02303  0000         B,AUX1,0
74  02304  0000         B,AUX2,0
```

```
75  02305 0000          B,AUX3,0
76  02306 0000          B,AUX4,0
77
78  02307 0000          LTSOFF,0/ALL LIGHTS OFF
79  02310 1376          TAD (100)
80  02311 6400          6400
81  02312 1371          TAD (DSPTCH-DSPEND-100)
82  02313 3014          DCA XR4
83
84  02314 6415          1S,6415
85  02315 2014          ISZ XR4
86  02316 5314          JMP 1S
87  02317 4200          JMS WORLD
88  02320 5707          JMP I LTSOFF
89
90  02321 0000          LTSON,0/LIGHTS ON
91  02322 1057          TAD W,AUX
92  02323 4772          JMS BITSEP
93  02324 0004          4
94  02325 2303          B,AUX1
95  02326 1056          TAD W,TYPE
96  02327 1370          TAD (ISZ I 2S)
97  02330 3331          DCA .+1
98  02331 7402          HLT
99  02332 1376          TAD (100)
100 02333 6400          6400
101 02334 1375          TAD (DSPTCH-101)
102 02335 3014          DCA XR4
103 02336 1040          TAD F,EOF
104 02337 7640          SZA CLA
105 02340 5345          JMP 1S-1
106 02341 1060          TAD W,AXIS
107 02342 6603          6603
108 02343 3773          DCA WAXIS
109 02344 7410          SKP
110 02345 3062          DCA W,EOP
111
112 02346 1414          1S,TAD I XR4
113 02347 7450          SNA
114 02350 5771          JMP I LTSON
115 02351 3200          DCA WORLD
116 02352 1600          TAD I WORLD
117 02353 7640          SZA CLA
118 02354 6412          6412
119 02355 6401          6401
120 02356 5346          JMP 1S
121
122 02357 2200          2S,WORLD;B,CIS;B,
                          Z;B,TH;B,SSP;B,TS;WORLD;WORLD
    02360 2302
    02361 2301
    02362 2300
    02363 2277
    02364 2276
    02365 2200
    02366 2200
123
    02370 2757
    02371 7652
    02372 2057
    02373 5051
    02374 2061
    02375 2146
    02376 0100
    02377 3600
124 02400

1   02400 0000          EVALT,0/EVALUATE RECORD TYPE
2   02401 1377          TAD (B,TS-1)
3   02402 3014          DCA XR4
4   02403 1376          TAD (5)
5
6   02404 3223          2S,DCA 1S
7   02405 1223          TAD 1S
8   02406 7650          SNA CLA
9   02407 5216          JMP 3S
10  02410 1414          TAD I XR4
11  02411 7640          SZA CLA
12  02412 5216          JMP 3S
13  02413 7240          STA
14  02414 1223          TAD 1S
15  02415 5204          JMP 2S
16
17  02416 1223          3S,TAD 1S
18  02417 3056          DCA W,TYPE
19  02420 1056          TAD W,TYPE
20  02421 1375          TAD (JMP I 4S)
21  02422 3223          DCA .+1
22
23  02423 7402          1S,HLT
24
25  02424 4267          10S,JMS VSET
26  02425 0002          2
27  02426 0067          W,CCW
28  02427 5600          JMP I EVALT 29
30  02430 4267          12S,JMS VSET
31  02431 0005          5
32  02432 0064          W,OFF
33
34  02433 5600          11S,JMP I EVALT
35
36  02434 2424          4S,10S;11S;10S;10S;12S;12S
    02435 2433
    02436 2424
    02437 2424
    02440 2430
    02441 2430
37
38                      .ENABL LSB
39
40  02442 0000          MOVE,0/MOVE BLOCK
41  02443 1642          TAD I MOVE
42  02444 7041          CIA
43  02445 3264          DCA 1S
44  02446 2242          ISZ MOVE
45  02447 1642          TAD I MOVE
46  02450 3265          DCA 2S
47  02451 2242          ISZ MOVE
48  02452 1642          TAD I MOVE
49  02453 3266          DCA 3S
50  02454 2242          ISZ MOVE
51
52  02455 1665          14S,TAD I 2S
53  02456 3666          DCA I 3S
54  02457 2265          ISZ 2S
55  02460 2266          ISZ 3S
56  02461 2264          ISZ 1S
57  02462 5255          JMP 14S
58  02463 5642          JMP I MOVE
59
60  02464 0000          1S,0
61  02465 0000          2S,0
62  02466 0000          3S,0
63
64  02467 0000          VSET,0/SET BLOCK TO AC VALUE
65  02470 3264          DCA 1S
66  02471 1667          TAD I VSET
67  02472 7041          CIA
68  02473 3265          DCA 2S
69  02474 2267          ISZ VSET
70  02475 1667          TAD I VSET
71  02476 2267          ISZ VSET
72  02477 3266          DCA 3S
73
74  02500 1264          15S,TAD 1S
75  02501 3666          DCA I 3S
76  02502 2266          ISZ 3S
77  02503 2265          ISZ 2S
78  02504 5300          JMP 15S
79  02505 5667          JMP I VSET
80
81                      .DSABL LSB
82
83  02506 0000          FIND,0/LOCATE RECORD
84  02507 7100          CLL
85  02510 1077          TAD FREC
86  02511 7041          CIA
87  02512 1076          TAD RECI
88  02513 7650          SNA CLA
89  02514 5706          JMP I FIND
90  02515 7420          SNL
91  02516 5332          JMP 2S
92  02517 4774          JMS DEC
93  02520 0100          PTA
94  02521 4773          JMS GET
95  02522 0100          PTA
96  02523 1372          TAD (-1)
97  02524 4774          JMS DEC
98  02525 0100          PTA
99  02526 7240          STA
100 02527 1076          TAD RECI
101 02530 3076          DCA RECI
102 02531 5307          JMP FIND+1
103
104 02532 2076          2S,ISZ RECI
105 02533 4773          JMS GET
106 02534 0100          PTA
107 02535 0371          AND (17)
108 02536 4770          JMS INC
109 02537 0100          PTA
110 02540 5307          JMP FIND+1
111
112 02541 0000          ZEDER,0/ZERO ENVIRONMENTAL VARIABLES
113 02542 4407          FENT
114 02543 5030          FGET FP,ZIP
115 02544 6000          FPUT F,SPD
116 02545 6001          FPUT F,X
117 02546 6003          FPUT F,Y
118 02547 6005          FPUT F,Z
119 02550 6021          FPUT F,PECK
120 02551 6022          FPUT F,RAD
```

```
121  02552  6023        FPUT F,OFFS
122  02553  6007        FPUT F,THET
123  02554  6011        FPUT F,SSP
124  02555  6013        FPUT F,NEXT
125  02556  6012        FPUT F,THIS
126  02557  0000        FEXT
127  02560  5741        JMP I ZEDER
128
     02570  1621
     02571  0017
     02572  7777
     02573  1311
     02574  1645
     02575  5634
     02576  0005
     02577  2275
129  02600

1                       .ENABL LSB
2
3    02600  4777        Q,PNCH,JMS ARROW/PUNCH FROM POINT
4    02601  4265        JMS LPUN
5
6    02602  1055        1$,TAD W,NUM
7    02603  3023        DCA F,NUM
8    02604  4776        JMS FETCH
9    02605  4775        JMS PDTWU
10   02606  0020        W,SEQ
11
12   02607  7240        3$,STA
13   02610  1112        TAD RBUFF
14   02611  3112        DCA RBUFF
15   02612  1112        TAD RBUFF
16   02613  0374        AND (17)
17   02614  7041        CIA
18   02615  3016        DCA XR6
19   02616  1373        TAD (RBUFF-1)
20   02617  3014        DCA XR4
21   02620  3333        DCA CSUM
22   02621  1372        TAD (100)
23   02622  4306        JMS PNCH
24
25   02623  1414        2$,TAD I XR4
26   02624  7421        MQL
27   02625  7701        ACL
28   02626  1333        TAD CSUM
29   02627  3333        DCA CSUM
30   02630  4275        JMS PPR
31   02631  2016        ISZ XR6
32   02632  5223        JMP 2$
33   02633  1333        TAD CSUM
34   02634  7421        MQL
35   02635  4275        JMS PPR
36   02636  4265        JMS LPUN
37   02637  1040        TAD F,EOF
38   02640  7640        SZA CLA
39   02641  5256        JMP 4$
40   02642  2055        ISZ W,NUM
41   02643  4771        JMS SFLOAT
42   02644  0055        W,NUM
43   02645  0020        W,SEQ
44   02646  4325        JMS STOPX
45   02647  7410        SKP
46   02650  5202        JMP 1$
47   02651  4770        JMS SUNFL
48   02652  0055        NRECS
49   02653  0023        F,NUM
50   02654  4776        JMS FETCH
51   02655  5207        JMP 3$
52
53   02656  1367        4$,TAD (-80.)
54   02657  3535        DCA 90$
55   02660  4306        JMS PNCH
56   02661  2335        ISZ 90$
57   02662  5260        JMP .-2
58   02663  4777        JMS ARROW
59   02664  5766        JMP Q,SSA
60
61   02665  0000        LPUN,0/PUNCH LEADER
62   02666  1365        TAD(-4)
63   02667  3335        DCA 90$
64   02670  1364        TAD (200)
65   02671  4306        JMS PNCH
66   02672  2335        ISZ 90$
67   02673  5270        JMP .-3
68   02674  5665        JMP I LPUN
69
70   02675  0000        PPR,0/PUNCH PAIR
71   02676  7701        ACL
72   02677  7002        BSW
73   02700  0363        AND (77)
74   02701  4306        JMS PNCH
75   02702  7701        ACL
76   02703  0363        AND (77)
77   02704  4306        JMS PNCH
78   02705  5675        JMP I PPR 79
80   02706  0000        PNCH,0/PUNCH ONE
81   02707  6026        PLS
82   02710  7200        CLA
83   02711  1362        TAD (-30.)
84   02712  3334        DCA WAITK
85
86   02713  2336        22$,ISZ 91$
87   02714  5322        JMP 22$
88   02715  2334        ISZ WAITK
89   02716  5322        JMP 22$
90   02717  4761        JMS ERRPT
91   02720  0002        2
92   02721  5766        JMP Q,SSA
93
94   02722  6021        22$,PSF
95   02723  5315        JMP 20$
96   02724  5706        JMP I PNCH
97
98   02725  0000        STOPX,0/CHECK FOR STOP
99   02726  7346        STA CLL RTL
100  02727  1126        TAD INTVAL
101  02730  7640        SZA CLA
102  02731  2325        ISZ STOPX
103  02732  5725        JMP I STOPX
104
105  02733  0000        CSUM,0
106  02734  0000        WAITK,0
107  02735  0000        90$,0
108  02736  0000        91$,0
109  02737  0000        SETIVN,F,SPD
110  02740  0001        F,X
111  02741  0003        F,Y
112  02742  0005        F,Z
113  02743  0021        F,PECK
114  02744  0022        F,RAD
115  02745  0023        F,OFFS
116  02746  0024        F,N
117  02747  4003        4003
118  02750  4000        4000
119  02751  4001        4001
120  02752  4002        4002
121  02753  0007        F,THET
122  02754  0011        F,SSP
123  02755  0013        F,NEXT
124  02756  0012        F,THIS
125
126                     .DSABL LSB
127
     02761  3200
     02762  7742
     02763  0077
     02764  0200
     02765  7774
     02766  5631
     02767  7660
     02770  2114
     02771  2000
     02772  0100
     02773  0111
     02774  0017
     02775  3400
     02776  0600
     02777  1327
128  03000

1                       .ENABL LSB
2
3    03000  4777        Q,RDR,JMS XROOM/READ AND
                                       INSERT FROM TAPE
4    03001  5251        JMP 50$
5    03002  1055        TAD W,NUM
6    03003  3077        DCA FREC
7    03004  4776        JMS FIND
8    03005  4307        JMS 60$
9    03006  7410        SKP
10   03007  5205        JMP .-2
11   03010  4307        JMS 60$
12   03011  5210        JMP .-1
13   03012  1324        TAD RCHAR
14   03013  1375        TAD (-100)
15   03014  7640        SZA CLA
16   03015  5246        JMP 52$
17   03016  4307        JMS 60$
18   03017  5246        JMP 52$
19   03020  1374        TAD (RBUFF-1)
20   03021  3014        DCA XR4
21
22   03022  3773        51$,DCA CSUM
23   03023  1324        TAD RCHAR
24   03024  3325        DCA 70$
25   03025  4307        JMS 60$
26   03026  5246        JMP 52$
27   03027  1324        TAD RCHAR
28   03030  3326        DCA 71$
29   03031  4307        JMS 60$
```

```
30  03032 5254   JMP 53$
31  03033 4301   JMS 80$
32  03034 1014   TAD XR4
33  03035 7041   CIA
34  03036 1372   TAD (RBUFF+MAXRS-1)
35  03037 7750   SPA SNA CLA
36  03040 5246   JMP 52$
37  03041 1325   TAD 70$
38  03042 3414   DCA I XR4
39  03043 1325   TAD 70$
40  03044 1773   TAD CSUM
41  03045 5222   JMP 51$
42
43  03046 4771   52$,JMS ERRPT
44  03047 0001   1
45  03050 5770   JMP 0,SSA
46
47  03051 4771   50$,JMS ERRPT
48  03052 0000   0
49  03053 5770   JMP 0,SSA
50
51  03054 4301   53$,JMS 80$
52  03055 1325   TAD 70$
53  03056 7041   CIA
54  03057 1773   TAD CSUM
55  03060 7640   SZA CLA
56  03061 5246   JMP 52$
57  03062 1112   TAD RBUFF
58  03063 0367   AND (360)
59  03064 1366   TAD (-160)
60  03065 7650   SNA CLA
61  03066 5770   JMP 0,SSA
62  03067 6002   IOF
63  03070 4765   JMS INSRT
64  03071 2055   ISZ W.NUM
65  03072 4764   JMS PDTWU
66  03073 0020   W,SEQ
67  03074 4763   JMS SFLOAT
68  03075 0055   W,NUM
69  03076 0020   W,SEQ
70  03077 6001   ION
71  03100 5200   JMP 0,RDR
72
73  03101 0000   80$,0/ASSEMBLE BYTE PAIR
74  03102 1325   TAD 70$
75  03103 7002   BSW
76  03104 1326   TAD 71$
77  03105 3325   DCA 70$
78  03106 5701   JMP I 80$
79
80  03107 0000   60$,0/READ CHARACTER
81  03110 6014   RFC
82
83  03111 4762   61$,JMS STOPX
84  03112 5770   JMP 0,SSA
85  03113 6011   RSF
86  03114 5311   JMP 61$
87  03115 6012   RRB
88  03116 3324   DCA RCHAR
89  03117 1324   TAD RCHAR
90  03120 1361   TAD (-200)
91  03121 7640   SZA CLA
92  03122 2307   ISZ 60$
93  03123 5707   JMP I 60$
94
95  03124 0000   RCHAR,0
96  03125 0000   70$,0
97  03126 0000   71$,0
98
99  03127 0000   MCWPS,0/MIRROR CIRCLE
                         PARAMETERS MAYBE
100 03130 7344   STA CLL RAL
101 03131 1054   TAD M,X
102 03132 1053   TAD M,Y
103 03133 7450   SNA
104 03134 5727   JMP I MCWPS
105 03135 7001   IAC
106 03136 7640   SZA CLA
107 03137 5727   JMP I MCWPS
108 03140 1067   TAD W,CCW
109 03141 7650   SNA CLA
110 03142 7001   IAC
111 03143 3067   DCA W,CCW
112 03144 1070   TAD W,CENT
113 03145 7650   SNA CLA
114 03146 7001   IAC
115 03147 3070   DCA W,CENT
116 03150 5727   JMP I MCWPS
117
118         .DSAHL LSB
119
    03161 7600
    03162 2725
    03163 2000
    03164 3400
    03165 1200
    03166 7620
    03167 0360
    03170 5631
    03171 3200
    03172 0125
    03173 2735
    03174 0111
    03175 7700
    03176 2506
    03177 1502
120 03200

1   03200 0000   ERRPT,0/ERROR REPORT
2   03201 3127   DCA VMASK
3   03202 3126   DCA INTVAL
4   03203 1600   TAD I ERRPT
5   03204 3232   DCA 1$
6   03205 2200   ISZ ERRPT
7   03206 4777   JMS SFLOAT
8   03207 3232   1$
9   03210 0025   E,NUM
10
11  03211 4776   2$,JMS PDTWU
12  03212 0025   E,NUM
13  03213 4233   JMS 3$
14  03214 1375   TAD (32)
15  03215 6400   6400
16  03216 7240   STA
17  03217 6405   6405
18  03220 6405   6405
19  03221 6405   6405
20  03222 6405   6405
21  03223 4233   JMS 3$
22  03224 1126   TAD INTVAL
23  03225 7650   SNA CLA
24  03226 5211   JMP 2$
25  03227 4776   JMS PDTWU
26  03230 0020   W,SEQ
27  03231 5600   JMP I ERRPT
28
29  03232 0000   1$,0
30
31  03233 0000   3$,0/DELAY APPROX .5 SECONDS
32  03234 1374   TAD (-30,)
33  03235 3014   DCA XR4
34  03236 3015   DCA XR5
35  03237 2015   ISZ XR5
36  03240 5237   JMP .-1
37  03241 2014   ISZ XR4
38  03242 5237   JMP .-3
39  03243 5633   JMP I 3$
40
41  03244 0000   VCTEF,0/FETCH VARIABLE CONVERSION
42  03245 7106   CLL RTL/TABLE ENTRY
43  03246 7004   RAL
44  03247 1373   TAD (VCTST-1)
45  03250 3014   DCA XR4
46  03251 1372   TAD (-8,)
47  03252 3016   DCA XR6
48  03253 7240   STA
49  03254 1644   TAD I VCTEF
50  03255 2244   ISZ VCTEF
51  03256 3015   DCA XR5
52
53  03257 6211   4$,CDF 10
54  03260 1414   TAD I XR4
55  03261 6201   CDF 00
56  03262 3415   DCA I XR5
57  03263 2016   ISZ XR6
58  03264 5257   JMP 4$
59  03265 5644   JMP I VCTEF
60
61  03266 0000   FSTRT,0/FAST FIND FIRST RECORD
62  03267 1075   TAD FFOUND
63  03270 7640   SZA CLA
64  03271 5321   JMP 63$
65  03272 1023   TAD F,NUM
66  03273 7041   CIA
67  03274 3175   DCA T,15
68  03275 3023   DCA F,NUM
69
70  03276 3174   66$,DCA T,14
71  03277 4771   JMS FFETCH
72  03300 4770   JMS PTAP
73  03301 3331   65$
74  03302 7410   SKP
75
76  03303 4771   64$,JMS FFETCH
77  03304 1175   TAD T,15
78  03305 1023   TAD F,NUM
79  03306 2623   ISZ F,NUM
80  03307 7650   SNA CLA
81  03310 5316   JMP 62$
82  03311 1030   TAD F,EOP
83  03312 7650   SNA CLA
84  03313 5303   JMP 64$
```

```
85  03314 1023       TAD F,NUM
86  03315 5276       JMP 66$
87
88  03316 2075    62$,ISZ FFOUND
89  03317 1174       TAD T,14
90  03320 3074       DCA FOUNDF
91
92  03321 1074    63$,TAD FOUNDF
93  03322 3023       DCA F,NUM
94  03323 1023       TAD F,NUM
95  03324 3076       DCA RECI
96  03325 4767       JMS PTAG
97  03326 3331    65$,JMS FFETCH
98  03327 4771       JMS FFETCH
99  03330 5666       JMP I FSTRT
100
101 03331 0000    65$,0/0
    03332 0000
102
103 03333 0000    FINDN,0/FIND NEXT XY PLANE RECORD
104 03334 1023       TAD F,NUM
105 03335 7041       CIA
106 03336 3244       DCA VCTEF
107
108 03337 4766    1$,JMS FFN
109 03340 7240       STA
110 03341 1024       TAD F,TYPE
111 03342 7740       SZA SMA CLA
112 03343 5337       JMP 1$
113 03344 1023       TAD F,NUM
114 03345 1244       TAD VCTEF
115 03346 7650       SNA CLA
116 03347 5733       JMP I FINDN
117 03350 1027       TAD F,DEL
118 03351 7640       SZA CLA
119 03352 5337       JMP 1$
120 03353 2333       ISZ FINDN
121 03354 5733       JMP I FINDN
122
    03366 1523
    03367 1470
    03370 1456
    03371 1674
    03372 7770
    03373 3377
    03374 7742
    03375 0032
    03376 3400
    03377 2000
123 03400

1   03400 0000    POTWU,0/OUTPUT CONVERSION
2   03401 1600       TAD I POTWU
3   03402 2200       ISZ POTWU
4   03403 4777       JMS VCTEF
5   03404 0160       T,0
6   03405 1376       TAD (PWR,10)
7   03406 3320       DCA 80$
8   03407 7001       IAC
9   03410 1320       TAD 80$
10  03411 3521       DCA 80$+1
11  03412 1375       TAD (82$)
12  03413 3331       DCA 83$
13  03414 1374       TAD (-5)
14  03415 3332       DCA 84$
15  03416 4407       FENT
16  03417 5560       FGET I T,0
17  03420 0011       UNNOR
18  03421 0000       FEXT
19  03422 1021       TAD HORD
20  03423 7700       SMA CLA
21  03424 5237       JMP 5$
22  03425 7100       CLL
23  03426 1022       TAD LORD
24  03427 7041       CIA
25  03430 3022       DCA LORD
26  03431 1021       TAD HORD
27  03432 7040       CMA
28  03433 7430       SZL
29  03434 7001       IAC
30  03435 3021       DCA HORD
31  03436 1373       TAD (14,)
32
33  03437 3322    5$,DCA 81$
34
35  03440 3731    6$,DCA I 83$
36
37  03441 7100    7$,CLL
38  03442 1022       TAD LORD
39  03443 1721       TAD I 80$+1
40  03444 7421       MQL
41  03445 7004       RAL
42  03446 1021       TAD HORD
43  03447 1720       TAD I 80$ 44  03450 7500       SMA
45  03451 5313       JMP 8$
46  03452 7200       CLA
47  03453 2321       ISZ 80$+1
48  03454 2321       ISZ 80$+1
49  03455 2320       ISZ 80$
50  03456 2320       ISZ 80$
51  03457 2331       ISZ 83$
52  03460 2332       ISZ 84$
53  03461 5240       JMP 6$
54  03462 1022       TAD LORD
55  03463 3731       DCA I 83$
56  03464 1166       TAD T,6
57  03465 6400       6400
58  03466 7200       CLA
59  03467 1165       TAD T,5
60  03470 7650       SNA CLA
61  03471 5275       JMP 11$
62  03472 1322       TAD 81$
63  03473 6405       6405
64  03474 7200       CLA
65
66  03475 1167    11$,TAD T,7
67  03476 7041       CIA
68  03477 3332       DCA 84$
69  03500 1332       TAD 84$
70  03501 1372       TAD (6)
71  03502 1375       TAD (82$)
72  03503 3331       DCA 83$
73
74  03504 1731    12$,TAD I 83$
75  03505 6405       6405
76  03506 7200       CLA
77  03507 2331       ISZ 83$
78  03510 2332       ISZ 84$
79  03511 5304       JMP 12$
80
81  03512 5600    13$,JMP I POTWU
82
83  03513 3021    8$,DCA HORD
84  03514 7701       ACL
85  03515 3022       DCA LORD
86  03516 2731       ISZ I 83$
87  03517 5241       JMP 7$
88
89  03520 0000    80$,0/0
    03521 0000
90  03522 0000    81$,0
91  03523 0000    82$,0/0/0/0/0/0
    03524 0000
    03525 0000
    03526 0000
    03527 0000
    03530 0000
92  03531 0000    83$,0
93  03532 0000    84$,0
94
95  03533 0000    REPOFF,0/CHECK FOR REPLACE OFFSET
96  03534 1024       TAD F,TYPE/AT REPEAT TIME
97  03535 4771       JMS EVALRT
98  03536 1177       TAD TARTYP
99  03537 7640       SZA CLA
100 03540 5733       JMP I REPOFF
101 03541 2333       ISZ REPOFF
102 03542 1032       TAD F,OFF
103 03543 7650       SNA CLA
104 03544 5733       JMP I REPOFF
105 03545 1037       TAD F,STRT
106 03546 7640       SZA CLA
107 03547 5733       JMP I REPOFF
108 03550 1134       TAD W,OFFI
109 03551 7650       SNA CLA
110 03552 5733       JMP I REPOFF
111 03553 4407       FENT
112 03554 5066       FGET TOFFS
113 03555 6023       FPUT F,OFFS
114 03556 0000       FEXT
115 03557 5733       JMP I REPOFF
116
117 03560 0000    CNTRIN,0/READ COUNTERS FROM BANK 1
118 03561 3363       DCA .+2
119 03562 4770       JMS INCON
120 03563 0000       0
121 03564 6213       CDI 10
122 03565 5760       JMP I CNTRIN
123
    03570 3600
    03571 5135
    03572 0006
    03573 0016
    03574 7773
    03575 3523
    03576 1750
    03577 3244
124 03600
```

```
  1                    .ENABL LSB
  2
  3    03600  0000     INCON,0/CONVERT INPUT FROM
  4    03601  1600     TAD I INCON/PAD OR COUNTERS
  5    03602  2200     ISZ INCON
  6    03603  4777     JMS VCTEF
  7    03604  0160     T,0
  8    03605  1166     TAD T,6
  9    03606  7710     SPA CLA
 10    03607  5776     JMP 1$
 11    03610  1375     TAD (6420)
 12    03611  3335     DCA 21$
 13    03612  3351     DCA 91$
 14    03613  3352     DCA 92$
 15    03614  1374     TAD (-7)
 16    03615  3353     DCA 93$
 17    03616  3021     DCA HORD
 18    03617  3022     DCA LORD
 19    03620  3024     DCA EXP
 20
 21    03621  4334     5$,JMS 20$
 22    03622  2335     ISZ 21$
 23    03623  1373     TAD (-15.)
 24    03624  7450     SNA
 25    03625  5242     JMP 4$
 26    03626  1372     TAD (15.-11.)
 27    03627  7650     SNA CLA
 28    03630  5341     JMP 3$
 29    03631  7701     ACL
 30    03632  3355     DCA 94$+1
 31    03633  4407     FENT
 32    03634  3032     FMPY FP.TEN
 33    03635  1354     FADD 94$
 34    03636  0000     FEXT
 35    03637  1351     TAD 91$
 36    03640  1352     TAD 92$
 37    03641  3352     DCA 92$
 38
 39    03642  2353     4$,ISZ 93$
 40    03643  5221     JMP 5$
 41    03644  4334     JMS 20$
 42    03645  1371     TAD (-14.)
 43    03646  7640     SZA CLA
 44    03647  5253     JMP 6$
 45    03650  4407     FENT
 46    03651  0014     FNEG
 47    03652  0000     FEXT
 48
 49    03653  1352     6$,TAD 92$
 50    03654  7450     SNA
 51    03655  5264     JMP 7$
 52    03656  7001     IAC
 53    03657  3352     DCA 92$
 54    03660  4407     FENT
 55    03661  4032     FDIV FP.TEN
 56    03662  0000     FEXT
 57    03663  5253     JMP 6$
 58
 59    03664  6606     7$,6606
 60    03665  5274     JMP 8$
 61    03666  1162     TAD T,2
 62    03667  7650     SNA CLA
 63    03670  5274     JMP 8$
 64    03671  4407     FENT
 65    03672  4362     FDIV METCON
 66    03673  0000     FEXT
 67
 68    03674  4407     8$,FENT
 69    03675  3561     FMPY I T,1
 70    03676  0012     FRND
 71    03677  0011     UNNOR
 72    03700  0017     FNOR
 73    03701  6053     FPUT WFT,0
 74    03702  0000     FEXT
 75    03703  1165     TAD T,5
 76    03704  7640     SZA CLA
 77    03705  5311     JMP 12$
 78    03706  4407     FENT
 79    03707  7345     FJMP 13$
 80    03710  0004     LTZ
 81
 82    03711  0000     12$,FEXT
 83    03712  4407     FENT
 84    03713  0006     FABS
 85    03714  2563     FSUM I T,3
 86    03715  7345     FJMP 13$
 87    03716  0002     GTZ
 88    03717  0000     FEXT
 89    03720  2200     ISZ INCON
 90    03721  1164     TAD T,4
 91    03722  7650     SNA CLA
 92    03723  5327     JMP 10$
 93    03724  1564     TAD I T,4
 94    03725  7640     SZA CLA
 95    03726  2160     ISZ T,0
 96
 97    03727  4407     10$,FENT
 98    03730  5053     FGET WFT,0
 99
100    03731  6560     11$,FPUT I T,0
101    03732  0000     FEXT
102    03733  5600     JMP I INCON
103
104    03734  0000     20$,0/READ DIGIT
105
106    03735  0000     21$,0
107    03736  7421     MQL
108    03737  7701     ACL
109    03740  5734     JMP I 20$
110
111    03741  7240     3$,STA
112    03742  3351     DCA 91$
113    03743  3352     DCA 92$
114    03744  5242     JMP 4$
115
116    03745  0000     13$,FEXT
117    03746  4774     JMS ERRPT
118    03747  0003     3
119    03750  5600     JMP I INCON
120
121    03751  0000     91$,0
122    03752  0000     92$,0
123    03753  0000     93$,0
124    03754  0013     94$,13;0;0
       03755  0000
       03756  0000
125    03757  0012     95$,12;372;0;0
       03760  3720
       03761  0000
126    03762  0005     METCON,5;3131;4631
       03763  3131
       03764  4631
127
       03770  3200
       03771  7762
       03772  0004
       03773  7761
       03774  7771
       03775  6420
       03776  4000
       03777  3244
128    04000

1    04000  1377     1$,TAD (T,10-1)/COUNTER INPUT
  2    04001  3017     DCA XR7
  3    04002  4776     JMS RECOUN
  4    04003  4776     JMS RECOUN
  5    04004  1170     TAD T,10
  6    04005  7041     CIA
  7    04006  1173     TAD T,13
  8    04007  7640     SZA CLA
  9    04010  5200     JMP 1$
 10    04011  1171     TAD T,11
 11    04012  7041     CIA
 12    04013  1174     TAD T,14
 13    04014  7640     SZA CLA
 14    04015  5200     JMP 1$
 15    04016  1170     TAD T,10
 16    04017  4240     JMS 30$
 17    04020  6053     FPUT WFT,0
 18    04021  0000     FEXT
 19    04022  1171     TAD T,11
 20    04023  4240     JMS 30$
 21    04024  3775     FMPY 95$
 22    04025  1053     FADD WFT,0
 23    04026  0000     FEXT
 24    04027  1172     TAD T,12
 25    04030  7650     SNA CLA
 26    04031  5235     JMP 15$
 27    04032  4407     FENT
 28    04033  0014     FNEG
 29    04034  0000     FEXT
 30
 31    04035  4407     15$,FENT
 32    04036  7774     FJMP 11$
 33    04037  0007     UNK
 34
 35    04040  0000     30$,0/BCD TO BIN
 36    04041  3273     DCA 97$
 37    04042  1273     TAD 97$
 38    04043  0373     AND (7400)
 39    04044  7110     CLL RAR
 40    04045  3274     DCA 98$
 41    04046  1274     TAD 98$
 42    04047  7012     RTR
 43    04050  1274     TAD 98$
 44    04051  1273     TAD 97$
 45    04052  0372     AND (7760)
 46    04053  3274     DCA 98$
 47    04054  1274     TAD 98$
 48    04055  7110     CLL RAR
 49    04056  1274     TAD 98$
 50    04057  7012     RTR
```

```
51  04060 7041         CIA
52  04061 1273         TAD 97$
53  04062 3271         DCA 96$+1
54  04063 4407         FENT
55  04064 5270         FGET 96$
56  04065 0017         FNOM
57  04066 7640         FJMP I 34$
58  04067 0007         UNK
59
60  04070 0013         96$,131010
    04071 0000
    04072 0000
61  04073 0000         97$,0
62  04074 0000         98$,0
63
64                     .DSABL LSB
65
66  04075 0014         R.MEMD,FNEG/DELETE N RECORDS
67  04076 0011         UNNOR
68  04077 6175         FPUT T,15
69  04100 5030         FGET FP.ZIP
70  04101 6024         FPUT F,N
71  04102 0000         FEXT
72
73  04103 1040         1$,TAD F.EOF
74  04104 7640         SZA CLA
75  04105 5771         JMP R.SSS
76  04106 4770         JMS DELETE
77  04107 4767         JMS FFETCH
78  04110 2177         ISZ T,17
79  04111 5303         JMP 1$
80  04112 5771         JMP R.SSS
81
82  04113 0000         MAYBC,0/CHECK FOR CYCLE ON EOF
83  04114 1040         TAD F.EOF
84  04115 7650         SNA CLA
85  04116 5713         JMP I MAYBC
86  04117 4766         JMS EVALT
87  04120 3054         DCA M,X
88  04121 3053         DCA M,Y
89  04122 3052         DCA M,Z
90  04123 3051         DCA M,TH
91  04124 1365         TAD (-8.)
92  04125 3127         DCA VMASK
93  04126 1364         TAD (ZERROR)
94  04127 3763         DCA RSEQU
95  04130 4407         FENT
96  04131 5001         FGET F,X
97  04132 6101         FPUT X,COMP
98  04133 5003         FGET F,Y
99  04134 6102         FPUT Y,COMP
100 04135 0000         FEXT
101 04136 1056         TAD W,TYPE
102 04137 1362         TAD (JMS I 1$)
103 04140 3341         DCA .+1
104 04141 7402         HLT
105 04142 4407         FENT
106 04143 5101         FGET X,COMP
107 04144 6001         FPUT F,X
108 04145 5102         FGET Y,COMP
109 04146 6003         FPUT F,Y
110 04147 0000         FEXT
111 04150 5761         JMP RUNRET
112
113 04151 6206         1$,DO,XY
114 04152 6206         DO,XY
115 04153 6434         DO,ZE
116 04154 6457         DO,A
117 04155 6200         DO,SSP
118 04156 6202         DO,TC
119
    04161 5605
    04162 4751
    04163 5535
    04164 5600
    04165 7770
    04166 2400
    04167 1674
    04170 2104
    04171 4603
    04172 7760
    04173 7400
    04174 3731
    04175 3757
    04176 6754
    04177 0167
120 04200

1   04200 0000         DISPFF,0/DISPLAY FROM RECORD
2   04201 1024         TAD F,TYPE
3   04202 1377         TAD (JMP I 11$)
4   04203 3204         DCA .+1
5   04204 7402         HLT
6
7   04205 4776         2$,JMS PDTWU
8   04206 0022         F,RAD
9
10  04207 4776         3$,JMS PDTWU
11  04210 0001         F,X
12  04211 4776         JMS PDTWU
13  04212 0003         F,Y
14
15  04213 4776         31$,JMS PDTWU
16  04214 0023         F,OFFS
17  04215 4776         JMS PDTWU
18  04216 0000         F,SPD
19
20  04217 5600         10$,JMP I DISPFF
21
22  04220 4776         4$,JMS PDTWU
23  04221 0005         F,Z
24  04222 4776         JMS PDTWU
25  04223 0021         F,PECK
26  04224 5213         JMP 31$
27
28  04225 4776         5$,JMS PDTWU
29  04226 0007         F,THET
30  04227 5213         JMP 31$
31
32  04230 4776         6$,JMS PDTWU
33  04231 0011         F,SSP
34  04232 5600         JMP I DISPFF
35
36  04233 4776         7$,JMS PDTWU
37  04234 0012         F,THIS
38  04235 4776         JMS PDTWU
39  04236 0013         F,NEXT
40  04237 5600         JMP I DISPFF
41
42  04240 4207         11$,3$/2$/4$/5$/6$/7$/10$/10$
    04241 4205
    04242 4220
    04243 4225
    04244 4230
    04245 4233
    04246 4217
    04247 4217
43
44  04250 0000         DISPFC,0/DISPLAY CURRENT POINT
                                           (RUN MODE)
45  04251 4775         JMS LTSOFF
46  04252 4774         JMS MOVE
47  04253 0014         12.
48  04254 0023         F,NUM
49  04255 0055         W,NUM
50  04256 4773         JMS LTSON
51
52  04257 4276         DISPFD,JMS ZAPPER
53
54  04260 4200         DISPFE,JMS DISPFF
55  04261 1032         TAD F,OFF
56  04262 7640         SZA CLA
57  04263 5650         JMP I DISPFC
58  04264 7127         STL IAC RTL
59  04265 6400         6400
60  04266 7240         STA
61  04267 6405         6405
62  04270 6405         6405
63  04271 6405         6405
64  04272 6405         6405
65  04273 6405         6405
66  04274 7200         CLA
67  04275 5650         JMP I DISPFC
68
69  04276 0000         ZAPPER,0/ERASE DISPLAYS
70  04277 6400         6400
71  04300 1372         TAD (-64.)
72  04301 3014         DCA XR4
73  04302 7240         STA
74  04303 6405         6405
75  04304 2014         ISZ XR4
76  04305 5303         JMP .-2
77  04306 4776         JMS PDTWU
78  04307 0021         W,SEQ+1
79  04310 5676         JMP I ZAPPER
80
81  04311 0000         FNEXT,0/FETCH NEXT RECORD
82  04312 1030         TAD F,EOP
83  04313 7640         SZA CLA
84  04314 5320         JMP 1$
85  04315 2023         ISZ F,NUM
86  04316 4771         JMS FETCH
87  04317 5711         JMP I FNEXT
88
89  04320 4770         1$,JMS FSTRT
90  04321 4771         JMS FETCH
91  04322 5711         JMP I FNEXT
92
93  04323 0000         DISENV,0/DISPLAY ALL
94  04324 4276         JMS ZAPPER
95  04325 1367         TAD (ENVTAB+3)
96  04326 3017         DCA XR7
97  04327 1366         TAD (-5)
```

```
98  04330 3177  DCA T,17
99
100 04331 1417  1S,TAD I XR7
101 04332 3023  DCA F,NUM
102 04333 4771  JMS FETCH
103 04334 4200  JMS DISPFF
104 04335 7344  STA CLL RAL
105 04336 1017  TAD XR7
106 04337 3017  DCA XR7
107 04340 2177  ISZ T,17
108 04341 5331  JMP 1S
109 04342 4765  JMS SUNFL
110 04343 0020  W,SEQ
111 04344 0023  F,NUM
112 04345 4771  JMS FETCH
113 04346 4200  JMS DISPFF
114 04347 4776  JMS PDTWU
115 04350 0024  F,N
116 04351 1131  TAD STYPE
117 04352 7640  SZA CLA
118 04353 4776  JMS PDTWU
119 04354 0022  F,RAD
120 04355 5723  JMP I DISENV
121
    04365 2114
    04366 7773
    04367 2160
    04370 3266
    04371 0600
    04372 7700
    04373 2321
    04374 2442
    04375 2307
    04376 3400
    04377 5600
122 04400

1   04400 0000  FSRCHA,0/RECREATE ENVIRONMENT
2   04401 4777  JMS SUNFL
3   04402 0055  NRECS
4   04403 4466  11S
5   04404 1266  TAD 11S
6   04405 4776  JMS VSET
7   04406 0011  9,
8   04407 2153  Z,N0
9   04410 4777  JMS SUNFL
10  04411 0020  W,SEQ
11  04412 0023  F,NUM
12  04413 1023  TAD F,NUM
13  04414 7041  CIA
14  04415 3266  DCA 12S
15  04416 3073  DCA ANYOFF
16  04417 4775  JMS FFETCH
17  04420 3131  DCA STYPE
18  04421 4774  JMS ZEDER
19
20  04422 4773  1S,JMS FFN
21  04423 1027  TAD F,DEL
22  04424 7640  SZA CLA
23  04425 5257  JMP 2S
24  04426 7240  STA
25  04427 1024  TAD F,TYPE
26  04430 7450  SNA
27  04431 2131  ISZ STYPE
28  04432 7510  SPA
29  04433 7200  CLA
30  04434 1372  TAD (ENVTAB)
31  04435 3267  DCA 13S
32  04436 1023  TAD F,NUM
33  04437 3667  DCA I 13S
34  04440 7240  STA
35  04441 1024  TAD F,TYPE
36  04442 7740  SMA SZA CLA
37  04443 5247  JMP 3S
38  04444 1032  TAD F,OFF
39  04445 7440  SZA
40  04446 3073  DCA ANYOFF
41
42  04447 7344  3S,STA CLL RAL
43  04450 1024  TAD F,TYPE
44  04451 7640  SZA CLA
45  04452 5257  JMP 2S
46  04453 1771  TAD Z,N1
47  04454 3770  DCA Z,N0
48  04455 1023  TAD F,NUM
49  04456 3771  DCA Z,N1
50
51  04457 1266  2S,TAD 12S
52  04460 1023  TAD F,NUM
53  04461 7640  SZA CLA
54  04462 5222  JMP 1S
55  04463 6601  6601
56  04464 4767  JMS DISENV
57  04465 5600  JMP I FSRCHA
58
59  04466       12S, 60  04466 0000  11S,0
61  04467 0000  13S,0
62
63  04470 7001  PMODES,IAC/RETURN FROM RUN & END OP
64  04471 3072  DCA NEXTF
65  04472 3127  DCA VMASK
66
67  04473 3086  PMODE,DCA RMODE/PGM MODE LOOP
68  04474 4200  JMS FSRCHA
69
70  04475       RPMODE,
71  04475 3126  2S,DCA INTVAL
72  04476 1137  TAD PWRUP
73  04477 7640  SZA CLA
74  04500 5766  JMP R,SSS
75
76  04501 6001  3S,ION
77  04502 6601  6601
78  04503 7410  SKP
79  04504 5765  JMP RUNNER
80  04505 1126  TAD INTVAL
81  04506 7650  SNA CLA
82  04507 5276  JMP 2S+1
83  04510 4764  JMS WORLD
84  04511 1126  TAD INTVAL
85  04512 1363  TAD (-100)
86  04513 7500  SMA
87  04514 5331  JMP 5S
88  04515 0362  AND (37)
89  04516 1361  TAD (PMOPS-10)
90  04517 3330  DCA 1S
91  04520 1730  TAD I 1S
92  04521 3330  DCA 1S
93  04522 7001  IAC
94  04523 3130  DCA RETRO
95  04524 3072  DCA NEXTF
96  04525 3075  DCA FFOUND
97  04526 4760  JMS RSEQUS
98  04527 5730  JMP I 1S
99
100 04530 7402  1S,HLT
101
102 04531 0357  5S,AND (17)
103 04532 1356  TAD (SFTIVN)
104 04533 3330  DCA 1S
105 04534 1730  TAD I 1S
106 04535 7510  SPA
107 04536 5755  JMP PLANES
108 04537 3541  DCA .+2
109 04540 4754  JMS INCON
110 04541 0000  0
111 04542 5275  JMP RPMODE
112 04543 1140  TAD T,0
113 04544 3346  DCA .+2
114 04545 4753  JMS PDTWU
115 04546 0000  0
116 04547 5275  JMP 2S
117
    04553 3400
    04554 3600
    04555 5044
    04556 2737
    04557 0017
    04560 5533
    04561 7074
    04562 0037
    04563 7700
    04564 2200
    04565 6526
    04566 4603
    04567 4323
    04570 2153
    04571 2154
    04572 2155
    04573 1523
    04574 2541
    04575 1674
    04576 2467
    04577 2114
118 04600

1   04600 4777  R,SEQS,JMS INCON/PGM MODE
                            SEQUENCE SELECT
2   04601 0020  W,SEQ
3   04602 5776  JMP RPMODE
4
5   04603 3137  R,SSS,DCA PWRUP
6   04604 4775  JMS FSRCHA
7
8   04605 4774  R,SSB,JMS PDTWU
9   04606 0020  W,SEQ
10
11  04607 4773  R,SSA,JMS SUNFL
12  04610 0020  W,SEQ
13  04611 0023  F,NUM
14  04612 4772  JMS FETCH
```

```
15  04613 4771        JMS LTSOFF
16  04614 4770        JMS MOVE
17  04615 0014        12.
18  04616 0023        F.NUM
19  04617 0055        W.NUM
20  04620 4767        JMS RESTO
21  04621 4766        JMS LTSON
22  04622 4765        JMS DISPFF
23  04623 5776        JMP RPMODE
24
25  04624 0000  SUNIV,0/SAVE X, Y, Z, THETA
26  04625 4407        FENT
27  04626 5030        FGET FP,ZIP
28  04627 0000        FEXT
29  04630 1041        TAD B,ADX
30  04631 7650        SNA CLA
31  04632 5236        JMP .+4
32  04633 4407        FENT
33  04634 5002        FGET D,X
34  04635 0000        FEXT
35  04636 1050        TAD AUX,X
36  04637 7650        SNA CLA
37  04640 5320        JMP 2S
38  04641 4407        FENT
39  04642 1014        FADD C,X
40
41  04643 6056  1S,FPUT FT,0
42  04644 5030        FGET FP,ZIP
43  04645 0000        FEXT
44  04646 1042        TAD B,ADY
45  04647 7650        SNA CLA
46  04650 5254        JMP .+4
47  04651 4407        FENT
48  04652 5004        FGET D,Y
49  04653 0000        FEXT
50  04654 1047        TAD AUX,Y
51  04655 7650        SNA CLA
52  04656 5324        JMP 3S
53  04657 4407        FENT
54  04660 1015        FADD C,Y
55
56  04661 6057  4S,FPUT FT,1
57  04662 5030        FGET FP,ZIP
58  04663 0000        FEXT
59  04664 1043        TAD B,ADZ
60  04665 7650        SNA CLA
61  04666 5272        JMP .+4
62  04667 4407        FENT
63  04670 5006        FGET D,Z
64  04671 0000        FEXT
65  04672 1046        TAD AUX,Z
66  04673 7650        SNA CLA
67  04674 5330        JMP 5S
68  04675 4407        FENT
69  04676 1016        FADD C,Z
70
71  04677 6060  6S,FPUT FT,2
72  04700 5030        FGET FP,ZIP
73  04701 0000        FEXT
74  04702 1044        TAD B,ADTH
75  04703 7650        SNA CLA
76  04704 5310        JMP .+4
77  04705 4407        FENT
78  04706 5010        FGET D,THET
79  04707 0000        FEXT
80  04710 1045        TAD AUX,TH
81  04711 7650        SNA CLA
82  04712 5334        JMP 7S
83  04713 4407        FENT
84  04714 1017        FADD C,THET
85
86  04715 6061  8S,FPUT FT,3
87  04716 0000        FEXT
88  04717 5624        JMP I SUNIV
89
90  04720 4407  2S,FENT
91  04721 1001        FADD F,X
92  04722 7243        FJMP 1S
93  04723 0007        UNK
94
95  04724 4407  3S,FENT
96  04725 1003        FADD F,Y
97  04726 7261        FJMP 4S
98  04727 0007        UNK
99
100 04730 4407  5S,FENT
101 04731 1005        FADD F,Z
102 04732 7277        FJMP 6S
103 04733 0007        UNK
104
105 04734 4407  7S,FENT
106 04735 1007        FADD F,THET
107 04736 7315        FJMP 8S
108 04737 0007        UNK
109
110 04740 1126  PLOADI,TAD INTVAL/LOAD
                          VBLE AT RUN TIME
111 04741 7002        BSW
112 04742 0364        AND (17)
113 04743 1363        TAD (SETIVN)
114 04744 3160        DCA T,0
115 04745 1560        TAD I T,0
116 04746 7510        SPA
117 04747 5762        JMP RUNN-1
118 04750 3352        DCA .+2
119 04751 4777        JMS INCON
120 04752 0000        0
121 04753 5762        JMP RUNN-1
122 04754 1160        TAD T,0
123 04755 3357        DCA .+2
124 04756 4774        JMS PDTWU
125 04757 0000        0
126 04760 5762        JMP RUNN-1
127
    04762 5607
    04763 2737
    04764 0017
    04765 4200
    04766 2321
    04767 6544
    04770 2442
    04771 2307
    04772 0600
    04773 2114
    04774 3400
    04775 4400
    04776 4475
    04777 3600
128 05000

1          5000  PT*,
2
3          0007  *7
4   00007 5052        FPENT
5
6          5000  *PT
7
8   05000 4777  R,LOOK,JMS FNEXT/EXAMINE FILE
9   05001 4776        JMS SFLOAT
10  05002 0023        F.NUM
11  05003 0020        W.SEQ
12  05004 5775        JMP R,SSB
13
14  05005 4774  FULL,JMS ERRPT/FULL FILE
15  05006 0000        0
16  05007 5773        JMP R,SSS
17
18  05010        R,SENT,
19  05010 1065  R,SCOR,TAD W,SENS/SEQUENCE ENTER
20  05011 3133        DCA W,SENI
21  05012 1064        TAD W,OFF
22  05013 3134        DCA W,OFFI
23  05014 1040        TAD F,FOF
24  05015 7640        SZA CLA
25  05016 5772        JMP R,SINA
26  05017 4771        JMS XROOM
27  05020 5205        JMP FULL
28  05021 4770        JMS DELETE
29  05022 5772        JMP R,SINA
30
31  05023 3075  Q,SLUP,DCA FFOUND/SELECT
                          NEXT UNPGMD SEQ IN RUN MODE
32
33  05024 4407  R,SNUS,FENT/SELECT NEXT UNPGMD SEQ
34  05025 5055        FGET NRECS
35  05026 6020        FPUT W,SEQ
36  05027 0000        FEXT
37  05030 1006        TAD RMODE
38  05031 7640        SZA CLA
39  05032 5775        JMP R,SSB
40  05033 5773        JMP R,SSS
41
42  05034 4407  R,MEME,FENT/MEMORY ERASE
43  05035 5024        FGET F,N
44  05036 7767        FJMP R,MEMD
45  05037 0002        GTZ
46  05040 5020        FGET W,SEQ
47  05041 6055        FPUT NRECS
48  05042 0000        FEXT
49  05043 5766        JMP R,MEMC
50
51  05044 0365  PLANES,AND (3)
52  05045 6603        6603
53  05046 3251        DCA WAXIS
54  05047 4764        JMS WORLD
55  05050 5763        JMP RPMODE
56
57  05051 0000  WAXIS,0
58
59  05052 0000  FPENT,0/ENTER FP PACKAGE
60  05053 7300        CLA CLL
61  05054 1252        TAD FPENT
```

```
62  05055 6211        CDF 10
63  05056 3772        DCA I (5200)
64  05057 1024        TAD EXP
65  05060 3762        DCA I (EXP)
66  05061 1021        TAD HORD
67  05062 3761        DCA I (HORD)
68  05063 1022        TAD LORD
69  05064 3760        DCA I (LORD)
70  05065 6201        CDF 00
71  05066 6212        CIF 10
72  05067 5757        JMP I (5201)
73
74  05070 0000        FINDL,0/FIND PREVIOUS XY PLANE
                      RECORD
75  05071 1023        TAD F,NUM
76  05072 7041        CIA
77  05073 3334        DCA 3S
78
79  05074 1023        1S,TAD F,NUM
80  05075 7650        SNA CLA
81  05076 5323        JMP 2S
82
83  05077 7240        7S,STA
84  05100 1023        TAD F,NUM
85  05101 3023        DCA F,NUM
86  05102 4756        JMS FFETCH
87  05103 1030        TAD F,EOP
88  05104 7640        SZA CLA
89  05105 5323        JMP 2S
90
91  05106 1023        5S,TAD F,NUM
92  05107 1334        TAD 3S
93  05110 7650        SNA CLA
94  05111 5670        JMP I FINDL
95
96  05112 7240        4S,STA
97  05113 1024        TAD F,TYPE
98  05114 7740        SMA SZA CLA
99  05115 5274        JMP 1S
100 05116 1027        TAD F,DEL
101 05117 7640        SZA CLA
102 05120 5274        JMP 1S
103 05121 2270        ISZ FINDL
104 05122 5670        JMP I FINDL
105
106 05123 2023        2S,ISZ F,NUM
107 05124 4756        JMS FFETCH
108 05125 1030        TAD F,EOP
109 05126 7650        SNA CLA
110 05127 5323        JMP 2S
111 05130 1040        TAD F,FOF
112 05131 7650        SNA CLA
113 05132 5306        JMP 5S
114 05133 5277        JMP 7S
115
116 05134 0000        3S,0
117
118 05135 0000        EVALRT,0/EVALUATE TYPE FOR REPEATS
119 05136 1355        TAD (TAD 1S)
120 05137 3340        DCA .+1
121 05140 7402        HLT
122 05141 5735        JMP I EVALRT
123
124 05142 0000        1S,0;0;1;2;3;4
    05143 0000
    05144 0001
    05145 0002
    05146 0003
    05147 0004
125
    05155 1342
    05156 1674
    05157 5201
    05160 0022
    05161 0021
    05162 0020
    05163 4475
    05164 2200
    05165 0203
    05166 0244
    05167 4075
    05170 2104
    05171 1502
    05172 5200
    05173 4603
    05174 3200
    05175 4605
    05176 2000
    05177 4311
126 05200

1   05200               R,SINS,
2
3   05200 4777        R,SINA,JMS XROOM/SEQUENCE INSERT
4   05201 5776        JMP FULL 5   05202 4775        JMS EVALT
6   05203 4774        JMS SUNIV
7   05204 1056        TAD W,TYPE
8   05205 1373        TAD (JMP I 10S)
9   05206 3207        DCA .+1
10  05207 7402        HLT
11
12  05210 4407        1S,FENT
13  05211 5056        FGET FT,0
14  05212 6001        FPUT F,X
15  05213 5057        FGET FT,1
16  05214 6003        FPUT F,Y
17  05215 0000        FEXT
18
19  05216 4772        20S,JMS INSERT
20  05217 1056        TAD W,TYPE
21  05220 3024        DCA F,TYPE
22  05221 4771        JMS DISPFF
23  05222 4407        FENT
24  05223 5024        FGET W,SEQ
25  05224 1031        FADD FP,ONE
26  05225 6024        FPUT W,SEQ
27  05226 0000        FEXT
28  05227 5770        JMP R,SSB
29
30  05230 4407        2S,FENT
31  05231 5060        FGET FT,2
32  05232 6005        FPUT F,Z
33  05233 0000        FEXT
34  05234 5216        JMP 20S
35
36  05235 4407        3S,FENT
37  05236 5061        FGET FT,3
38  05237 6007        FPUT F,THET
39  05240 0000        FEXT
40  05241 5216        JMP 20S
41
42  05242 5210        10S,1S;1S;2S;3S;20S;20S
    05243 5210
    05244 5230
    05245 5235
    05246 5216
    05247 5216
43
44  05250 4774        R,RLN,JMS SUNIV/REAPEAT LAST N
45  05251 4407        FENT
46  05252 5024        FGET F,N
47  05253 6054        FPUT WFT,1
48  05254 5030        FGET FP,ZIP
49  05255 6024        FPUT F,N
50  05256 5054        FGET WFT,1
51  05257 2020        FSUB W,SFQ
52  05260 7274        FJMP 1S
53  05261 0002        GTZ
54  05262 0014        FNEG
55  05263 6053        FPUT WFT,0
56  05264 0000        FEXT
57  05265 4767        JMS SUNFL
58  05266 0053        WFT,0
59  05267 0023        F,NUM
60  05270 4767        JMS SUNFL
61  05271 0054        WFT,1
62  05272 0176        REPCNT
63  05273 5306        JMP R,RTPA
64
65  05274 0000        1S,FEXT
66  05275 5277        JMP R,RTPS
67
68  05276 4774        R,RTPP,JMS SUNIV/REPEAT PROGRAM
69
70  05277 1055        R,RTPS,TAD W,NUM
71  05300 3023        DCA F,NUM
72  05301 4766        JMS FSTRT
73  05302 1023        TAD F,NUM
74  05303 7041        CIA
75  05304 1055        TAD W,NUM
76  05305 3176        DCA REPCNT
77
78  05306 4775        R,RTPA,JMS EVALT
79  05307 1056        TAD W,TYPE
80  05310 4765        JMS EVALRT
81  05311 7041        CIA
82  05312 3177        DCA TARTYP
83  05313 1064        TAD W,OFF
84  05314 3134        DCA W,OFFI
85  05315 4407        FENT
86  05316 5030        FGET FP,ZIP
87  05317 6062        FPUT DX
88  05320 6063        FPUT DY
89  05321 6064        FPUT DZ
90  05322 6065        FPUT DTH
91  05323 5023        FGET F,OFFS
92  05324 6066        FPUT TOFFS
93  05325 0000        FEXT
94  05326 4764        JMS FETCH
95  05327 1024        TAD F,TYPE
96  05330 4765        JMS EVALRT
```

```
 97  05331 1177   TAD TARTYP
 98  05332 7640   SZA CLA
 99  05333 5340   JMP 1S
100
101        0062   DX=FT,4
102        0063   DY=FT,5
103        0064   DZ=FT,6
104        0065   DTH=FT,7
105        0066   TOFFS=FT,8
106        0134   W,OFFI=TOA
107        0133   W,SENI=FROMA
108
109  05334 1056   TAD W,TYPE
110  05335 1363   TAD (JMP I 90S)
111  05336 3337   DCA .+1
112  05337 7402   HLT
113
114  05340 4762   1S,JMS ERRPT
115  05341 0005   5
116  05342 1055   TAD W,NUM
117  05343 3023   DCA F,NUM
118  05344 4764   JMS FETCH
119  05345 5761   JMP PMODE
120
121  05346 5400   90S,10S/10S/11S/12S/13S/13S
     05347 5400
     05350 5411
     05351 5417
     05352 5424
     05353 5424
122
     05361 4473
     05362 3200
     05363 5746
     05364 0600
     05365 5135
     05366 3266
     05367 2114
     05370 4605
     05371 4200
     05372 1000
     05373 5642
     05374 4624
     05375 2400
     05376 5005
     05377 1502
123  05400

1  05400 4407   10S,FENT
  2  05401 5056   FGET FT,0
  3  05402 2001   FSUB F,X
  4  05403 6062   FPUT DX
  5  05404 5057   FGET FT,1
  6  05405 2003   FSUB F,Y
  7  05406 6063   FPUT DY
  8  05407 0000   FEXT
  9  05410 5224   JMP 13S
 10
 11  05411 4407   11S,FENT
 12  05412 5060   FGET FT,2
 13  05413 2005   FSUB F,Z
 14  05414 6064   FPUT DZ
 15  05415 0000   FEXT
 16  05416 5224   JMP 13S
 17
 18  05417 4407   12S,FENT
 19  05420 5061   FGET FT,3
 20  05421 2007   FSUB F,THET
 21  05422 6065   FPUT DTH
 22  05423 0000   FEXT
 23
 24  05424 4311   13S,JMS 30S
 25  05425 1055   TAD W,NUM
 26  05426 3077   DCA FREC
 27  05427 4777   JMS FIND
 28  05430 4303   JMS 31S
 29
 30  05431 7240   20S,STA
 31  05432 1176   TAD REPCNT
 32  05433 7510   SPA
 33  05434 5301   JMP 24S
 34  05435 3176   DCA REPCNT
 35  05436 4776   JMS XROOM
 36  05437 5775   JMP FULL
 37  05440 4325   JMS 40S
 38  05441 4774   JMS FETCH
 39  05442 4311   JMS 30S
 40  05443 2023   ISZ F,NUM
 41  05444 4773   JMS REPOFF
 42  05445 5264   JMP 23S
 43  05446 4407   FENT
 44  05447 5001   FGET F,X
 45  05450 1062   FADD DX
 46  05451 6001   FPUT F,X
 47  05452 5003   FGET F,Y
 48  05453 1063   FADD DY
 49  05454 6003   FPUT F,Y
 50  05455 5005   FGET F,Z
 51  05456 1064   FADD DZ
 52  05457 6005   FPUT F,Z
 53  05460 5007   FGET F,THET
 54  05461 1065   FADD DTH
 55  05462 6007   FPUT F,THET
 56  05463 0000   FEXT
 57
 58  05464 4772   23S,JMS MOVE
 59  05465 0013   11.
 60  05466 0024   F,TYPE
 61  05467 0056   W,TYPE
 62  05470 4317   JMS 41S
 63  05471 4771   JMS INSERT
 64  05472 2055   ISZ W,NUM
 65  05473 4770   JMS SFLOAT
 66  05474 0055   W,NUM
 67  05475 0020   W,SEQ
 68  05476 4767   JMS PDTWU
 69  05477 0020   W,SEQ
 70  05500 5225   JMP 13S+1
 71
 72  05501 7200   24S,CLA
 73  05502 5766   JMP R,SSS
 74
 75  05503 0000   31S,0/SAVE W,PTA
 76  05504 4765   JMS PTAP
 77  05505 0173   T,13
 78  05506 1076   TAD RECI
 79  05507 3175   DCA T,15
 80  05510 5703   JMP I 31S
 81
 82  05511 0000   30S,0/SAVE F,PTA
 83  05512 4765   JMS PTAP
 84  05513 0170   T,10
 85  05514 1076   TAD RECI
 86  05515 3172   DCA T,12
 87  05516 5711   JMP I 30S
 88
 89  05517 0000   41S,0/RESTORE W,PTA
 90  05520 4764   JMS PTAG
 91  05521 0173   T,13
 92  05522 1175   TAD T,15
 93  05523 3076   DCA RECI
 94  05524 5717   JMP I 41S
 95
 96  05525 0000   40S,0/RESTORE F,PTA
 97  05526 4764   JMS PTAG
 98  05527 0170   T,10
 99  05530 1172   TAD T,12
100  05531 3076   DCA RECI
101  05532 5725   JMP I 40S
102
103        0176   REPCNT=T,16
104        0177   TARTYP=T,17
105
106  05533 0000   RSEQUS,0/RETRACT Z FLAG
107  05534 5733   JMP I RSEQUS
108
109  05535 0000   RSEQU,0/RETRACT Z
110  05536 1363   TAD (-8.)
111  05537 3127   DCA VMASK
112  05540 1333   TAD RSEQUS
113  05541 7650   SNA CLA
114  05542 5735   JMP I RSEQU
115  05543 3333   DCA RSEQUS
116  05544 6213   CDI 10
117  05545 4762   JMS URSQU
118
119  05546 6001   ZLIMIT,ION/Z LIMIT
120  05547 4761   JMS WORLD
121  05550 6213   CDI 10
122  05551 4760   JMS ZNUDGE
123  05552 5735   JMP I RSEQU
124
     05560 0200
     05561 2200
     05562 0223
     05563 7770
     05564 1470
     05565 1456
     05566 4603
     05567 3400
     05570 2000
     05571 1000
     05572 2442
     05573 3533
     05574 0600
     05575 5005
     05576 1502
     05577 2506
125  05600
```

```
1                               .ENABL LSB
2
3     05600 4777    ZERROR,JMS ERRPT
4     05601 0006    6
5
6     05602 1055    STPRET,TAD W,NUM
7     05603 3023    DCA F,NUM
8     05604 4776    JMS FETCH
9
10    05605 1060    RUNRET,TAD W,AXIS
11    05606 6603    6603
12    05607 7200    CLA
13
14    05610 3127    RUNN,DCA VMASK/RUN MODE LOOP
15    05611 3126    DCA INTVAL
16
17    05612 6001    2S,ION
18    05613 6601    6601
19    05614 5775    JMP PMODE
20    05615 1126    TAD INTVAL
21    05616 7450    SNA
22    05617 5212    JMP 2S
23    05620 0374    AND (7)
24    05621 1373    TAD (JMP I 1OS)
25    05622 3225    DCA 1S
26    05623 7001    IAC
27    05624 4772    JMS WORLD
28
29    05625 7402    1S,HLT
30
31    05626 4771    Q,SSEL,JMS INCON/RUN MODE SEQUENCE
                                                SELECT
32    05627 0020    W,SEQ
33    05630 5210    JMP RUNN
34
35    05631 4770    Q,SSA,JMS RSEQUS
36    05632 7001    IAC
37    05633 3130    DCA RETRO
38
39    05634 3072    Q,SSAU,DCA NEXTF
40    05635 3075    DCA FFOUND
41    05636 4767    JMS SUNFL
42    05637 0020    W,SEQ
43    05640 0023    F,NUM
44    05641 4776    JMS FETCH
45    05642 4766    JMS DISPFC
46    05643 5210    JMP RUNN
47
48    05644 5610    1MS,RUNN
49    05645 5626    Q,SSEL
50    05646 5660    Q,CYCL
51    05647 5610    RUNN
52    05650 3000    Q,RDR
53    05651 2600    Q,PNCH
54    05652 5023    Q,SLUP
55    05653 5654    LOADI
56
57    05654 1040    LOADI,TAD F,EOF/POSSIBLE VBLE SET
58    05655 7640    SZA CLA
59    05656 5765    JMP PLOADI
60    05657 5210    JMP RUNN
61
62                     .DSABL LSB
63
64    05660 4764    Q,CYCL,JMS MAYBC/CYCLE
65    05661 1072    TAD NEXTF
66    05662 7650    SNA CLA
67    05663 5327    JMP 1S
68
69    05664 6601    2S,6601
70    05665 5763    JMP PMODES
71    05666 4762    JMS FNEXT
72    05667 3072    DCA NEXTF
73    05670 1040    TAD F,EOF
74    05671 7640    SZA CLA
75    05672 5264    JMP 2S
76    05673 4761    JMS SFLOAT
77    05674 0023    F,NUM
78    05675 0020    W,SEQ
79    05676 4766    JMS DISPFC
80
81    05677 7001    4S,IAC
82    05700 4772    JMS WORLD
83    05701 1061    TAD W,DEL
84    05702 7640    SZA CLA
85    05703 5264    JMP 2S
86    05704 1024    TAD F,TYPE
87    05705 1360    TAD (JMS I 11S)
88    05706 3312    DCA 5S
89    05707 4757    JMS RSEQU
90    05710 1356    TAD (ZERROR)
91    05711 3757    DCA RSEQU
92
93    05712 7402    5S,HLT
94
95    05713 7001    3S,IAC
96    05714 4772    JMS WORLD
97    05715 4755    JMS STOPX
98    05716 5202    JMP STPRET
99    05717 4754    JMS AUXFDO
100   05720 7001    IAC
101   05721 4772    JMS WORLD
102   05722 1063    TAD W,HOLD
103   05723 7450    SNA
104   05724 5264    JMP 2S
105   05725 3072    DCA NEXTF
106   05726 5205    JMP RUNRET
107
108   05727 1130    1S,TAD RETRO
109   05730 7650    SNA CLA
110   05731 5277    JMP 4S
111   05732 4753    JMS FSRCHA
112   05733 4752    JMS RCREAT
113   05734 3130    DCA RETRO
114   05735 1061    TAD W,DEL
115   05736 7640    SZA CLA
116   05737 5264    JMP 2S
117   05740 5313    JMP 3S
118
119            5741    T,JTAB*,
120
121   05741 6206    11S,DO,XY;DO,CIR;DO,Z;DO,A;DO,SSP;
                            DO,TC;DO,EOF;DO,EOF
      05742 6221
      05743 6422
      05744 6457
      05745 6200
      05746 6202
      05747 6204
      05750 6204
122
123            5751    PT*,
124
      05752 6067
      05753 4400
      05754 6000
      05755 2725
      05756 5600
      05757 5535
      05760 4741
      05761 2000
      05762 4311
      05763 4470
      05764 4113
      05765 4740
      05766 4250
      05767 2114
      05770 5533
      05771 3600
      05772 2200
      05773 5644
      05774 0007
      05775 4473
      05776 0600
      05777 3200
125            0000    FIELD 1
126
127            0061    *STPLOC
128
129   10061 5605    RUNRET
130
131            0000    FIELD 0
132
133            5751    *PT
134
135   06000

1     06000 0000    AUXFDO,0/DO AUX FCNS AND AUTO DRILL
2     06001 1377    TAD (120)
3     06002 6400    6400
4     06003 1376    TAD (1S-120)
5     06004 3264    DCA 2S
6     06005 1375    TAD (-4)
7     06006 3265    DCA 4S
8
9     06007 6411    5S,6411
10    06010 5227    JMP 3S
11    06011 3266    DCA AUXDUN
12    06012 3126    DCA INTVAL
13    06013 1664    TAD I 2S
14    06014 6436    6436
15    06015 7200    CLA
16
17    06016 7344    7S,STA CLL RAL
18    06017 1126    TAD INTVAL
19    06020 7650    SNA CLA
20    06021 5227    JMP 3S
21    06022 4774    JMS STOPX
22    06023 5773    JMP STPRET
23    06024 1266    TAD AUXDUN
24    06025 7650    SNA CLA
25    06026 5216    JMP 7S
26
27    06027 2264    3S,ISZ 2S
```

```
28  06050 2265        ISZ 4$
29  06051 5207        JMP 5$
30  06052 1066        TAD W,AUTO
31  06053 7650        SNA CLA
32  06054 5600        JMP I AUXFDO
33  06055 1772        TAD Z,N0
34  06056 4245        JMS 8$
35  06057 1771        TAD Z,N1
36  06040 4245        JMS 8$
37  06041 1055        TAD W,NUM
38  06042 3023        DCA F,NUM
39  06043 4770        JMS FETCH
40  06044 5600        JMP I AUXFDO
41
42  06045 0000        8$,0/DO ONE AUX DRILL MOVE
43  06046 3023        DCA F,NUM
44  06047 4767        JMS FETCH
45  06050 1040        TAD F,EOF
46  06051 7640        SZA CLA
47  06052 5645        JMP I 8$
48  06053 1366        TAD (6$)
49  06054 3765        DCA DISPFC
50  06055 5764        JMP DISPFE
51
52  06056 4763        6$,JMS DO,ZE
53  06057 5645        JMP I 8$
54
55  06060 0001        1$,1,2,4,8,
    06061 0002
    06062 0004
    06063 0010
56  06064 0000        2$,0
57  06065 0000        4$,0
58  06066 0000        AUXDUN,0
59
60  06067 0000        RCREAT,0/RECREATE ENVIRONMENT
61  06070 1060        TAD W,AXIS
62  06071 1362        TAD (TAD 1$)
63  06072 3273        DCA .+1
64  06073 7402        HLT
65  06074 3010        DCA XR0
66  06075 4761        JMS RSEQU
67  06076 1360        TAD (ZERROR)
68  06077 3761        DCA RSEQU
69  06100 4524        JMS DO,IT
70  06101 4324        JMS DO,IT
71  06102 4324        JMS DO,IT
72  06103 1055        TAD W,NUM
73  06104 3023        DCA F,NUM
74  06105 4767        JMS FETCH
75  06106 5667        JMP I RCREAT
76
77  06107 6112        1$,2$-1
78  06110 6115        3$-1
79  06111 6115        3$-1
80  06112 6120        4$-1
81
82  06113 2155        2$,ENVTAB
83  06114 2157        ENVTAB+2
84  06115 2156        ENVTAB+1
85
86  06116 2156        3$,ENVTAB+1
87  06117 2155        ENVTAB
88  06120 2157        ENVTAB+2
89
90  06121 2157        4$,ENVTAB+2
91  06122 2155        ENVTAB
92  06123 2156        ENVTAB+1
93
94  06124 0000        DO,IT,0/DO A RECREATE MOVE
95  06125 1410        TAD I XR0
96  06126 3023        DCA F,NUM
97  06127 1423        TAD I F,NUM
98  06130 3023        DCA F,NUM
99  06131 4767        JMS FETCH
100 06132 1026        TAD F,AXIS
101 06133 6603        6603
102 06134 7200        CLA
103 06135 1357        TAD (T,JTAB)
104 06136 1024        TAD F,TYPE
105 06137 3344        DCA 1$
106 06140 1744        TAD I 1$
107 06141 3344        DCA 1$
108 06142 4744        JMS I 1$
109 06143 5724        JMP I DO,IT
110
111 06144 0000        1$,0
112
    06157 5741
    06160 5600
    06161 5535
    06162 1307
    06163 6434
    06164 4260
    06165 4250
    06166 6056
    06167 0600
```

```
    06170 1674
    06171 2154
    06172 2153
    06173 5602
    06174 2725
    06175 7774
    06176 5740
    06177 0120
113 06200

1   06200 0000        DO,SSP,0/SPINDLE SPEED
2   06201 5600        JMP I DO,SSP
3
4   06202 0000        DO,TC,0/TOOL CHANGE
5   06203 5602        JMP I DO,TC
6
7   06204 0000        DO,EOF,0/EOF
8   06205 5604        JMP I DO,EOF
9
10  06206 0000        DO,XY,0/STRAIGHT LINE MOVE
11  06207 4777        JMS FKERF
12  06210 7000        NOP
13  06211 4776        JMS MIRROR
14  06212 4775        JMS PDTWU
15  06213 0001        F,X
16  06214 4775        JMS PDTWU
17  06215 0003        F,Y
18  06216 6213        CDI 10
19  06217 4774        JMS MXYU
20  06220 5606        JMP I DO,XY
21
22  06221 0000        DO,CIR,0/CIRCULAR MOVE
23  06222 1130        TAD RETRO
24  06223 7640        SZA CLA
25  06224 5347        JMP 6$
26  06225 4773        JMS INCON
27  06226 0014        C,X
28  06227 4773        JMS INCON
29  06230 0015        C,Y
30  06231 4777        JMS FKERF
31  06232 7410        SKP
32  06233 5246        JMP 7$
33  06234 1073        TAD ANYOFF
34  06235 7640        SZA CLA
35  06236 5347        JMP 6$
36  06237 4772        JMS FINDL
37  06240 5347        JMP 6$
38  06241 1023        TAD F,NUM
39  06242 7421        MQL
40  06243 1055        TAD W,NUM
41  06244 6213        CDI 10
42  06245 4771        JMS CENTUP
43
44  06246 4776        7$,JMS MIRROR
45  06247 1054        TAD M,X
46  06250 7650        SNA CLA
47  06251 5257        JMP 8$
48  06252 4407        FENT
49  06253 5100        FGET XCNTR
50  06254 0014        FNEG
51  06255 6100        FPUT XCNTR
52  06256 0000        FEXT
53
54  06257 1053        8$,TAD M,Y
55  06260 7650        SNA CLA
56  06261 5267        JMP 9$
57  06262 4407        FENT
58  06263 5045        FGET YCNTR
59  06264 0014        FNEG
60  06265 6045        FPUT YCNTR
61  06266 0000        FEXT
62
63  06267 4407        9$,FENT
64  06270 5001        FGET F,X
65  06271 6101        FPUT X,COMP
66  06272 5003        FGET F,Y
67  06273 6102        FPUT Y,COMP
68  06274 0000        FEXT
69  06275 7344        STA CLL RAL
70  06276 1054        TAD M,X
71  06277 1053        TAD M,Y
72  06300 7450        SNA
73  06301 5311        JMP 4$
74  06302 7001        IAC
75  06303 7640        SZA CLA
76  06304 5311        JMP 4$
77  06305 1035        TAD F,CCW
78  06306 7650        SNA CLA
79  06307 7001        IAC
80  06310 3035        DCA F,CCW
81
82  06311 4775        4$,JMS PDTWU
83  06312 0001        F,X
84  06313 4775        JMS PDTWU
85  06314 0003        F,Y
86  06315 4407        FENT
```

```
 87  06316 5114   FGET LAST,X
 88  06317 2014   FSUB C,X
 89  06320 0001   FSQ
 90  06321 6053   FPUT WFT,0
 91  06322 5115   FGET LAST,Y
 92  06323 2015   FSUB C,Y
 93  06324 0001   FSQ
 94  06325 1053   FADD WFT,0
 95  06326 0002   FSQRT
 96  06327 4032   FDIV FP,TEN
 97  06330 0000   FEXT
 98  06331 1020   TAD EXP
 99  06332 7750   SPA SNA CLA
100  06333 7001   IAC
101  06334 6213   CDI 10
102  06335 4770   JMS CIRCU
103  06336 4407   FENT
104  06337 5101   FGET X,COMP
105  06340 6001   FPUT F,X
106  06341 5102   FGET Y,COMP
107  06342 6003   FPUT F,Y
108  06343 0000   FEXT
109  06344 6213   CDI 10
110  06345 4774   JMS MXYU
111  06346 5621   JMP I DO,CIR
112
113  06347 4206   6$,JMS DO,XY
114  06350 5621   JMP I DO,CIR
115
116  06351 0000   FUTCH,0/FETCH AND READ WORLD FROM
                                                  BANK 1
117  06352 1055   TAD W,NUM
118  06353 3023   DCA F,NUM
119  06354 4767   JMS FETCH
120  06355 4766   JMS WORLD
121  06356 6213   CDI 10
122  06357 5751   JMP I FUTCH
123
124        6360   PT=,
125
     06366 2200
     06367 0600
     06370 0400
     06371 3116
     06372 5070
     06373 3600
     06374 0241
     06375 3400
     06376 6400
     06377 6600
126        0000   FIELD 1
127        0001   FIELD 1
128
129        0003   *FUTSCH
130  10003 6351   FUTCH
131
132        0000   FIELD 0
133
134        6360   *PT
135
136  06400

1  06400 0000   MIRROR,0/MIRROR X AND Y
  2  06401 1054   TAD M,X
  3  06402 7650   SNA CLA
  4  06403 5211   JMP 1$
  5  06404 4407   FENT
  6  06405 5001   FGET F,X
  7  06406 0014   FNEG
  8  06407 6001   FPUT F,X
  9  06410 0000   FEXT
 10
 11  06411 1053   1$,TAD M,Y
 12  06412 7650   SNA CLA
 13  06413 5600   JMP I MIRROR
 14  06414 4407   FENT
 15  06415 5003   FGET F,Y
 16  06416 0014   FNEG
 17  06417 6003   FPUT F,Y
 18  06420 0000   FEXT
 19  06421 5600   JMP I MIRROR
 20
 21  06422 0000   DO,Z,0/Z MOVE
 22  06423 4234   JMS DO,ZE
 23  06424 1130   TAD RETRO
 24  06425 7640   SZA CLA
 25  06426 5622   JMP I DO,Z
 26  06427 1777   TAD Z,N1
 27  06430 3776   DCA Z,N0
 28  06431 1023   TAD F,NUM
 29  06432 3777   DCA Z,N1
 30  06433 5622   JMP I DO,Z
 31
 32  06434 0000   DO,ZE,0
 33  06435 4302   JMS XOFFS
 34  06436 4407   FENT
 35  06437 1005   FADD F,Z
 36  06440 0000   FEXT
 37  06441 1052   TAD M,Z
 38  06442 7650   SNA CLA
 39  06443 5247   JMP 2$
 40  06444 4407   FENT
 41  06445 0014   FNEG
 42  06446 0000   FEXT
 43
 44  06447 4407   2$,FENT
 45  06450 6005   FPUT FZPOS
 46  06451 0000   FEXT
 47  06452 4775   JMS PDTWU
 48  06453 0005   F,Z
 49  06454 6213   CDI 10
 50  06455 4774   JMS CYZU
 51  06456 5634   JMP I DO,ZE
 52
 53  06457 0000   DO,A,0/THETA MOVE
 54  06460 4302   JMS XOFFS
 55  06461 4407   FENT
 56  06462 1007   FADD F,THET
 57  06463 0000   FEXT
 58  06464 1051   TAD M,TH
 59  06465 7650   SNA CLA
 60  06466 5272   JMP 2$
 61  06467 4407   FENT
 62  06470 0014   FNEG
 63  06471 0000   FEXT
 64
 65  06472 4407   2$,FENT
 66  06473 6007   FPUT F,THET
 67  06474 0000   FEXT
 68  06475 4775   JMS PDTWU
 69  06476 0007   F,THET
 70  06477 6213   CDI 10
 71  06500 4773   JMS THETU
 72  06501 5657   JMP I DO,A
 73
 74  06502 0000   XOFFS,0/CHECK FOR OFFSET
 75  06503 4407   FENT
 76  06504 5030   FGET FP,ZIP
 77  06505 0000   FEXT
 78  06506 1032   TAD F,OFF
 79  06507 7650   SNA CLA
 80  06510 5702   JMP I XOFFS
 81  06511 4407   FENT
 82  06512 5023   FGET F,OFFS
 83  06513 0000   FEXT
 84  06514 1033   TAD F,SENS
 85  06515 7650   SNA CLA
 86  06516 5702   JMP I XOFFS
 87  06517 4407   FENT
 88  06520 0014   FNEG
 89  06521 0000   FEXT
 90  06522 5702   JMP I XOFFS
 91
 92  06523 4772   CIRERR,JMS ERRPT
 93  06524 0004   4
 94  06525 5771   JMP STPRET
 95
 96  06526 1370   RUNNER,TAD (RUNN)/ENTRY TO RUN
                                             FROM PGM
 97  06527 3767   DCA DISPFC
 98  06530 7001   IAC
 99  06531 3006   DCA RMODE
100  06532 1040   TAD F,EOF
101  06533 7640   SZA CLA
102  06534 5770   JMP RUNN
103  06535 5766   JMP DISPFD
104
105  06536 0000   UFETCH,0/FETCH FROM BANK 1
106  06537 3023   DCA F,NUM
107  06540 4774   JMS FETCH
108  06541 1024   TAD F,TYPE
109  06542 6213   CDI 10
110  06543 5736   JMP I UFETCH
111
112  06544 0000   RESTO,0/RESTORE OFFSET BITS MAYBE
113  06545 1040   TAD F,EOF
114  06546 7650   SNA CLA
115  06547 5744   JMP I RESTO
116  06550 1126   TAD INTVAL
117  06551 1365   TAD (-11)
118  06552 7640   SZA CLA
119  06553 5744   JMP I RESTO
120  06554 1134   TAD W,OFFI
121  06555 3064   DCA W,OFF
122  06556 1133   TAD W,SENI
123  06557 3065   DCA W,SENS
124  06560 5744   JMP I RESTO
125
     06565 7767
     06566 4257
     06567 4250
     06570 5610
     06571 5602
     06572 3200
     06573 0311
     06574 0600
     06575 3400
     06576 2153
     06577 2154
126  06600
```

```
                    .ENABL LSB 06600 0000        FKERF,0/KERF COMPUTATION
  06601 1040        TAD F,EOF
  06602 7640        SZA CLA
  06603 5600        JMP I FKERF
  06604 1023        TAD F,NUM
  06605 3353        DCA 9S
  06606 1073        TAD ANYOFF
  06607 7650        SNA CLA
  06610 5600        JMP I FKERF
  06611 3131        DCA STYPE
  06612 1024        TAD F,TYPE
  06613 7104        CLL RAL
  06614 3132        DCA ITYPE
  06615 1037        TAD F,STRT
  06616 7640        SZA CLA
  06617 5300        JMP 2S
  06620 1353        TAD 9S
  06621 3134        DCA TOA
  06622 4777        JMS FINDL
  06623 5600        JMP I FKERF
  06624 1023        TAD F,NUM
  06625 3135        DCA FROMA
  06626 1353        TAD 9S
  06627 3023        DCA F,NUM
  06630 4776        JMS FFETCH
  06631 4775        JMS FINDN
  06632 7000        NOP
  06633 1037        TAD F,STRT
  06634 7640        SZA CLA
  06635 5334        JMP 4S
  06636 1134        TAD TOA
  06637 3135        DCA FROMB 06640 1023        9S,TAD F,NUM
  06641 3136        DCA TOB
  06642 7001        IAC
  06643 1024        TAD F,TYPE
  06644 1132        TAD ITYPE
  06645 3132        DCA ITYPE 06646 6213        9SS,CDI 10
  06647 4774        JMS INTRSX
  06650 5275        JMP 100S
  06651 2200        ISZ FKERF
  06652 1353        TAD 9S
  06653 3023        DCA F,NUM
  06654 4773        JMS FETCH
  06655 4407        FENT
  06656 5101        FGET X,COMP
  06657 0012        FRND
  06660 0011        UNNOR
  06661 0017        FNOR
  06662 6001        FPUT F,X
  06663 5102        FGET Y,COMP
  06664 0012        FRND
  06665 0011        UNNOR
  06666 0017        FNOR
  06667 6003        FPUT F,Y
  06670 5022        FGET F,RAD
  06671 1103        FADD K,COMP
  06672 6022        FPUT F,RAD
  06673 0000        FEXT
  06674 5600        JMP I FKERF 06675 4772        100S,JMS ERRPT
  06676 0007        7
  06677 5771        JMP STPRET 06700 2131        2S,ISZ STYPE/START OF SHAPE
  06701 4775        JMS FINDN
  06702 5600        JMP I FKERF
  06703 1353        TAD 9S
  06704 3135        DCA FROMB
  06705 1023        TAD F,NUM
  06706 3136        DCA TOB
  06707 1024        TAD F,TYPE
  06710 7001        IAC
  06711 3132        DCA ITYPE 06712 4775        5S,JMS FINDN
  06713 7000        NOP
  06714 1037        TAD F,STRT
  06715 7650        SNA CLA
  06716 5312        JMP 5S
  06717 4777        JMS FINDL
  06720 7000        NOP
  06721 1023        TAD F,NUM
  06722 3134        DCA TOA
  06723 1024        TAD F,TYPE
  06724 7104        CLL RAL
  06725 1132        TAD ITYPE
  06726 3132        DCA ITYPE
  06727 4777        JMS FINDL
  06730 7000        NOP
  06731 1023        TAD F,NUM
  06732 3133        DCA FROMA
  06733 5246        JMP 9SS 06734 7126        4S,STL RTL/END OF SHAPE
  06735 3131        DCA STYPE
  06736 1133        TAD FROMA
  06737 3023        DCA F,NUM
  06740 4776        JMS FFETCH 06741 4777        8S,JMS FINDL
  06742 7000        NOP
  06743 1037        TAD F,STRT
  06744 7650        SNA CLA
  06745 5341        JMP 8S
  06746 1023        TAD F,NUM
  06747 3135        DCA FROMB
  06750 4775        JMS FINDN
  06751 7000        NOP
  06752 5240        JMP 9SS 06753 0000        9S,0

.DSABL LSB 06754 0000        RECOUN,0/READ COUNTERS
  06755 1166        TAD T,6
  06756 3357        DCA .+1
  06757 7402        HLT
  06760 3417        DCA I XR7
  06761 7001        IAC
  06762 1166        TAD T,6
  06763 3364        DCA .+1
  06764 7402        HLT
  06765 3417        DCA I XR7
  06766 7004        RAL
  06767 3417        DCA I XR7
  06770 5754        JMP I RECOUN 06771 5602
  06772 3200
  06773 0600
  06774 2000
  06775 3333
  06776 1674
  06777 5070
  07000

07000 7200        PWUP,CLA
  07001 1377        TAD (7600-1)
  07002 3010        DCA XR0
  07003 1060        TAD W,AXIS
  07004 6603        6603
  07005 7200        CLA

0000        D=0

0002        .REPT 2

TAD I XR0
                                6500+D
                                CLA
                                TAD I XR0
                                MQL
                                TAD I XR0
                                CLL RAR
                                ACL
                                6501+D
                                CLA

D=D+10

.ENDR

0020        D=20

0002        .REPT 2

TAD I XR0
                                6500+D
                                CLA
                                TAD I XR0
                                MQL
                                TAD I XR0
                                CLL RAR
                                ACL
                                6501+D
                                CLA

D=D+10

.ENDR 07056 1776        TAD SXR0
  07057 3010        DCA XR0
  07060 7001        IAC
  07061 3137        DCA PWRUP
  07062 6007        6007
```

```
51  07063 6430   6430
52  07064 6432   6432
53  07065 1006   TAD RMODE
54  07066 7650   SNA CLA
55  07067 5775   JMP RETPUP
56  07070 6001   ION
57  07071 3137   DCA PWRUP
58  07072 4774   JMS PTAG
59  07073 0102   FILES
60  07074 3076   DCA RECI
61  07075 3127   DCA VMASK
62  07076 4773   JMS SFLOAT
63  07077 0055   W,NUM
64  07100 0020   W,SEQ
65  07101 4772   JMS PDTWU
66  07102 0020   W,SEQ
67  07103 5771   JMP U,SSAU
68
69  07104 4600   PMOPS,R,SLOS;R,SENT;R,SCOR;R,SINS;R,
                 SNUS;R,MEME;R,RLN;R,RTPP
    07105 5010
    07106 5010
    07107 5200
    07110 5024
    07111 5034
    07112 5250
    07113 5276
70  07114 5000   R,LOOK
71
    07171 5634
    07172 3400
    07173 2000
    07174 1470
    07175 0426
    07176 0534
    07177 7577
72  07200

1         0001   FIELD 1
2
3         0004   *4
4
5   10004 0357   UBPV
6
7         0062   *WHENLC
8
9   10062 0002   2
10
11        0200   *200
12
13  10200 0000   ZNUDGE,0/NUDGE OFF Z LIMIT
14  10201 4407   FENT
15  10202 5220   FGET 1$
16  10203 6001   FPUT ZDELT
17  10204 0014   FNEG
18  10205 1016   FADD WZPOS
19  10206 6005   FPUT FZPOS
20  10207 0000   FEXT
21  10210 6603   6603
22  10211 1577   TAD (FP,SM)
23  10212 4776   JMS MOVEZ
24  10213 0001   1
25  10214 6203   CDI 00
26  10215 4775   JMS FUTCH
27  10216 6203   CDI 00
28  10217 5600   JMP I ZNUDGE
29
30  10220 0015   1$,15;234;0
    10221 2342
    10222 0000
31
32  10223 0000   URSQU,0/RETRACT Z
33  10224 4407   FENT
34  10225 5236   FGET 1$
35  10226 6001   FPUT ZDELT
36  10227 0000   FEXT
37  10230 6603   6603
38  10231 1577   TAD (FP,SM)
39  10232 4776   JMS MOVEZ
40  10233 0000   0
41  10234 6203   CDI 00
42  10235 5623   JMP I URSQU
43
44  10236 0027   1$,27;3777;7777
    10237 3777
    10240 7777
45
46  10241 0000   MXYU,0/LINE FRONT END
47  10242 1374   TAD (F,SPD)
48  10243 4773   JMS XYSPC
49
50  10244 1062   2$,TAD WHENLC
51  10245 3772   DCA ENDXC
52  10246 1571   TAD (100)
53  10247 3770   DCA XYXM
54

55  10250 1367   4$,TAD (C,X)
56  10251 6203   CDI 00
57  10252 4766   JMS CNTRIN
58  10253 1365   TAD (C,Y)
59  10254 6203   CDI 00
60  10255 4766   JMS CNTRIN
61  10256 4407   FENT
62  10257 5001   FGET XDEST
63  10260 2014   FSUB C,X
64  10261 0001   FSQ
65  10262 6053   FPUT WFT,0
66  10263 5003   FGET YDEST
67  10264 2015   FSUB C,Y
68  10265 0001   FSQ
69  10266 1053   FADD WFT,0
70  10267 0002   FSQRT
71  10270 4043   FDIV EPSILN
72  10271 0000   FEXT
73  10272 1020   TAD EXP
74  10273 7740   SMA SZA CLA
75  10274 5305   JMP 3$
76  10275 4407   FENT
77  10276 5014   FGET C,X
78  10277 6114   FPUT LAST,X
79  10300 5015   FGET C,Y
80  10301 6115   FPUT LAST,Y
81  10302 0000   FEXT
82
83  10303 6203   5$,CDI 00
84  10304 5641   JMP I MXYU
85
86  10305 4764   3$,JMS JITTER
87  10306 5303   JMP 5$
88  10307 4763   JMS BSTL
89  10310 5250   JMP 4$
90
91  10311 0000   THETU,0/THETA MOVE DRIVER
92  10312 1374   TAD (F,SPD)
93  10313 4773   JMS XYSPC
94
95  10314 1062   2$,TAD WHENLC
96  10315 3772   DCA ENDXC
97  10316 1362   TAD (C,THET)
98  10317 6203   CDI 00
99  10320 4766   JMS CNTRIN
100 10321 4407   FENT
101 10322 5030   FGET FP,ZIP
102 10323 6003   FPUT YDEST
103 10324 6015   FPUT WYPOS
104 10325 6014   FPUT WXPOS
105 10326 5007   FGET F,THET
106 10327 2017   FSUB C,THET
107 10330 6001   FPUT THDEL
108 10331 4043   FDIV EPSILN
109 10332 0000   FEXT
110 10333 1020   TAD EXP
111 10334 7750   SPA SNA CLA
112 10335 5355   JMP 4$
113 10336 4764   JMS JITTER
114 10337 5355   JMP 4$
115 10340 1021   TAD HORD
116 10341 7700   SMA CLA
117 10342 5351   JMP 3$
118 10343 4407   FENT
119 10344 5001   FGET THDEL
120 10345 0014   FNEG
121 10346 6001   FPUT THDEL
122 10347 0000   FEXT
123 10350 7105   CLL IAC RAL
124
125 10351 7001   3$,IAC
126 10352 3770   DCA XYXM
127 10353 4763   JMS BSTL
128 10354 5314   JMP 2$
129
130 10355 6203   4$,CDI 00
131 10356 5711   JMP I THETU
132
133 10357 0000   UBPV,0
134 10360 0000   0
135 10361 0000   0
136
    10362 0017
    10363 1046
    10364 1125
    10365 0015
    10366 3560
    10367 0014
    10370 1123
    10371 0100
    10372 1553
    10373 0517
    10374 0000
    10375 6351
    10376 1000
    10377 0036
137 10400
```

```
  1                       .ENABL LSB
  2
  3              0077      N,S=FT.17
  4
  5    10400 0000  CIRCU,0/CIRCLE DRIVER
  6    10401 3044          DCA .STYPE
  7    10402 1377          TAD (TAD 1S)
  8    10403 3204          DCA 2S
  9
 10    10404 7402   2S,HLT
 11    10405 7510          SPA
 12    10406 5222          JMP 3S
 13    10407 3264          DCA 4S
 14    10410 4407          FENT
 15    10411 5664          FGET I 4S
 16    10412 3037          FMPY FP,SF
 17    10413 0012          FRND
 18    10414 0011          UNNOR
 19    10415 0017          FNOR
 20    10416 6664          FPUT I 4S
 21    10417 0000          FEXT
 22    10420 2204          ISZ 2S
 23    10421 5204          JMP 2S
 24
 25    10422 6607   3S,6607
 26    10423 7410          SKP
 27    10424 5245          JMP 20S
 28    10425 4407          FENT
 29    10426 5000          FGET F,SPD
 30    10427 7246          FJMP 20S+1
 31    10430 0001          ETZ
 32    10431 5275          FGET 5S
 33    10432 4000          FDIV F,SPD
 34    10433 1300          FADD 6S
 35    10434 4303          FDIV 7S
 36    10435 0012          FRND
 37    10436 0011          UNNOR
 38    10437 0017          FNOR
 39    10440 6077          FPUT N,S
 40    10441 2311          FSUB 8S
 41    10442 7250          FJMP 23S
 42    10443 0003          GTZ ETZ
 43    10444 0000          FEXT
 44
 45    10445 4407   20S,FENT
 46    10446 5311          FGET 8S
 47    10447 6077          FPUT N,S
 48
 49    10450 5077   23S,FGET N,S
 50    10451 0011          UNNOR
 51    10452 0000          FEXT
 52    10453 1021          TAD HORD
 53    10454 7640          SZA CLA
 54    10455 3022          DCA LORD
 55    10456 1022          TAD LORD
 56    10457 7041          CIA
 57    10460 3002          DCA RAMPS
 58    10461 4401          JMS I CIRCLE
 59    10462 6203          CDI 00
 60    10463 5600          JMP I CIRCU
 61
 62    10464         40S,
 63    10464 0000    4S,0
 64    10465 0014    1S,C,X;C,Y;FRAD;XCNTR;YCNTR;XDEST;
                                          YDEST;-5
       10466 0015
       10467 0022
       10470 0100
       10471 0045
       10472 0001
       10473 0003
       10474 7773
 65    10475 0021    5S,21;3465;3600;118110 21;3032;4000
                                                FOR 8/A
       10476 3465
       10477 3600
 66
 67    10500 0006    6S,6;4340;0/-57
       10501 4340
       10502 0000
 68    10503 0004    7S,4;3200;0/13
       10504 3200
       10505 0000
 69    10506 0007    9S,7;5440;0/-78
       10507 5440
       10510 0000
 70    10511 0006    8S,6;2440;0/41 6;2100;0 FOR 8/A
       10512 2440
       10513 0000
 71
 72    10514 0006    30S,6;3600;0/60 6;3400;0 FOR 8/A
       10515 3600
       10516 0000
 73
 74
 75    10517 0000    XYSPC,0/COMPUTE NON-CIRCLE SPEED
 76    10520 3264          DCA 40S
 77    10521 1274          TAD 5S-1
 78    10522 3776          DCA JTRC
 79    10523 6607          6607
 80    10524 7410          SKP
 81    10525 5372          JMP 15S
 82    10526 4407          FENT
 83    10527 5664          FGET I 40S
 84    10530 7347          FJMP 10S
 85    10531 0001          ETZ
 86    10532 5275          FGET 5S
 87    10533 4664          FDIV I 40S
 88    10534 1306          FADD 9S
 89    10535 4303          FDIV 7S
 90    10536 0012          FRND
 91    10537 0011          UNNOR
 92    10540 0017          FNOR
 93    10541 7347          FJMP 10S
 94    10542 0005          ETZ LTZ
 95
 96    10543 6051   14S,FPUT STOPSP
 97    10544 2044          FSUB SP,MAX
 98    10545 7351          FJMP 16S
 99    10546 0003          GTZ ETZ
100
101    10547 5044   10S,FGET SP,MAX
102    10550 6051          FPUT STOPSP
103
104    10551 5314   16S,FGET 30S
105    10552 6050          FPUT STRTSP
106    10553 2051          FSUB STOPSP
107    10554 7360          FJMP 13S
108    10555 0002          GTZ
109    10556 5051          FGET STOPSP
110    10557 6050          FPUT STRTSP
111
112    10560 5050   13S,FGET STRTSP
113    10561 0011          UNNOR
114    10562 0000          FEXT
115    10563 1021          TAD HORD
116    10564 7640          SZA CLA
117    10565 3022          DCA LORD
118    10566 1022          TAD LORD
119    10567 7041          CIA
120    10570 3000          DCA RAMPSI
121    10571 5717          JMP I XYSPC
122
123    10572 4407   15S,FENT
124    10573 7347          FJMP 10S
125    10574 0007          UNK
126
127                       .DSABL LSB
128
       10576 1147
       10577 1265
129    10600

1              0001      ZDELT=XDEST
  2
  3    10600 0000  CYZU,0/UPPER CORE Z DRIVER
  4    10601 1377          TAD (C,Z)
  5    10602 6203          CDI 00
  6    10603 4776          JMS CNTRIN
  7    10604 3775          DCA ENDXC
  8    10605 4407          FENT
  9    10606 5005          FGET FZPOS
 10    10607 6352          FPUT TPY7
 11    10610 2016          FSUB WZPOS
 12    10611 6053          FPUT WFT,0
 13    10612 7220          FJMP ZMF
 14    10613 0004          LTZ
 15    10614 5030          FGET FP,ZIP
 16    10615 6021          FPUT FZPK
 17    10616 0000          FEXT
 18    10617 5222          JMP ZMFA
 19
 20    10620 0000   ZMF,FEXT
 21    10621 7001          IAC
 22
 23    10622 3332   ZMFA,DCA ZCMMD
 24    10623 4407          FENT
 25    10624 5053          FGET WFT,0
 26    10625 0006          FABS
 27    10626 6073          FPUT DELTAZ
 28    10627 5341          FGET F,BIGE
 29    10630 6043          FPUT EPSILN
 30    10631 5021          FGET FZPK
 31    10632 7317          FJMP ZMB
 32    10633 0001          ETZ
 33    10634 3344          FMPY F200
 34    10635 6072          FPUT ZINK
 35    10636 6071          FPUT ZINC
 36    10637 5030          FGET FP,ZIP
 37    10640 6001          FPUT ZDELT
 38    10641 0000          FEXT
 39
 40    10642 4407   ZMC,FENT
 41    10643 5073          FGET DELTAZ
```

```
42  10644 2072   FSUB ZINK
43  10645 7535   FJMP ZMD
44  10646 0005   LTZ ETZ
45  10647 6073   FPUT DELTAZ
46  10650 5071   FGET ZDELT
47  10651 1072   FADD ZINK
48  10652 6001   FPUT ZDELT
49  10653 0014   FNEG
50  10654 1016   FADD WZPOS
51  10655 6005   FPUT FZPOS
52  10656 0000   FEXT
53  10657 1374   TAD (F,SPD)
54  10660 4773   JMS MOVEZ
55  10661 0001   1
56  10662 4407   FENT
57  10663 5071   FGET ZINC
58  10664 6001   FPUT ZDELT
59  10665 6070   FPUT ZDETL
60  10666 1016   FADD WZPOS
61  10667 6005   FPUT FZPOS
62  10670 0000   FEXT
63  10671 1372   TAD (FP,SM)
64  10672 4773   JMS MOVEZ
65  10673 0000   0
66  10674 4407   FENT
67  10675 5070   FGET ZDETL
68  10676 2347   FSUB FIVE
69  10677 6001   FPUT ZDELT
70  10700 0014   FNEG
71  10701 1016   FADD WZPOS
72  10702 6005   FPUT FZPOS
73  10703 0000   FEXT
74  10704 1372   TAD (FP,SM)
75  10705 4773   JMS MOVEZ
76  10706 0001   1
77  10707 4407   FENT
78  10710 5347   FGET FIVE
79  10711 6001   FPUT ZDELT
80  10712 5072   FGET ZINK
81  10713 1071   FADD ZINC
82  10714 6071   FPUT ZINC
83  10715 0000   FEXT
84  10716 5242   JMP ZMC
85
86  10717 5073   ZMB,FGET DELTAZ
87  10720 6001   FPUT ZDELT
88
89  10721 5352   ZME,FGET TPY7
90  10722 6005   FPUT FZPOS
91  10723 5116   FGET F,LITE
92  10724 6043   FPUT EPSILN
93  10725 0000   FEXT
94  10726 1062   TAD WHENLC
95  10727 3775   DCA ENDXC
96  10730 1374   TAD (F,SPD)
97  10731 4773   JMS MOVEZ
98
99  10732 0000   ZCMMO,0
100 10733 6203   CDI 00
101 10734 5600   JMP I CYZU
102
103 10735 1072   ZMD,FADD ZINK
104 10736 6001   FPUT ZDELT
105 10737 7321   FJMP ZME
106 10740 0007   UNK
107
108 10741 0005   F,BIGE,5/240010
    10742 2400
    10743 0000
109 10744 0007   F200,7/310010
    10745 3100
    10746 0000
110 10747 0006   FIVE,6/310010
    10750 3100
    10751 0000
111 10752 0000   TPY7,0/010
    10753 0000
    10754 0000
112
    10772 0036
    10773 1000
    10774 0000
    10775 1553
    10776 3560
    10777 0016
113 11000

1                 .ENABL LSB
2
3   11000 0000   MOVEZ,0
4   11001 4777   JMS XYSPC
5   11002 1600   TAD I MOVEZ
6   11003 2200   ISZ MOVEZ
7   11004 7650   SNA CLA
8
9   11005 1376   MOVEZA,TAD (-10)
10  11006 1375   TAD (14)
11  11007 3323   DCA XYXM
12  11010 4407   FENT
13  11011 5030   FGET FP,ZIP
14  11012 6003   FPUT YDEST
15  11013 6015   FPUT WYPOS
16  11014 6014   FPUT WXPOS
17  11015 0000   FEXT
18  11016 4246   JMS BSTL
19  11017 1374   TAD (C,Z)
20  11020 6203   CDI 00
21  11021 4773   JMS CNTRIN
22  11022 4407   FENT
23  11023 5005   FGFT FZPOS
24  11024 2016   FSUB WZPOS
25  11025 6001   FPUT ZDELT
26  11026 4043   FDIV EPSILN
27  11027 0000   FEXT
28  11030 1020   TAD EXP
29  11031 7750   SPA SNA CLA
30  11032 5600   JMP I MOVEZ
31  11033 4325   JMS JITTER
32  11034 5600   JMP I MOVEZ
33  11035 1021   TAD HORD
34  11036 7700   SMA CLA
35  11037 5205   JMP MOVEZA
36
37  11040 4407   MOVEZB,FENT
38  11041 5001   FGET ZDELT
39  11042 0014   FNEG
40  11043 6001   FPUT ZDELT
41  11044 0000   FEXT
42  11045 5206   JMP MOVEZA+1
43
44  11046 0000   BSTL,0
45  11047 3142   DCA SCORE
46  11050 4407   FENT
47  11051 5001   FGET XDEST
48  11052 2014   FSUB WXPOS
49  11053 7261   FJMP BSTLA6
50  11054 0005   GTZ ETZ
51  11055 0014   FNEG
52  11056 0000   FEXT
53  11057 2142   ISZ SCORE
54  11060 4407   FENT
55
56  11061 3037   BSTLA6,FMPY FP,SF
57  11062 0012   FRND
58  11063 0011   UNNOR
59  11064 6175   FPUT DELX
60  11065 5003   FGET YDEST
61  11066 2015   FSUB WYPOS
62  11067 7276   FJMP BSTLA7
63  11070 0005   GTZ ETZ
64  11071 0014   FNEG
65  11072 0000   FEXT
66  11073 2142   ISZ SCORE
67  11074 2142   ISZ SCORE
68  11075 4407   FENT
69
70  11076 3037   BSTLA7,FMPY FP,SF
71  11077 0012   FRND
72  11100 0011   UNNOR
73  11101 6172   FPUT DELY
74  11102 2175   FSUB DELX
75  11103 7316   FJMP BSTLA1
76  11104 0005   LTZ ETZ
77  11105 5175   FGET DELX
78  11106 6167   FPUT MOD
79  11107 5172   FGET DELY
80  11110 6175   FPUT DELX
81  11111 5167   FGET MOD
82  11112 6172   FPUT DELY
83  11113 0000   FEXT
84  11114 1324   TAD XYXM+1
85  11115 5320   JMP 1$
86
87  11116 0000   BSTLA1,FEXT
88  11117 1323   TAD XYXM
89
90  11120 3143   1$,DCA MAJOR
91  11121 4772   JMS BSTLM
92  11122 5646   JMP I BSTL
93
94          0142   SCORE=142
95
96          0175   DELX=175
97          0172   DELY=172
98          0167   MOD=167
99
100 11123 0100   XYXM,100
101 11124 0020   20
102
103                 .DSABL LSB
104
105 11125 0000   JITTER,0/CHECK FOR JITTER
106 11126 2347   ISZ JTRC
107 11127 5536   JMP 1$
```

```
108 11130 7344     STA CLL RAL
109 11131 1020     TAD EXP
110 11132 7750     SPA SNA CLA
111 11133 5340     JMP 2S
112
113 11134 1571  3S,TAD (-5)
114 11135 3547     DCA JTRC
115
116 11136 2325  1S,ISZ JITTER
117 11137 5725     JMP I JITTER
118
119 11140 1021  2S,TAD HORD
120 11141 7510     SPA
121 11142 7041     CIA
122 11143 0370     AND (1400)
123 11144 7650     SNA CLA
124 11145 5725     JMP I JITTER
125 11146 5334     JMP 3S
126
127 11147 0000  JTRC,0
128
    11170 1400
    11171 7773
    11172 1200
    11173 3560
    11174 0016
    11175 0014
    11176 7770
    11177 0517
129 11200

1 11200 0000  BSTLM,0
  2 11201 4407     FENT
  3 11202 5175     FGET DELX
  4 11203 6167     FPUT MOD
  5 11204 0014     FNEG
  6 11205 6164     FPUT COUNT
  7 11206 6175     FPUT DELX
  8 11207 0000     FEXT
  9 11210 1142     TAD SCORE
 10 11211 1315     TAD XYCM
 11 11212 3213     DCA .+1
 12 11213 7402     HLT
 13 11214 3144     DCA MINOR
 14 11215 1144     TAD MINOR
 15 11216 0377     AND (240)
 16 11217 1143     TAD MAJOR
 17
 18 11220 3145  BSTLMD,DCA MAJOR
 19 11221 1165     TAD COUNT+1
 20 11222 7700     SMA CLA
 21 11223 5600     JMP I BSTLM
 22 11224 1170     TAD MOD+1
 23 11225 7110     CLL RAR
 24 11226 3170     DCA MOD+1
 25 11227 1171     TAD MOD+2
 26 11230 7010     RAR
 27 11231 3171     DCA MOD+2
 28 11232 4407     FENT
 29 11233 5052     FGET SPEEDS
 30 11234 0011     UNNOR
 31 11235 0000     FEXT
 32 11236 1022     TAD LORD
 33 11237 7041     CIA
 34 11240 3145     DCA SRSET
 35 11241 7240     STA
 36 11242 3162     DCA FLAT+1
 37 11243 7240     STA
 38 11244 3165     DCA FLAT+2
 39 11245 7001     IAC
 40 11246 3147     DCA RAMPI
 41 11247 1000     TAD RAMPSI
 42 11250 3002     DCA RAMPS
 43 11251 4407     FENT
 44 11252 5050     FGET STRTSP
 45 11253 2051     FSUB STOPSP
 46 11254 3052     FMPY SPEEDS
 47 11255 7300     FJMP BSTLMA
 48 11256 0005     ETZ LTZ
 49 11257 0011     UNNOR
 50 11260 0014     FNEG
 51 11261 6156     FPUT RAMPV
 52 11262 1156     FADD RAMPV
 53 11263 2164     FSUB COUNT
 54 11264 7273     FJMP BSTLMB
 55 11265 0002     GTZ
 56 11266 5167     FGET MOD
 57 11267 0014     FNEG
 58 11270 6156     FPUT RAMPV
 59 11271 0000     FEXT
 60 11272 5776     JMP BSTLG
 61
 62 11273 0011  BSTLMB,UNNOR
 63 11274 0014     FNEG
 64 11275 6161     FPUT FLAT
 65 11276 0000     FEXT
 66 11277 5776     JMP BSTLG
 67
 68 11300 5164  BSTLMA,FGET COUNT
 69 11301 6161     FPUT FLAT
 70 11302 0000     FEXT
 71 11303 5775     JMP BSTLGA
 72
 73 11304 1374  BSTLMH,TAD (0000)
 74 11305 3151     DCA RAMPT
 75
 76 11306 7344  1S,STA CLL RAL
 77 11307 3152     DCA RAMPQ
 78 11310 2152     ISZ RAMPQ
 79 11311 5310     JMP .-1
 80 11312 2151     ISZ RAMPT
 81 11313 5306     JMP 1S
 82 11314 5600     JMP I BSTLM
 83
 84       0143     MAJOR=143
 85       0144     MINOR=144
 86       0164     COUNT=164
 87       0145     SRSET=145
 88       0161     FLAT=161
 89       0156     RAMPV=156
 90       0154     UPDOWN=154
 91       0052     SPEEDS=STEPS
 92       0147     RAMPI=147
 93
 94 11315 1316  XYCM,TAD .+1
 95 11316 0120     120
 96 11317 0320     320
 97 11320 0160     160
 98 11321 0360     360
 99
100 11322 5100  CIRSCC,FGET XCNTR/ZERO RADIUS ALMOST
                                               TANGENT
101 11323 6107     FPUT XCA/TO NON-ZERO RADIUS CIRCLE
102 11324 5045     FGET YCNTR
103 11325 6110     FPUT YCA
104 11326 0000     FEXT
105 11327 1050     TAD .FROMB
106 11330 3046     DCA .FROMA
107 11331 1051     TAD .TOB
108 11332 3047     DCA .TOA
109 11333 7001     IAC
110 11334 3044     DCA .STYPE
111 11335 4773     JMS CIRSOC
112 11336 4407     FENT
113 11337 5107     FGET XCA
114 11340 6100     FPUT XCNTR
115 11341 5110     FGET YCA
116 11342 6045     FPUT YCNTR
117 11343 0000     FEXT
118 11344 5772     JMP .C
119
    11372 2052
    11373 3200
    11374 0000
    11375 1407
    11376 1400
    11377 0240
120 11400

1 11400 1145  BSTLG,TAD SRSET
  2 11401 3150     DCA SPNOW
  3 11402 1157     TAD RAMPV+1
  4 11403 3154     DCA UPDOWN
  5 11404 1160     TAD RAMPV+2
  6 11405 3155     DCA UPDOWN+1
  7 11406 4235     JMS BSTGO
  8
  9 11407 1162  BSTLGA,TAD FLAT+1
 10 11410 3154     DCA UPDOWN
 11 11411 1163     TAD FLAT+2
 12 11412 3155     DCA UPDOWN+1
 13 11413 3147     DCA RAMPI
 14 11414 4235     JMS BSTGO
 15 11415 1157     TAD RAMPV+1
 16 11416 3154     DCA UPDOWN
 17 11417 1160     TAD RAMPV+2
 18 11420 3155     DCA UPDOWN+1
 19 11421 7240     STA
 20 11422 3147     DCA RAMPI
 21 11423 4235     JMS BSTGO
 22
 23 11424 6211  BSTGON,CDF 10
 24 11425 4407     FENT
 25 11426 5116     FGET F.LITE
 26 11427 6043     FPUT EPSILN
 27 11430 0000     FEXT
 28 11431 6203     CDI 00
 29 11432 4777     JMS FUTCH
 30 11433 6203     CDI 00
 31 11434 5776     JMP RUNRET
 32
 33 11435 0000  BSTGO,0
 34 11436 7346     CLL STA RTL
 35 11437 6201     CDF 00
```

```
 36  11440 1775   TAD I (INTVAL)
 37  11441 7650   SNA CLA
 38  11442 5224   JMP RSTGON
 39  11443 6211   CDF 10
 40  11444 7300   CLA CLL
 41  11445 1171   TAD MOD+2
 42  11446 1174   TAD DELY+2
 43  11447 3171   DCA MOD+2
 44  11450 7004   RAL
 45  11451 1170   TAD MOD+1
 46  11452 1173   TAD DELY+1
 47  11453 3170   DCA MOD+1
 48  11454 7300   CLA CLL
 49  11455 1177   TAD DELX+2
 50  11456 1171   TAD MOD+2
 51  11457 3167   DCA MOD
 52  11460 7004   RAL
 53  11461 1170   TAD MOD+1
 54  11462 1176   TAD DELX+1
 55  11463 7510   SPA
 56  11464 5274   JMP BSTG08
 57  11465 3170   DCA MOD+1
 58  11466 1167   TAD MOD
 59  11467 3171   DCA MOD+2
 60  11470 7240   STA
 61  11471 3354   DCA MINI
 62  11472 1144   TAD MINOR
 63  11473 5302   JMP BSTG09
 64
 65  11474 7200   BSTG08,CLA
 66  11475 3354   DCA MINI
 67  11476 3354   DCA MINI
 68  11477 3354   DCA MINI
 69  11500 3354   DCA MINI
 70  11501 1143   TAD MAJOR
 71
 72  11502 6600   BSTG09,6600
 73  11503 7300   CLA CLL
 74  11504 1002   TAD RAMPS
 75  11505 3151   DCA RAMPT
 76
 77  11506 7344   4$,STA CLL RAL
 78  11507 1354   TAD MINI
 79  11510 3152   DCA RAMPO
 80  11511 2152   ISZ RAMPO
 81  11512 5311   JMP .-1
 82  11513 2151   ISZ RAMPT
 83  11514 5306   JMP 4$
 84  11515 2150   ISZ SPNOW
 85  11516 5346   JMP 2$
 86  11517 1145   TAD SRSET
 87  11520 3150   DCA SPNOW
 88  11521 1147   TAD RAMPI
 89  11522 1002   TAD RAMPS
 90  11523 3002   DCA RAMPS
 91
 92  11524 2166   3$,ISZ COUNT+2
 93  11525 5331   JMP 1$
 94  11526 2165   ISZ COUNT+1
 95  11527 7410   SKP
 96  11530 5774   JMP BSTLMR
 97
 98  11531 7300   1$,CLA CLL
 99  11532 1166   TAD COUNT+2
100  11533 1353   TAD ENDXC
101  11534 7204   CLA RAL
102  11535 1165   TAD COUNT+1
103  11536 7700   SMA CLA
104  11537 5774   JMP BSTLMR
105  11540 2155   ISZ UPDOWN+1
106  11541 5236   JMP BSTG0+1
107  11542 7000   NOP
108  11543 2154   ISZ UPDOWN
109  11544 5236   JMP BSTG0+1
110  11545 5635   JMP I BSTG0
111
112  11546 3354   2$,DCA MINI
113  11547 3354   DCA MINI
114  11550 3354   DCA MINI
115  11551 3354   DCA MINI
116  11552 5324   JMP 3$
117
118  11553 0000   ENDXC,0
119  11554 0000   MINI,0
120
121        0150   SPNOW=150
122        0151   RAMPT=151
123        0152   RAMPO=152
124
     11574 1304
     11575 0126
     11576 5605
     11577 6351
125  11600

1        0075   TPY0=FT,15
  2        0074   TPY1=FT,14
  3        0073   TPY2=FT,13
  4        0072   TPY3=FT,12
  5
  6        0001   FXPOS=XDEST
  7        0003   FYPOS=YDEST
  8
  9  11600 0000   CNTRF,0/FIND CIRCLE CENTER
                                      COORDINATES
 10  11601 4407   FENT
 11  11602 5001   FGET FXPOS
 12  11603 2046   FSUB XPOSA
 13  11604 6075   FPUT TPY0
 14  11605 4331   FDIV CIRTWO
 15  11606 1046   FADD XPOSA
 16  11607 6056   FPUT CIRXM
 17  11610 2046   FSUB XPOSA
 18  11611 0001   FSQ
 19  11612 6061   FPUT CIRMC
 20  11613 5003   FGET FYPOS
 21  11614 2047   FSUB YPOSA
 22  11615 6074   FPUT TPY1
 23  11616 4331   FDIV CIRTWO
 24  11617 1047   FADD YPOSA
 25  11620 6057   FPUT CIRYM
 26  11621 2047   FSUB YPOSA
 27  11622 0001   FSQ
 28  11623 1061   FADD CIRMC
 29  11624 6061   FPUT CIRMC
 30  11625 5022   FGET F.RAD
 31  11626 0001   FSQ
 32  11627 2061   FSUB CIRMC
 33  11630 0002   FSQRT
 34  11631 6061   FPUT CIRMC
 35  11632 3075   FMPY TPY0
 36  11633 6073   FPUT TPY2
 37  11634 5074   FGET TPY1
 38  11635 3061   FMPY CIRMC
 39  11636 6072   FPUT TPY3
 40  11637 5074   FGET TPY1
 41  11640 0001   FSQ
 42  11641 6060   FPUT CIRAB
 43  11642 5075   FGET TPY0
 44  11643 0001   FSQ
 45  11644 1060   FADD CIRAB
 46  11645 0002   FSQRT
 47  11646 6060   FPUT CIRAB
 48  11647 7267   FJMP 3$
 49  11650 0001   FTZ
 50  11651 2022   FSUB F.RAD
 51  11652 2022   FSUB F.RAD
 52  11653 7326   FJMP CIRROR
 53  11654 0002   GTZ
 54  11655 0000   FEXT
 55  11656 1057   TAD U.CENT
 56  11657 7650   SNA CLA
 57  11660 5300   JMP 1$
 58  11661 4407   FENT
 59  11662 5072   FGET TPY3
 60  11663 0014   FNEG
 61  11664 6072   FPUT TPY3
 62  11665 0000   FEXT
 63  11666 5305   JMP 2$
 64
 65  11667 5022   3$,FGET F.RAD
 66  11670 7326   FJMP CIRROR
 67  11671 0006   GTZ LTZ
 68  11672 5001   FGET FXPOS
 69  11673 6100   FPUT XCNTR
 70  11674 5003   FGET FYPOS
 71  11675 6045   FPUT YCNTR
 72  11676 0000   FEXT
 73  11677 5600   JMP I CNTRF
 74
 75  11700 4407   1$,FENT
 76  11701 5073   FGET TPY2
 77  11702 0014   FNEG
 78  11703 6073   FPUT TPY2
 79  11704 0000   FEXT
 80
 81  11705 4407   2$,FENT
 82  11706 5073   FGET TPY2
 83  11707 4060   FDIV CIRAB
 84  11710 1057   FADD CIRYM
 85  11711 0012   FRND
 86  11712 0011   UNNOR
 87  11713 0017   FNOR
 88  11714 6045   FPUT YCNTR
 89  11715 5072   FGET TPY3
 90  11716 4060   FDIV CIRAB
 91  11717 1056   FADD CIRXM
 92  11720 0012   FRND
 93  11721 0011   UNNOR
 94  11722 0017   FNOR
 95  11723 6100   FPUT XCNTR
 96
 97  11724 0000   CYCIRX,FEXT
 98  11725 5600   JMP I CNTRF
 99
```

```
100 11726 0000    CIRROR,FEXT
101 11727 6203    CDI 00
102 11730 5777    JMP CIRERR
103
104 11731 0002    CIRTWO,21200010
    11732 2000
    11733 0000
105
106 11734 0000    RADZX,FEXT/CHECK FOR ZERO RADIUS
107 11735 7346    STA CLL RTL
108 11736 1045    TAD .ITYPE
109 11737 7750    SPA SNA CLA
110 11740 5350    JMP 1S
111 11741 1051    TAD .TOB
112 11742 4776    JMS FETCHU
113 11743 4407    FENT
114 11744 5022    FGET F,RAD
115 11745 7775    FJMP CIRSCC
116 11746 0002    GTZ
117 11747 0000    FEXT
118
119 11750 4407    1S,FENT
120 11751 5106    FGET KERF
121 11752 7774    FJMP NOGO
122 11753 0006    LTZ GTZ
123 11754 0000    FEXT
124 11755 5773    JMP GUESS
125
    11773 2117
    11774 2053
    11775 1322
    11776 2540
    11777 6523
126 12000

1               .ENABL LSB
2
3   12000 0000   INTRSX,0/COMPUTE KERFED INTERSECTION
4   12001 4777   JMS MOVEUP
5   12002 0006   6
6   12003 0131   STYPE
7   12004 0044   .STYPE
8   12005 1044   TAD .STYPE
9   12006 7650   SNA CLA
10  12007 5776   JMP 1S
11  12010 1047   TAD .TOA
12  12011 4775   JMS FETCHU
13  12012 4407   FENT
14  12013 5001   FGET F,X
15  12014 6056   FPUT FT,0
16  12015 5003   FGET F,Y
17  12016 6057   FPUT FT,1
18  12017 0000   FEXT
19  12020 1050   TAD .FROMB
20  12021 4775   JMS FETCHU
21  12022 4407   FENT
22  12023 5056   FGET FT,0
23  12024 2001   FSUB F,X
24  12025 0001   FSQ
25  12026 6056   FPUT FT,0
26  12027 5057   FGET FT,1
27  12030 2003   FSUB F,Y
28  12031 0001   FSQ
29  12032 1056   FADD FT,0
30  12033 2774   FSUB CIRTWO
31  12034 7240   FJMP 3S
32  12035 0002   GTZ
33  12036 0000   FEXT
34  12037 5776   JMP 1S
35
36  12040 0000   3S,FEXT
37  12041 7240   STA
38  12042 1044   TAD .STYPE
39  12043 7650   SNA CLA
40  12044 5275   JMP 5S
41  12045 7344   STA CLL RAL
42  12046 1045   TAD .ITYPE
43  12047 7750   SPA SNA CLA
44  12050 5256   JMP 4S
45  12051 4773   JMS CIRSOC
46
47        2052  .C*,
48
49  12052 2200   100S,ISZ INTRSX
50
51  12053 0000   NOGO,FEXT
52  12054 6203   CDI 00
53  12055 5600   JMP I INTRSX
54
55  12056 4772   4S,JMS LINX
56  12057 0046   .FROMA
57  12060 5317   JMP 41S
58
59        2061  .IXC*,
60
61  12061 4407   91S,FENT
62  12062 5106   FGET KERF
63  12063 3104   FMPY SIN,L
64  12064 1001   FADD F,X
65  12065 6101   FPUT X,COMP
66  12066 5106   FGET KERF
67  12067 3105   FMPY COS,L
68  12070 0014   FNEG
69  12071 1003   FADD F,Y
70  12072 6102   FPUT Y,COMP
71  12073 0000   FEXT
72  12074 5252   JMP 100S
73
74  12075 1045   5S,TAD .ITYPE
75  12076 1371   TAD (JMP I 2S-1)
76  12077 3300   DCA .+1
77  12100 7402   HLT
78
79  12101 2105   2S,13S/,8PCIS/13S/,8PCIS
    12102 2421
    12103 2105
    12104 2421
80
81  12105 4772   13S,JMS LINX
82  12106 0050   .FROMB
83  12107 5317   JMP 41S
84
85  12110 4407   90S,FENT
86
87  12111 5111   .LXL,FGET XPRA
88  12112 6101   FPUT X,COMP
89  12113 5112   FGET YPRA
90  12114 6102   FPUT Y,COMP
91  12115 0000   FEXT
92  12116 5252   JMP 100S
93
94        2117  GUESS*,.
95
96  12117 4407   41S,FENT
97  12120 5001   FGET F,X
98  12121 6101   FPUT X,COMP
99  12122 5003   FGET F,Y
100 12123 6102   FPUT Y,COMP
101 12124 0000   FEXT
102 12125 5252   JMP 100S
103
    12171 5700
    12172 3000
    12173 3200
    12174 1731
    12175 2540
    12176 2205
    12177 2672
104 12200

1   12200 0000   102S,0
2   12201 2211   101S,6S/,SEVEN/,ATE/,NINE
    12202 2400
    12203 2431
    12204 2600
3
4   12205 1377   1S,TAD (JMP I 101S-1)
5   12206 1045   TAD .ITYPE
6   12207 3210   DCA .+1
7   12210 7402   HLT
8
9   12211 3200   6S,DCA 102S/LINE-LINE
10  12212 4776   JMS LINX
11  12213 0050   .FROMB
12  12214 2200   ISZ 102S
13  12215 4407   FENT
14  12216 5105   FGET COS,L
15  12217 6076   FPUT FT,16
16  12220 3112   FMPY YPRA
17  12221 6075   FPUT FT,15
18  12222 5104   FGET SIN,L
19  12223 6077   FPUT FT,17
20  12224 3111   FMPY XPRA
21  12225 2075   FSUB FT,15
22  12226 6075   FPUT FT,15
23  12227 0000   FEXT
24  12230 4776   JMS LINX
25  12231 0046   .FROMA
26  12232 5312   JMP 61S
27  12233 1200   TAD 102S
28  12234 7640   SZA CLA
29  12235 5262   JMP 62S
30  12236 4407   FENT
31  12237 5105   FGET COS,L
32  12240 3112   FMPY YPRA
33  12241 6074   FPUT FT,14
34  12242 5111   FGET XPRA
35  12243 3104   FMPY SIN,L
36  12244 2074   FSUB FT,14
37  12245 6074   FPUT FT,14
38  12246 5104   FGET SIN,L
39  12247 3076   FMPY FT,16
40  12250 6073   FPUT FT,13
41  12251 5105   FGET COS,L
```

```
 42  12252 3077  FMPY FT,17                13  12412 0014  FNEG
 43  12253 2073  FSUB FT,13                14  12413 1003  FADD F,Y
 44  12254 6073  FPUT FT,13                15  12414 6112  FPUT YPRA
 45  12255 3040  FMPY FP,MM                16  12415 0000  FEXT
 46  12256 0000  FEXT                      17  12416 4776  JMS CNTRFR
 47  12257 1020  TAD EXP                   18  12417 0050  .FROMB
 48  12260 7740  SMA SZA CLA               19  12420 5236  JMP 16S
 49  12261 5267  JMP 17S                   20
 50                                        21            2421  .SPCIS=.
 51  12262 7240  62S,STA                   22
 52  12263 1044  TAD .STYPE                23  12421 1050  17S,TAD .FROMB
 53  12264 7640  SZA CLA                   24  12422 3046  DCA .FROMA
 54  12265 5775  JMP 91S                   25  12423 1051  TAD .TOB
 55  12266 5774  JMP 13S                   26  12424 3047  DCA .TOA
 56                                        27  12425 7001  IAC
 57  12267 4407  17S,FENT                  28  12426 3044  DCA .STYPE
 58  12270 5076  FGET FT,16                29
 59  12271 3074  FMPY FT,14                30  12427 4775  .SPCIR,JMS CIRSOC
 60  12272 6101  FPUT X,COMP               31  12430 5774  JMP .C
 61  12273 5105  FGET COS,L                32
 62  12274 3075  FMPY FT,15                33  12431 4777  .ATE,JMS LINX/ARC-LINE
 63  12275 2101  FSUB X,COMP               34  12432 0050  .FROMB
 64  12276 4073  FDIV FT,13                35  12433 5226  JMP .SPCIR-1
 65  12277 6101  FPUT X,COMP               36  12434 4776  JMS CNTRFR
 66  12300 5077  FGET FT,17                37  12435 0046  .FROMA
 67  12301 3074  FMPY FT,14                38
 68  12302 6102  FPUT Y,COMP               39  12436 4407  16S,FENT
 69  12303 5104  FGET SIN,L                40  12437 5106  FGET KERF
 70  12304 3075  FMPY FT,15                41  12440 6103  FPUT K,COMP
 71  12305 2102  FSUB Y,COMP               42  12441 5112  FGET YPRA
 72  12306 4073  FDIV FT,13                43  12442 2045  FSUB YCNTR
 73  12307 6102  FPUT Y,COMP               44  12443 3105  FMPY COS,L
 74  12310 0000  FEXT                      45  12444 6060  FPUT DIST
 75  12311 5773  JMP 100S                  46  12445 5100  FGET XCNTR
 76                                        47  12446 2111  FSUB XPRA
 77  12312 1200  61S,TAD 102S              48  12447 3104  FMPY SIN,L
 78  12313 7640  SZA CLA                   49  12450 1060  FADD DIST
 79  12314 5772  JMP 41S                   50  12451 6060  FPUT DIST
 80  12315 5774  JMP 13S                   51  12452 3105  FMPY COS,L
 81                                        52  12453 1045  FADD YCNTR
 82  12316 0000  .DXD,FEXT/COMPUTE SPECIAL LINE-ARC  53  12454 6057  FPUT YSX
 83  12317 7346  STA CLL RTL/OR ARC-LINE INTERSECTION 54  12455 5104  FGET SIN,L
 84  12320 1045  TAD .ITYPE                55  12456 3060  FMPY DIST
 85  12321 7650  SNA CLA                   56  12457 0014  FNEG
 86  12322 4347  JMS .DXDN                 57  12460 1100  FADD XCNTR
 87  12323 1056  TAD U,CCW                 58  12461 6056  FPUT XSX
 88  12324 7640  SZA CLA                   59  12462 5060  FGET DIST
 89  12325 4347  JMS .DXDN                 60  12463 0001  FSQ
 90  12326 4407  FENT                      61  12464 6061  FPUT LEG
 91  12327 5060  FGET DIST                 62  12465 5022  FGET F,RAD
 92  12330 0000  FEXT                      63  12466 0001  FSQ
 93  12331 1021  TAD HORD                  64  12467 2061  FSUB LEG
 94  12332 7710  SPA CLA                   65  12470 7332  FJMP 9S
 95  12333 4347  JMS .DXDN                 66  12471 0004  LTZ
 96  12334 4407  FENT                      67  12472 0002  FSQRT
 97  12335 5061  FGET LEG                  68  12473 6061  FPUT LEG
 98  12336 3105  FMPY COS,L                69  12474 0011  UNNOR
 99  12337 1056  FADD XSX                  70  12475 7773  FJMP .LXL
100  12340 6101  FPUT X,COMP               71  12476 0001  ETZ
101  12341 5061  FGET LEG                  72  12477 5111  FGET XPRA
102  12342 3104  FMPY SIN,L                73  12500 2056  FSUB XSX
103  12343 1057  FADD YSX                  74  12501 6075  FPUT FT,15
104  12344 6102  FPUT Y,COMP               75  12502 0001  FSQ
105  12345 0000  FEXT                      76  12503 6062  FPUT MPPP
106  12346 5773  JMP 100S                  77  12504 5112  FGET YPRA
107                                        78  12505 2057  FSUB YSX
108  12347 0000  .DXDN,0/COMPLIMENT PSEUDO TOOL OFFSET  79  12506 6076  FPUT FT,16
109  12350 4407  FENT                      80  12507 0001  FSQ
110  12351 5061  FGET LEG                  81  12510 1062  FADD MPPP
111  12352 0014  FNEG                      82  12511 0002  FSQRT
112  12353 6061  FPUT LEG                  83  12512 6062  FPUT MPPP
113  12354 0000  FEXT                      84  12513 0011  UNNOR
114  12355 5747  JMP I .DXDN               85  12514 7772  FJMP .DXD
115                                        86  12515 0001  ETZ
116            .DSABL LSB                  87  12516 5075  FGET FT,15
117                                        88  12517 3061  FMPY LEG
     12372 2117                            89  12520 4062  FDIV MPPP
     12373 2052                            90  12521 1056  FADD XSX
     12374 2105                            91  12522 6101  FPUT X,COMP
     12375 2061                            92  12523 5076  FGET FT,16
     12376 3000                            93  12524 3061  FMPY LEG
     12377 5600                            94  12525 4062  FDIV MPPP
118  12400                                 95  12526 1057  FADD YSX
                                           96  12527 6102  FPUT Y,COMP
                                           97  12530 0000  FEXT
  1            .ENABL LSB                  98  12531 5774  JMP .C
  2                                        99
  3  12400 4777  .SEVEN,JMS LINX/LINE-ARC 100  12532 5060  9S,FGET DIST
  4  12401 0046  .FROMA                  101  12533 0006  FABS
  5  12402 5221  JMP 17S                 102  12534 2022  FSUB F,RAD
  6  12403 4407  FENT                    103  12535 7771  FJMP .EMAG
  7  12404 5106  FGET KERF               104  12536 4007  SUBM UNK
  8  12405 3104  FMPY SIN,L              105  12537 2551  .SPLCI
  9  12406 1001  FADD F,X                106
 10  12407 6111  FPUT XPRA               107  12540 0000  FETCHU,0/FETCH AND MOVE PROPERTIES
 11  12410 5106  FGET KERF               108  12541 6203  CDI 00
 12  12411 3105  FMPY COS,L              109  12542 4770  JMS UFETCH
```

```
110  12543  3052   DCA U.TYPE
111  12544  4767   JMS MOVEUP
112  12545  0005   5
113  12546  0032   F.OFF
114  12547  0053   U.OFF
115  12550  5740   JMP I FETCHU
116
117  12551  4407   .SPLCI,FENT
118  12552  5056   FGET XSX
119  12553  6101   FPUT X.COMP
120  12554  5057   FGET YSX
121  12555  6102   FPUT Y.COMP
122  12556  0000   FEXT
123  12557  5774   JMP .C
124
     12567  2672
     12570  6536
     12571  2717
     12572  2316
     12573  2111
     12574  2052
     12575  3200
     12576  3062
     12577  3000
125  12600

1  12600  4777   .NINE,JMS CNTRFR/ARC=ARC
  2  12601  0046   .FROMA
  3  12602  4407   FENT
  4  12603  5100   FGET XCNTR
  5  12604  6107   FPUT XCA
  6  12605  5045   FGET YCNTR
  7  12606  6110   FPUT YCA
  8  12607  5022   FGET F.RAD
  9  12610  6113   FPUT RADA
 10  12611  5001   FGET F.X
 11  12612  6065   FPUT DESTNX
 12  12613  5003   FGET F.Y
 13  12614  6066   FPUT DESTNY
 14  12615  5106   FGET KERF
 15  12616  6103   FPUT K.COMP
 16  12617  0000   FEXT
 17  12620  1056   TAD U.CCW
 18  12621  3060   DCA U.CCWI
 19  12622  4777   JMS CNTRFR
 20  12623  0050   .FROMB
 21  12624  4776   JMS CIRINT
 22  12625  4407   FENT
 23  12626  5107   FGET XCA
 24  12627  6100   FPUT XCNTR
 25  12630  5110   FGET YCA
 26  12631  6045   FPUT YCNTR
 27  12632  0000   FEXT
 28  12633  5775   JMP .C
 29
 30         0056   XSX=FT.0
 31         0057   YSX=FT.1
 32         0060   DIST=FT.2
 33         0061   LEG=FT.3
 34         0062   MPPP=FT.4
 35         0065   DESTNX=FT.7
 36         0066   DESTNY=FT.8
 37
 38                .DSABL LSB
 39
 40  12634  0000   CKERF,0/COMPUTE TRUE KERF VALUE
 41  12635  4407   FENT
 42  12636  5030   FGET FP.ZIP
 43  12637  6106   FPUT KERF
 44  12640  0000   FEXT
 45  12641  1053   TAD U.OFF
 46  12642  7650   SNA CLA
 47  12643  5634   JMP I CKERF
 48  12644  4407   FENT
 49  12645  5023   FGET F.OFFS
 50  12646  6106   FPUT KERF
 51  12647  0000   FEXT
 52  12650  1052   TAD U.TYPE
 53  12651  7640   SZA CLA
 54  12652  5263   JMP 1S
 55
 56  12653  1054   4S,TAD U.SENS
 57  12654  7650   SNA CLA
 58  12655  5634   JMP I CKERF
 59
 60  12656  4407   2S,FENT
 61  12657  0014   FNEG
 62  12660  6106   FPUT KERF
 63  12661  0000   FEXT
 64  12662  5634   JMP I CKERF
 65
 66  12663  1056   1S,TAD U.CCW
 67  12664  7640   SZA CLA
 68  12665  5253   JMP 4S
 69  12666  1054   TAD U.SENS
 70  12667  7640   SZA CLA
 71  12670  5634   JMP I CKERF
 72  12671  5256   JMP 2S
 73
 74  12672  0000   MOVEUP,0/MOVE WORDS FROM BANK 0 TO 1
 75  12673  1672   TAD I MOVEUP
 76  12674  7041   CIA
 77  12675  3316   DCA 1S
 78  12676  2272   ISZ MOVEUP
 79  12677  7240   STA
 80  12700  1672   TAD I MOVEUP
 81  12701  3010   DCA XR0
 82  12702  2272   ISZ MOVEUP
 83  12703  7240   STA
 84  12704  1672   TAD I MOVEUP
 85  12705  3011   DCA XR1
 86  12706  2272   ISZ MOVEUP
 87
 88  12707  6201   2S,CDF 00
 89  12710  1410   TAD I XR0
 90  12711  6211   CDF 10
 91  12712  3411   DCA I XR1
 92  12713  2316   ISZ 1S
 93  12714  5307   JMP 2S
 94  12715  5672   JMP I MOVEUP
 95
 96  12716  0000   1S,0
 97
 98  12717  0000   .EMAG,0/TEST SPECIAL CASE ERROR MAGNITUDE
 99  12720  0006   FABS
100  12721  2032   FSUB FP.TEN
101  12722  7774   FJMP NOGO
102  12723  0002   GTZ
103  12724  0000   FEXT
104  12725  1717   TAD I .EMAG
105  12726  3317   DCA .EMAG
106  12727  5717   JMP I .EMAG
107
     12774  2053
     12775  2052
     12776  3246
     12777  3062
108  13000

1  13000  0000   LINX,0/COMPUTE LINE PARAMETERS
  2  13001  1600   TAD I LINX
  3  13002  2200   ISZ LINX
  4  13003  3261   DCA 1S
  5  13004  1661   TAD I 1S
  6  13005  2261   ISZ 1S
  7  13006  4777   JMS FETCHU
  8  13007  4407   FENT
  9  13010  5001   FGET F.X
 10  13011  6056   FPUT FT.0
 11  13012  5003   FGET F.Y
 12  13013  6057   FPUT FT.1
 13  13014  0000   FEXT
 14  13015  1661   TAD I 1S
 15  13016  4777   JMS FETCHU
 16  13017  4776   JMS CKERF
 17  13020  4407   FENT
 18  13021  5001   FGET F.X
 19  13022  2056   FSUB FT.0
 20  13023  6060   FPUT FT.2
 21  13024  0001   FSQ
 22  13025  6062   FPUT FT.4
 23  13026  5003   FGET F.Y
 24  13027  2057   FSUB FT.1
 25  13030  6061   FPUT FT.3
 26  13031  0001   FSQ
 27  13032  1062   FADD FT.4
 28  13033  0002   FSQRT
 29  13034  6062   FPUT FT.4
 30  13035  7257   FJMP 2S
 31  13036  0001   ETZ
 32  13037  5060   FGET FT.2
 33  13040  4062   FDIV FT.4
 34  13041  6105   FPUT COS.L
 35  13042  5061   FGET FT.3
 36  13043  4062   FDIV FT.4
 37  13044  6104   FPUT SIN.L
 38  13045  3106   FMPY KERF
 39  13046  1056   FADD FT.0
 40  13047  6111   FPUT XPRA
 41  13050  5106   FGET KERF
 42  13051  3105   FMPY COS.L
 43  13052  0014   FNEG
 44  13053  1057   FADD FT.1
 45  13054  6112   FPUT YPRA
 46  13055  0000   FEXT
 47  13056  2200   ISZ LINX
 48  13057  0000   2S,FEXT
 49
 50  13060  5600   JMP I LINX
 51
 52  13061  0000   1S,0
 53
```

```
54  13062 0000   CNTRFR,0/FIND CENTER FRONT END
55  13063 1662        TAD I CNTRFR
56  13064 3515        DCA 1S
57  13065 2262        ISZ CNTRFR
58  13066 1715        TAD I 1S
59  13067 2315        ISZ 1S
60  13070 4777        JMS FETCHU
61  13071 4407        FENT
62  13072 5001        FGET F,X
63  13073 6046        FPUT XPOSA
64  13074 5003        FGET F,Y
65  13075 6047        FPUT YPOSA
66  13076 0000        FEXT
67  13077 1715        TAD I 1S
68  13100 4777        JMS FETCHU
69  13101 4775        JMS CNTRF
70  13102 4776        JMS CKERF
71  13103 4407        FENT
72  13104 1022        FADD F,RAD
73  13105 6022        FPUT F,RAD
74  13106 7312        FJMP 2S
75  13107 0004        LTZ
76  13110 0000        FEXT
77  13111 5662        JMP I CNTRFR
78
79  13112 0000   2S,FEXT
80  13113 6203        CDI 00
81  13114 5774        JMP CIRERR
82
83  13115 0000   1S,0
84
85  13116 0000   CENTUP,0/UPPER CORE NON-KERF CENTER
                                            FINDER
86  13117 3047        DCA .TOA
87  13120 7501        MQA
88  13121 3046        DCA .FROMA
89  13122 4262        JMS CNTRFR
90  13123 0046        .FROMA
91  13124 6203        CDI 00
92  13125 5716        JMP I CENTUP
93
94  13126 0000   CHIDE,0/CHOOSE ARC-ARC SOLUTION
95  13127 4407        FENT
96  13130 5065        FGET DESTNX
97  13131 2107        FSUB XCA
98  13132 3057        FMPY R2
99  13133 6065        FPUT DESTNX
100 13134 5110        FGET YCA
101 13135 2066        FSUB DESTNY
102 13136 3056        FMPY R1
103 13137 1065        FADD DESTNX
104 13140 0011        UNNOR
105 13141 7353        FJMP 1S
106 13142 0001        ETZ
107 13143 7350        FJMP 2S
108 13144 0002        GTZ
109 13145 0000        FEXT
110 13146 1375        TAD (FNOP)
111 13147 5726        JMP I CHIDE
112
113 13150 0000   2S,FEXT
114 13151 1372        TAD (FNEG)
115 13152 5726        JMP I CHIDE
116
117 13153 0000   1S,FEXT
118 13154 1060        TAD U.CCWI
119 13155 7650        SNA CLA
120 13156 1371        TAD (FNOP-FNEG)
121 13157 1372        TAD (FNEG)
122 13160 5726        JMP I CHIDE
123
    13171 7777
    13172 0014
    13173 0013
    13174 6523
    13175 1600
    13176 2634
    13177 2540
124 13200

1   13200 0000   CIRSOC,0/COMPUTE POINT ON RADIUS
2   13201 4777        JMS CNTRFR
3   13202 0046        .FROMA
4   13203 4407        FENT
5   13204 5022        FGET F,RAD
6   13205 2106        FSUB KERF
7   13206 6022        FPUT F,RAD
8   13207 7776        FJMP RADZX
9   13210 0001        ETZ
10  13211 5106        FGET KERF
11  13212 6103        FPUT K,COMP
12  13213 0000        FEXT
13  13214 7240        STA
14  13215 1044        TAD .STYPE
15  13216 7650        SNA CLA
16  13217 5237        JMP 1S
17
18  13220 4407   2S,FENT
19  13221 5001        FGET F,X
20  13222 2100        FSUB XCNTR
21  13223 4022        FDIV F,RAD
22  13224 3106        FMPY KERF
23  13225 1001        FADD F,X
24  13226 6101        FPUT X,COMP
25  13227 5003        FGET F,Y
26  13230 2045        FSUB YCNTR
27  13231 4022        FDIV F,RAD
28  13232 3106        FMPY KERF
29  13233 1003        FADD F,Y
30  13234 6102        FPUT Y,COMP
31  13235 0000        FEXT
32  13236 5600        JMP I CIRSOC
33
34  13237 4407   1S,FENT
35  13240 5046        FGET XPOSA
36  13241 6001        FPUT F,X
37  13242 5047        FGET YPOSA
38  13243 6003        FPUT F,Y
39  13244 0000        FEXT
40  13245 5220        JMP 2S
41
42        0056   R1=FT,0
43        0057   R2=FT,1
44        0060   A1=FT,2
45        0061   K4SQ=FT,3
46        0062   K3SQ=FT,4
47        0063   C1=FT,5
48        0064   C2=FT,6
49
50  13246 0000   CIRINT,0/COMPUTE ARC INTERSECTIONS
51  13247 4407        FENT
52  13250 5100        FGET XCNTR
53  13251 2107        FSUB XCA
54  13252 6056        FPUT R1
55  13253 0001        FSQ
56  13254 6060        FPUT A1
57  13255 5045        FGET YCNTR
58  13256 2110        FSUB YCA
59  13257 6057        FPUT R2
60  13260 0001        FSQ
61  13261 1060        FADD A1
62  13262 0002        FSQRT
63  13263 6060        FPUT A1
64  13264 2032        FSUB FP,TEN
65  13265 7355        FJMP 1S
66  13266 0005        LTZ ETZ
67  13267 5022        FGET F,RAD
68  13270 1113        FADD RADA
69  13271 2060        FSUB A1
70  13272 7357        FJMP 2S
71  13273 0004        LTZ
72  13274 5056        FGET R1
73  13275 4060        FDIV A1
74  13276 6056        FPUT R1
75  13277 5057        FGET R2
76  13300 4060        FDIV A1
77  13301 6057        FPUT R2
78  13302 0000        FEXT
79  13303 4775        JMS CHIDE
80  13304 3332        DCA 3S
81  13305 4407        FENT
82  13306 5022        FGET F,RAD
83  13307 0001        FSQ
84  13310 6061        FPUT K4SQ
85  13311 5113        FGET RADA
86  13312 0001        FSQ
87  13313 6062        FPUT K3SQ
88  13314 2061        FSUB K4SQ
89  13315 6063        FPUT C1
90  13316 5060        FGET A1
91  13317 0001        FSQ
92  13320 1063        FADD C1
93  13321 4060        FDIV A1
94  13322 4774        FDIV CIRTWO
95  13323 6063        FPUT C1
96  13324 0001        FSQ
97  13325 0014        FNEG
98  13326 1062        FADD K3SQ
99  13327 7362        FJMP 4S
100 13330 0004        LTZ
101 13331 0002        FSQRT
102
103 13332 0013   3S,FNOP
104 13333 6064        FPUT C2
105 13334 3057        FMPY R2
106 13335 6101        FPUT X,COMP
107 13336 5063        FGET C1
108 13337 3056        FMPY R1
109 13340 2101        FSUB X,COMP
110 13341 1107        FADD XCA
111 13342 6101        FPUT X,COMP
112 13343 5064        FGET C2
113 13344 3056        FMPY R1
114 13345 6102        FPUT Y,COMP
```

```
115  13346  5063    FGET C1
116  13347  3057    FMPY R2
117  13350  1102    FADD Y,COMP
118  13351  1110    FADD YCA
119  13352  6102    FPUT Y,COMP
120  13353  0000    FEXT
121  13354  5646    JMP I CIRINT
122
123  13355  5113  1$,FGET RADA
124  13356  2022    FSUB F,RAD
125
126  13357  7773  2$,FJMP .EMAG
127  13360  4007    SUBM UNK
128  13361  2426    .SPCIR=1
129
130  13362  5022  4$,FGET F,RAD
131  13363  2113    FSUB RADA
132  13364  0006    FABS
133  13365  2060    FSUB A1
134  13366  7357    FJMP 2$
135  13367  0007    UNK
136
     13373  2717
     13374  1731
     13375  3126
     13376  1734
     13377  3062
137  13400
1           0000    NOMET=0
2           0001    METOK=1
3           0001    SIGNED=1
4           0000    NOSIGN=0
5           0000    NOSPEC=0
6
7    13400  0000    VCTST,F,SPD;FP,TEN;NOMET;FP,
                        SM;NOSPEC;NOSIGN;1714
     13401  0032
     13402  0000
     13403  0036
     13404  0000
     13405  0000
     13406  0017
     13407  0004
8    13410  0001    F,X;FP,XM;METOK;FP,MM;B,
                        ADX;SIGNED;3616
     13411  0035
     13412  0001
     13413  0040
     13414  0041
     13415  0001
     13416  0036
     13417  0006
9    13420  0002    D,X;FP,XM;METOK;FP,MM;
                        NOSPEC;SIGNED;3616
     13421  0035
     13422  0001
     13423  0040
     13424  0000
     13425  0001
     13426  0036
     13427  0006
10   13430  0003    F,Y;FP,XM;METOK;FP,MM;
                        B,ADY;SIGNED;4516
     13431  0035
     13432  0001
     13433  0040
     13434  0042
     13435  0001
     13436  0045
     13437  0006
11   13440  0004    D,Y;FP,XM;METOK;FP,MM;
                        NOSPEC;SIGNED;4516
     13441  0035
     13442  0001
     13443  0040
     13444  0000
     13445  0001
     13446  0045
     13447  0006
12   13450  0005    F,Z;FP,XM;METOK;FP,MM;
                        B,ADZ;SIGNED;5416
     13451  0035
     13452  0001
     13453  0040
     13454  0043
     13455  0001
     13456  0054
     13457  0006
13   13460  0006    D,Z;FP,MM;METOK;FP,MM;
                        NOSPEC;SIGNED;5416
     13461  0040
     13462  0001
     13463  0040
     13464  0000
     13465  0001
     13466  0054
     13467  0006
14   13470  0007    F,THET;FP,C;NOMET;FP,MM;B,ADTH;
                        SIGNED;6316
     13471  0035
     13472  0000
     13473  0040
     13474  0044
     13475  0001
     13476  0063
     13477  0006
15   13500  0010    D,THET;FP,C;NOMET;FP,MM;NOSPEC;
                        SIGNED;6316
     13501  0035
     13502  0000
     13503  0040
     13504  0000
     13505  0001
     13506  0063
     13507  0006
16   13510  0011    F,SSP;FP,ONE;NOMET;FP,LC;NOSPEC;
                        NOSIGN;2312
     13511  0031
     13512  0000
     13513  0041
     13514  0000
     13515  0000
     13516  0023
     13517  0002
17   13520  0012    F,THIS;FP,ONE;NOMET;FP,LC;NOSPEC;
                        NOSIGN;1312
     13521  0031
     13522  0000
     13523  0041
     13524  0000
     13525  0000
     13526  0013
     13527  0002
18   13530  0013    F,NEXT;FP,ONE;NOMET;FP,LC;NOSPEC;
                        NOSIGN;1512
     13531  0031
     13532  0000
     13533  0041
     13534  0000
     13535  0000
     13536  0015
     13537  0002
19   13540  0014    C,X;FP,ONE;NOMET;FP,MM;NOSPEC;
                        SIGNED;6502;6
     13541  0031
     13542  0000
     13543  0040
     13544  0000
     13545  0001
     13546  6502
     13547  0006
20   13550  0015    C,Y;FP,ONE;NOMET;FP,MM;NOSPEC;
                        SIGNED;6512;6
     13551  0031
     13552  0000
     13553  0040
     13554  0000
     13555  0001
     13556  6512
     13557  0006
21   13560  0016    C,Z;FP,ONE;NOMET;FP,MM;NOSPEC;
                        SIGNED;6522;6
     13561  0031
     13562  0000
     13563  0040
     13564  0000
     13565  0001
     13566  6522
     13567  0006
22   13570  0017    C,THET;FP,ONE;NOMET;FP,MM;NOSPEC;
                        SIGNED;6532;6
     13571  0031
     13572  0000
     13573  0040
     13574  0000
     13575  0001
     13576  6532
     13577  0006
23   13600  0020    W,SEQ;FP,ONE;NOMET;NRECS;NOSPEC;
                        NOSIGN;3214
     13601  0031
     13602  0000
     13603  0055
     13604  0000
     13605  0000
     13606  0032
     13607  0004
24   13610  0021    F,PECK;FP,ONE;NOMET;FP,LC;NOSPEC;
                        NOSIGN;2512
     13611  0031
     13612  0000
     13613  0041
     13614  0060
```

```
        13615 0000                                                    4           0022   RADIUS=FRAD
        13616 0025                                                    5
        13617 0002                                                    6           4000   *4000
     25 13620 0022   F,RAD;FP,XM;METOK;FP,MM;NOSPEC;                  7
                                        NOSIGN;016                    8  14000 0000   A,0/CIRCULAR INTERPOLATION
        13621 0035                                                    9  14001 6201   CDF 00
        13622 0001                                                 5 10  14002 1777   TAD I (F,CCW)
        13623 0040                                                   11  14003 6211   CDF 10
        13624 0000                                                   12  14004 3131   DCA DRCTN
        13625 0000                                                   13  14005 4407   FENT
        13626 0000                                                   14  14006 5014   FGET XPOS
        13627 0006                                                   15  14007 2100   FSUB XCNTR
     26 13630 0023   F,OFFS;FP,XM;NOMET;FP,CM;NOSPEC;                 16  14010 0011   UNNOR
                                        NOSIGN;615                10 17  14011 6156   FPUT XL-1
        13631 0035                                                   18  14012 5015   FGET YPOS
        13632 0000                                                   19  14013 2045   FSUB YCNTR
        13633 0042                                                   20  14014 0011   UNNOR
        13634 0000                                                   21  14015 6161   FPUT YL-1
        13635 0000                                                   22  14016 5001   FGET XDEST
        13636 0006                                                   23  14017 2100   FSUB XCNTR
        13637 0005                                                15 24  14020 0011   UNNOR
     27 13640 0024   F,N;FP,ONE;NOMET;FP,M;NOSPEC;                    25  14021 0014   FNEG
                                        NOSIGN;2713                  26  14022 6154   FPUT FX-1
        13641 0031                                                   27  14023 5003   FGET YDEST
        13642 0000                                                   28  14024 2045   FSUB YCNTR
        13643 0034                                                   29  14025 0011   UNNOR
        13644 0000                                                   30  14026 0014   FNEG
        13645 0000                                                20 31  14027 6152   FPUT FY-1
        13646 0027                                                   32  14030 5022   FGET RADIUS
        13647 0003                                                   33  14031 0000   FEXT
     28 13650 0025   E,NUM;FP,ONE;NOMET;FP,C;NOSPEC;                  34  14032 4776   JMS RADISH
                                        NOSIGN;3214                  35  14033 1365   TAD N9
        13651 0031                                                   36  14034 1020   TAD EXP
        13652 0000                                                   37  14035 7550   SPA SNA
        13653 0033                                                25 38  14036 5244   JMP AA
        13654 0000                                                   39  14037 1366   TAD P6
        13655 0000                                                   40  14040 7110   CLL RAR
        13656 0032                                                   41  14041 7430   SZL
        13657 0004                                                   42  14042 7001   IAC
     29              $                                                43  14043 7410   SKP
                                                                     44
      1              .TITLE HAMILL CO, BANC-4 16-NOV-76            30 45  14044 7325   AA,CLA STL RAL IAC
      2              .SBTTL PROGRAMMED BY J. C. KILBANE                46  14045 3145   DCA SHF
      3                                                                47
      4         0001 FIELD 1                                           48  14046 1145   AB,TAD SHF
      5                                                                49  14047 7001   IAC
      6              .DSABL PNC                                        50  14050 3146   DCA SHN
      7                                                                51
      8         0130 *130                                           35 52  14051 1375   AC,TAD (68,+41,)/68,+34, (146 OCTAL)
      9                                                                                            FOR 8/A
     10 10130 0000   SPEED,0                                           53  14052 1002   TAD RAMPS
     11 10131 0000   DRCTN,0                                           54  14053 7510   SPA
     12 10132 0000   SCORE,0                                           55  14054 7410   SKP
     13 10133 0027   27                                                56  14055 7200   CLA
     14 10134 0000   OX,010                                            57  14056 1374   TAD (-41,)/-34, (7736 OCTAL) FOR 8/A
        10135 0000                                                     58  14057 3130   DCA SPEED
     15 10136 0027   27                                             40 59  14060 1157   TAD XL
     16 10137 0000   OY,010                                            60  14061 3165   DCA SRX
        10140 0000                                                     61  14062 1160   TAD XL+1
     17 10141        MOD,                                              62  14063 3166   DCA SRX+1
     18 10141 0000   XT,010                                            63  14064 1161   TAD XL+2
        10142 0000                                                     64  14065 3167   DCA SRX+2
     19 10143 0000   COUNT,010                                         65  14066 1162   TAD YL
        10144 0000                                                  45 66  14067 3170   DCA SRY
     20 10145 0000   SHF,0                                             67  14070 1163   TAD YL+1
     21 10146 0000   SHN,0                                             68  14071 3171   DCA SRY+1
     22 10147 0000   XS,0                                              69  14072 1164   TAD YL+2
     23 10150 0000   YS,0                                              70  14073 3172   DCA SRY+2
     24 10151 0000   XSL,0                                             71  14074 1131   TAD DRCTN
     25 10152 0000   YSL,0                                             72  14075 7640   SZA CLA
     26 10153 0000   FY,010                                         50 73  14076 5301   JMP AD
        10154 0000                                                     74  14077 4757   JMS I COMPX
     27 10155 0000   FX,010                                            75  14100 7410   SKP
        10156 0000                                                     76
     28 10157 0000   XL,0;0;0                                          77  14101 4760   AD,JMS I COMPY
        10160 0000                                                     78  14102 1145   TAD SHF
        10161 0000                                                     79  14103 4761   JMS I SHFTX
     29 10162 0000   YL,0;0;0                                       55 80  14104 1165   TAD SRX
        10163 0000                                                     81  14105 3141   DCA XT
        10164 0000                                                     82  14106 1166   TAD SRX+1
     30 10165 0000   SRX,0;0;0                                         83  14107 3142   DCA XT+1
        10166 0000                                                     84  14110 1167   TAD SRX+2
        10167 0000                                                     85  14111 3143   DCA XT+2
     31 10170 0000   SRY,0;0;0                                         86  14112 1146   TAD SHN
        10171 0000                                                  60 87  14113 4761   JMS I SHFTX
        10172 0000                                                     88  14114 1131   TAD DRCTN
     32 10173 0000   SWITCH,0                                          89  14115 7640   SZA CLA
     33 10174 0000   MAJOR,0                                           90  14116 4757   JMS I COMPX
     34 10175 0000   MINOR,0                                           91  14117 1145   TAD SHF
     35 10176 0000   XCARRY,0                                          92  14120 4762   JMS I SHFTY
     36 10177 0000   YCARRY,0                                          93  14121 7100   CLL
     37                                                             65 94  14122 1172   TAD SRY+2
     38              .ENABL PNC                                        95  14123 1167   TAD SRX+2
                                                                       96  14124 3167   DCA SRX+2
      1                                                                97  14125 7004   RAL
      2         0014 XPOS=C,X                                          98  14126 1171   TAD SRY+1
      3         0015 YPOS=C,Y                                          99  14127 1166   TAD SRX+1
```

```
100  14130  3166        DCA SRX+1
101  14131  7004        RAL
102  14132  1170        TAD SRY
103  14133  1165        TAD SRX
104  14134  3165        DCA SRX
105  14135  1146        TAD SHN
106  14136  4762        JMS I SHFTY
107  14137  1131        TAD DRCTN
108  14140  7650        SNA CLA
109  14141  4760        JMS I COMPY
110  14142  7100        CLL
111  14143  1172        TAD SRY+2
112  14144  1143        TAD XT+2
113  14145  3172        DCA SRY+2
114  14146  7004        RAL
115  14147  1171        TAD SRY+1
116  14150  1142        TAD XT+1
117  14151  3171        DCA SRY+1
118  14152  7004        RAL
119  14153  1170        TAD SRY
120  14154  1141        TAD XT
121  14155  3170        DCA SRY
122  14156  5763        JMP I NEXT
123
124  14157  4326        COMPX,XCOMP
125  14160  4346        COMPY,YCOMP
126  14161  4411        SHFTX,XSHFT
127  14162  4417        SHFTY,YSHFT
128  14163  4200        NEXT,AI
129  14164  5600        EXIT,JMP I A
130
131  14165  7767        N9,-11
132  14166  0006        P6,6
     14174  7727
     14175  0155
     14176  4400
     14177  0035
133  14200

1  14200  7100        AI,CLL
  2  14201  1167        TAD SRX+2
  3  14202  1161        TAD XL+2
  4  14203  3161        DCA XL+2
  5  14204  7004        RAL
  6  14205  3176        DCA XCARRY
  7  14206  1176        TAD XCARRY
  8  14207  1166        TAD SRX+1
  9  14210  1160        TAD XL+1
 10  14211  3160        DCA XL+1
 11  14212  7004        RAL
 12  14213  1165        TAD SRX
 13  14214  1157        TAD XL
 14  14215  3157        DCA XL
 15  14216  7100        CLL
 16  14217  1172        TAD SRY+2
 17  14220  1164        TAD YL+2
 18  14221  3164        DCA YL+2
 19  14222  7004        RAL
 20  14223  3177        DCA YCARRY
 21  14224  1177        TAD YCARRY
 22  14225  1171        TAD SRY+1
 23  14226  1163        TAD YL+1
 24  14227  3163        DCA YL+1
 25  14230  7004        RAL
 26  14231  1170        TAD SRY
 27  14232  1162        TAD YL
 28  14233  3162        DCA YL
 29  14234  7100        CLL
 30  14235  1156        TAD FX+1
 31  14236  1160        TAD XL+1
 32  14237  7204        CLA RAL
 33  14240  1155        TAD FX
 34  14241  1157        TAD XL
 35  14242  7710        SPA CLA
 36  14243  7001        IAC
 37  14244  3151        DCA XSL
 38  14245  7100        CLL
 39  14246  1154        TAD FY+1
 40  14247  1163        TAD YL+1
 41  14250  7204        CLA RAL
 42  14251  1153        TAD FY
 43  14252  1162        TAD YL
 44  14253  7710        SPA CLA
 45  14254  7001        IAC
 46  14255  3152        DCA YSL
 47  14256  1151        TAD XSL
 48  14257  7041        CIA
 49  14260  1147        TAD XS
 50  14261  7650        SNA CLA
 51  14262  5312        JMP AJ
 52  14263  1152        TAD YSL
 53  14264  7041        CIA
 54  14265  1150        TAD YS
 55  14266  7650        SNA CLA
 56  14267  5305        JMP AK
 57

58  14270  1173        AL,TAD SWITCH
 59  14271  7640        SZA CLA
 60  14272  5766        JMP I AR
 61
 62  14273  1151        AM,TAD XSL
 63  14274  3147        DCA XS
 64  14275  1152        TAD YSL
 65  14276  3150        DCA YS
 66  14277  4767        JMS I BSTLA
 67  14300  7001        IAC
 68  14301  3173        DCA SWITCH
 69  14302  5770        JMP I CP
 70
 71  14303  1153        AK,TAD FY
 72  14304  7710        SPA CLA
 73  14305  7130        STL RAR
 74  14306  1162        TAD YL
 75  14307  7700        SMA CLA
 76  14310  5273        JMP AM
 77  14311  5270        JMP AL
 78
 79  14312  1152        AJ,TAD YSL
 80  14313  7041        CIA
 81  14314  1150        TAD YS
 82  14315  7650        SNA CLA
 83  14316  5273        JMP AM
 84  14317  1155        TAD FX
 85  14320  7710        SPA CLA
 86  14321  7130        STL RAR
 87  14322  1157        TAD XL
 88  14323  7700        SMA CLA
 89  14324  5273        JMP AM
 90  14325  5270        JMP AL
 91
 92  14326  0000        XCOMP,0
 93  14327  7100        CLL
 94  14330  1167        TAD SRX+2
 95  14331  7041        CIA
 96  14332  3167        DCA SRX+2
 97  14333  1166        TAD SRX+1
 98  14334  7040        CMA
 99  14335  7430        SZL
100  14336  7101        CLL IAC
101  14337  3166        DCA SRX+1
102  14340  1165        TAD SRX
103  14341  7040        CMA
104  14342  7430        SZL
105  14343  7101        CLL IAC
106  14344  3165        DCA SRX
107  14345  5726        JMP I XCOMP
108
109  14346  0000        YCOMP,0
110  14347  7100        CLL
111  14350  1172        TAD SRY+2
112  14351  7041        CIA
113  14352  3172        DCA SRY+2
114  14353  1171        TAD SRY+1
115  14354  7040        CMA
116  14355  7430        SZL
117  14356  7101        CLL IAC
118  14357  3171        DCA SRY+1
119  14360  1170        TAD SRY
120  14361  7040        CMA
121  14362  7430        SZL
122  14363  7101        CLL IAC
123  14364  3170        DCA SRY
124  14365  5746        JMP I YCOMP
125
126  14366  4164        AR,EXIT
127  14367  4600        BSTLA,ABSTL
128  14370  4051        CP,AC
129
130  14400

1  14400  0000        RADISH,0/CHECK FOR ZERO RADIUS
  2  14401  7346        STA CLL RTL
  3  14402  1020        TAD EXP
  4  14403  7750        SPA SNA CLA
  5  14404  5777        JMP EXIT
  6  14405  3164        DCA YL+2
  7  14406  3161        DCA XL+2
  8  14407  3173        DCA SWITCH
  9  14410  5600        JMP I RADISH
 10
 11  14411  0000        XSHFT,0
 12  14412  1311        TAD M9
 13  14413  7041        CIA
 14  14414  1261        TAD XJMP
 15  14415  3216        DCA .+1
 16  14416  7402        HLT
 17
 18  14417  0000        YSHFT,0
 19  14420  1311        TAD M9
 20  14421  7041        CIA
 21  14422  1275        TAD YJMP
 22  14423  3224        DCA .+1
```

```
 23  14424 7402  HLT
 24
 25  14425 0000  SXR,0
 26  14426 7100  CLL
 27  14427 1165  TAD SRX
 28  14430 7510  SPA
 29  14431 7120  STL
 30  14432 7010  RAR
 31  14433 3165  DCA SRX
 32  14434 1166  TAD SRX+1
 33  14435 7010  RAR
 34  14436 3166  DCA SRX+1
 35  14437 1167  TAD SRX+2
 36  14440 7010  RAR
 37  14441 3167  DCA SRX+2
 38  14442 5625  JMP I SXR
 39
 40  14443 0000  SYR,0
 41  14444 7100  CLL
 42  14445 1170  TAD SRY
 43  14446 7510  SPA
 44  14447 7120  STL
 45  14450 7010  RAR
 46  14451 3170  DCA SRY
 47  14452 1171  TAD SRY+1
 48  14453 7010  RAR
 49  14454 3171  DCA SRY+1
 50  14455 1172  TAD SRY+2
 51  14456 7010  RAR
 52  14457 3172  DCA SRY+2
 53  14460 5643  JMP I SYR
 54
 55  14461 5262  XJMP,JMP .+1
 56  14462 4225  JMS SXR
 57  14463 4225  JMS SXR
 58  14464 4225  JMS SXR
 59  14465 4225  JMS SXR
 60  14466 4225  JMS SXR
 61  14467 4225  JMS SXR
 62  14470 4225  JMS SXR
 63  14471 4225  JMS SXR
 64  14472 4225  JMS SXR
 65  14473 4225  JMS SXR
 66  14474 5611  JMP I XSHFT
 67
 68  14475 5276  YJMP,JMP .+1
 69  14476 4243  JMS SYR
 70  14477 4243  JMS SYR
 71  14500 4243  JMS SYR
 72  14501 4243  JMS SYR
 73  14502 4243  JMS SYR
 74  14503 4243  JMS SYR
 75  14504 4243  JMS SYR
 76  14505 4243  JMS SYR
 77  14506 4243  JMS SYR
 78  14507 4243  JMS SYR
 79  14510 5617  JMP I YSHFT
 80
 81  14511 7766  M9,-12
 82
     14577 4164
 83  14600

1  14600 0000  ABSTL,0
  2  14601 7100  CLL
  3  14602 1176  TAD XCARRY
  4  14603 1166  TAD SRX+1
  5  14604 3166  DCA SRX+1
  6  14605 7004  RAL
  7  14606 1165  TAD SRX
  8  14607 3165  DCA SRX
  9  14610 7100  CLL
 10  14611 1177  TAD YCARRY
 11  14612 1171  TAD SRY+1
 12  14613 3171  DCA SRY+1
 13  14614 7004  RAL
 14  14615 1170  TAD SRY
 15  14616 3170  DCA SRY
 16  14617 3132  DCA SCORE
 17  14620 1165  TAD SRX
 18  14621 7700  SMA CLA
 19  14622 5235  JMP STLA
 20  14623 2132  ISZ SCORE
 21  14624 7100  CLL
 22  14625 1166  TAD SRX+1
 23  14626 7041  CIA
 24  14627 3166  DCA SRX+1
 25  14630 1165  TAD SRX
 26  14631 7040  CMA
 27  14632 7430  SZL
 28  14633 7101  IAC CLL
 29  14634 3165  DCA SRX
 30
 31  14635 1170  STLA,TAD SRY
 32  14636 7700  SMA CLA
 33  14637 5253  JMP STLB
 34  14640 2132  ISZ SCORE
 35  14641 2132  ISZ SCORE
 36  14642 7100  CLL
 37  14643 1171  TAD SRY+1
 38  14644 7041  CIA
 39  14645 3171  DCA SRY+1
 40  14646 1170  TAD SRY
 41  14647 7040  CMA
 42  14650 7430  SZL
 43  14651 7101  CLL IAC
 44  14652 3170  DCA SRY
 45
 46  14653 7100  STLB,CLL
 47  14654 1171  TAD SRY+1
 48  14655 7041  CIA
 49  14656 3140  DCA DY+1
 50  14657 1170  TAD SRY
 51  14660 7040  CMA
 52  14661 7430  SZL
 53  14662 7001  IAC
 54  14663 3137  DCA DY
 55  14664 7100  CLL
 56  14665 1166  TAD SRX+1
 57  14666 1140  TAD DY+1
 58  14667 7204  CLA RAL
 59  14670 1165  TAD SRX
 60  14671 1137  TAD DY
 61  14672 7700  SMA CLA
 62  14673 5306  JMP STLC
 63  14674 1170  TAD SRY
 64  14675 3134  DCA DX
 65  14676 1171  TAD SRY+1
 66  14677 3135  DCA DX+1
 67  14700 1165  TAD SRX
 68  14701 3137  DCA DY
 69  14702 1166  TAD SRX+1
 70  14703 3140  DCA DY+1
 71  14704 1563  TAD XMTAB+1
 72  14705 5317  JMP STLD
 73
 74  14706 1165  STLC,TAD SRX
 75  14707 3134  DCA DX
 76  14710 1166  TAD SRX+1
 77  14711 3135  DCA DX+1
 78  14712 1170  TAD SRY
 79  14713 3137  DCA DY
 80  14714 1171  TAD SRY+1
 81  14715 3140  DCA DY+1
 82  14716 1362  TAD XMTAB
 83
 84  14717 3174  STLD,DCA MAJOR
 85  14720 1044  TAD .STYPE
 86  14721 1173  TAD SWITCH
 87  14722 7640  SZA CLA
 88  14723 5356  JMP 1$
 89  14724 1377  TAD (27)
 90  14725 3133  DCA DX-1
 91  14726 1377  TAD (27)
 92  14727 3136  DCA DY-1
 93  14730 4407  FENT
 94  14731 5014  FGET XPOS
 95  14732 2001  FSUB XDEST
 96  14733 0001  FSQ
 97  14734 6053  FPUT WFT,0
 98  14735 5015  FGET YPOS
 99  14736 2003  FSUB YDEST
100  14737 0001  FSQ
101  14740 1053  FADD WFT,0
102  14741 6053  FPUT WFT,0
103  14742 5133  FGET DX-1
104  14743 0017  FNOR
105  14744 0001  FSQ
106  14745 6054  FPUT WFT,1
107  14746 5136  FGET DY-1
108  14747 0017  FNOR
109  14750 0001  FSQ
110  14751 1054  FADD WFT,1
111  14752 2053  FSUB WFT,0
112  14753 7360  FJMP 2$
113  14754 0003  GTZ LTZ
114  14755 0000  FEXT
115
116  14756 4776  1$,JMS MOVE
117  14757 5600  JMP I ABSTL
118
119  14760 0000  2$,FEXT
120  14761 5775  JMP FXIT
121
122  14762 0100  XMTAB,100
123  14763 0020  20
124
     14775 4164
     14776 5000
     14777 0027
125  15000
```

```
1    15000 0000   MOVE,0
2    15001 1135   TAD DX+1
3    15002 7040   CMA
4    15003 3144   DCA COUNT+1
5    15004 1134   TAD DX
6    15005 7040   CMA
7    15006 3143   DCA COUNT
8    15007 1134   TAD DX
9    15010 7110   CLL RAR
10   15011 3141   DCA MOD
11   15012 1135   TAD DX+1
12   15013 7010   RAR
13   15014 3142   DCA MOD+1
14   15015 7101   CLL IAC
15   15016 1144   TAD COUNT+1
16   15017 3135   DCA DX+1
17   15020 7004   RAL
18   15021 1143   TAD COUNT
19   15022 3134   DCA DX
20   15023 1132   TAD SCORE
21   15024 1325   TAD CTAB
22   15025 3226   DCA .+1
23   15026 7402   HLT
24   15027 3175   DCA MINOR
25   15030 1175   TAD MINOR
26   15031 0377   AND (240)
27   15032 1174   TAD MAJOR
28   15033 3174   DCA MAJOR
29
30   15034 2144   MOVC,ISZ COUNT+1
31   15035 5241   JMP 1$
32   15036 2143   ISZ COUNT
33   15037 7410   SKP
34   15040 5600   JMP I MOVE
35
36   15041 6201   1$,CDF 00
37   15042 7346   CLL STA RTL
38   15043 1776   TAD I (INTVAL)
39   15044 7650   SNA CLA
40   15045 5521   JMP CSTOP
41   15046 6211   CDF 10
42   15047 7300   CLA CLL
43   15050 1142   TAD MOD+1
44   15051 1140   TAD DY+1
45   15052 3142   DCA MOD+1
46   15053 7004   RAL
47   15054 1141   TAD MOD
48   15055 1137   TAD DY
49   15056 3141   DCA MOD
50   15057 7300   CLA CLL
51   15060 1135   TAD DX+1
52   15061 1142   TAD MOD+1
53   15062 3017   DCA XR8
54   15063 7004   RAL
55   15064 1141   TAD MOD
56   15065 1134   TAD DX
57   15066 7510   SPA
58   15067 5277   JMP MOV8
59   15070 3141   DCA MOD
60   15071 1017   TAD XR8
61   15072 3142   DCA MOD+1
62   15073 7240   STA
63   15074 3332   DCA MINI
64   15075 1175   TAD MINOR
65   15076 5305   JMP MOV9
66
67   15077 7200   MOV8,CLA
68   15100 3332   DCA MINI
69   15101 3332   DCA MINI
70   15102 3332   DCA MINI
71   15103 3332   DCA MINI
72   15104 1174   TAD MAJOR
73
74   15105 6600   MOV9,6600
75
76   15106 7344   1$,STA CLL RAL
77   15107 1332   TAD MINI
78   15110 3017   DCA XR8
79   15111 2017   ISZ XR8
80   15112 5511   JMP .-1
81   15113 2130   ISZ SPEED
82   15114 5306   JMP 1$
83   15115 7000   NOP
84   15116 1002   TAD RAMPS
85   15117 3130   DCA SPEED
86   15120 5234   JMP MOVC
87
88   15121 6203   CSTOP,CDI 00
89   15122 4403   JMS I FUTSCH
90   15123 6203   CDI 00
91   15124 5461   JMP I STPLOC
92
93   15125 1326   CTAB,TAD .+1
94   15126 0120   120
95   15127 0320   320
96   15130 0160   160
97   15131 0360   360

98   15132 0000   MINI,0
99
     15176 0126
     15177 0240
100         0001   *CIRCLE
101  10001 4000   A
102                S

1                 .TITLE HAMILL CO. BANC-4 03-FEB-77
2                 .SBTTL PROGRAMMED BY J. C. KILBANE
3
4          0001   FIELD 1
5
6          0010   FPFLD=10
7          0010   VBLFLD=10
8          0000   FEXT=0
9          0001   ETZ=1
10         0004   LTZ=4
11         0017   FNOR=17
12         0006   FABS=6
13
14         0020   *20
15
16   10020 0000   EXP,0
17   10021 0000   HORD,0
18   10022 0000   LORD,0
19   10023 0000   OVER2,0
20   10024 0000   EX1,0
21   10025 0000   AC1H,0
22   10026 0000   AC1L,0
23   10027 0000   OVER1,0
24   10030 0000   EXP1,0
25   10031 0000   QUOL,0
26   10032 0000   DRCTY,0
27   10033 0000   JUMP,0
28   10034 0000   SAVE,0
29   10035 0000   ADDR,0
30   10036 0000   NORML,0
31   10037 0000   DF1,0
32   10040 0000   DF0,0
33   10041 0000   PC0,0
34   10042 7661   LIMT,-N,
35   10043 6600   DIRECT,VT
36

1          0007   *7
2    10007 5200   FPNT
3
4                 5200  *5200
5
6    15200 0000   FPNT,0
7    15201 7300   CLA CLL
8    15202 6214   RDF
9    15203 1356   TAD RDFI
10   15204 3037   DCA DF1
11   15205 1037   TAD DF1
12   15206 3315   DCA CDFP+1
13
14   15207 3027   FPNTH,DCA OVER1
15   15210 3023   DCA OVER2
16   15211 1600   TAD I FPNT
17   15212 2200   ISZ FPNT
18   15213 3033   DCA JUMP
19   15214 1033   TAD JUMP
20   15215 0361   AND MASK5
21   15216 7450   SNA
22   15217 5273   JMP PUSH
23   15220 0363   AND PAGENO
24   15221 7650   SNA CLA
25   15222 5225   JMP .+3
26   15223 1361   TAD MASK5
27   15224 0200   AND FPNT
28   15225 3035   DCA ADDR
29   15226 1362   TAD MASK7
30   15227 0033   AND JUMP
31   15230 1035   TAD ADDR
32   15231 3035   DCA ADDR
33   15232 1364   TAD INDRCT
34   15233 0033   AND JUMP
35   15234 7650   SNA CLA
36   15235 5240   JMP DVY
37   15236 1435   TAD I ADDR
38   15237 3035   DCA ADDR
39
40   15240 3032   DVY,DCA DRCTY
41   15241 1035   TAD ADDR
42   15242 7100   CLL
43   15243 1042   TAD LIMT
44   15244 7630   SZL CLA
45   15245 5255   JMP LOOP01
46   15246 1035   TAD ADDR
47   15247 1043   TAD DIRECT
48   15250 3032   DCA DRCTY
49   15251 6211   CDF FPFLD
50   15252 1432   TAD I DRCTY
51   15253 3035   DCA ADDR
```

```
52   15254 6211        CDF VBLFLD
53
54   15255 7132  LOOP01,STL RTR
55   15256 1033        TAD JUMP
56   15257 7630        SZL CLA
57   15260 5273        JMP PUSH
58   15261 1035        TAD ADDR
59   15262 3034        DCA SAVE
60   15263 1435        TAD I ADDR
61   15264 3024        DCA EX1
62   15265 2034        ISZ SAVE
63   15266 1434        TAD I SAVE
64   15267 3025        DCA AC1M
65   15270 2034        ISZ SAVE
66   15271 1434        TAD I SAVE
67   15272 3026        DCA AC1L
68
69   15273 6211  PUSH,CDF FPFLD
70   15274 1033        TAD JUMP
71   15275 7106        CLL RTL
72   15276 7006        RTL
73   15277 0366        AND MASK3
74   15300 1365        TAD TABLE
75   15301 3357        DCA JUMP2
76   15302 1757        TAD I JUMP2
77   15303 3357        DCA JUMP2
78   15304 4757        JMS I JUMP2
79
80   15305 4314  FOO,JMS CDFP
81   15306 5207        JMP FPNTR
82
83   15307 7126  FOUT,STL RTL
84   15310 1037        TAD DF1
85   15311 3312        DCA .+1
86   15312 0000        0
87   15313 5600        JMP I FPNT
88
89   15314 0000  CDFP,0
90   15315 0000        0
91   15316 5714        JMP I CDFP
92
93   15317 0000  FCMP,0
94   15320 4314        JMS CDFP
95   15321 1600        TAD I FPNT
96   15322 6211        CDF FPFLD
97   15323 3357        DCA JUMP2
98   15324 3355        DCA CNDT
99   15325 1021        TAD HORD
100  15326 7550        SPA SNA
101  15327 5346        JMP FCMPA
102  15330 7410        SKP
103  15331 2355        ISZ CNDT
104
105  15332 2355  FCMPB,ISZ CNDT
106  15333 2355        ISZ CNDT
107  15334 7300        CLA CLL
108  15335 1357        TAD JUMP2
109  15336 0355        AND CNDT
110  15337 7640        SZA CLA
111  15340 5777        JMP JMSX
112  15341 2200        ISZ FPNT
113  15342 5717        JMP I FCMP
114
115  15343 1035  FCMPC,TAD ADDR
116  15344 3200        DCA FPNT
117  15345 5717        JMP I FCMP
118
119  15346 2355  FCMPA,ISZ CNDT
120  15347 7710        SPA CLA
121  15350 5331        JMP FCMPB-1
122  15351 1022        TAD LORD
123  15352 7650        SNA CLA
124  15353 5334        JMP FCMPB+2
125  15354 5333        JMP FCMPB+1
126
127  15355 0000  CNDT,0
128  15356 6201  RDFI,CDF 00
129  15357 0000  JUMP2,0
130  15360 0017  MASK3,0017
131  15361 7600  MASK5,7600
132  15362 0177  MASK7,0177
133  15363 0200  PAGENO,0200
134  15364 0400  INDRCT,0400
135  15365 5366  TABLE,.+1
136  15366 5465        EXIT
137  15367 5432        FLAD
138  15370 5460        FLSU
139  15371 5513        FLMY
140  15372 6105        FLDV
141  15373 5400        FLGT
142  15374 5410        FLPT
143  15375 5317        FCMP 1
     15377 6454
2          5400   *FPNT+200
3

4    15400 0000  FLGT,0
5    15401 1024        TAD EX1
6    15402 3020        DCA EXP
7    15403 1025        TAD AC1M
8    15404 3021        DCA HORD
9    15405 1026        TAD AC1L
10   15406 3022        DCA LORD
11   15407 5600        JMP I FLGT
12
13   15410 0000  FLPT,0
14   15411 1032        TAD DRCTY
15   15412 7650        SNA CLA
16   15413 5216        JMP FLPTQ
17   15414 6211        CDF VBLFLD
18   15415 5221        JMP .+4
19
20   15416 1037  FLPTQ,TAD DF1
21   15417 3220        DCA .+1
22   15420 0000        0
23   15421 1020        TAD EXP
24   15422 3435        DCA I ADDR
25   15423 2035        ISZ ADDR
26   15424 1021        TAD HORD
27   15425 3435        DCA I ADDR
28   15426 2035        ISZ ADDR
29   15427 1022        TAD LORD
30   15430 3435        DCA I ADDR
31   15431 5610        JMP I FLPT
32
33   15432 5305  FLAD,FOO
34   15433 4752        JMS I ALGN
35   15434 5632        JMP I FLAD
36   15435 1036        TAD NORML
37   15436 7650        SNA CLA
38   15437 4753        JMS I UNORM
39   15440 7100        CLL
40   15441 1027        TAD OVER1
41   15442 1023        TAD OVER2
42   15443 3023        DCA OVER2
43   15444 7004        RAL
44   15445 1026        TAD AC1L
45   15446 1022        TAD LORD
46   15447 3022        DCA LORD
47   15450 7004        RAL
48   15451 1025        TAD AC1M
49   15452 1021        TAD HORD
50   15453 3021        DCA HORD
51   15454 1036        TAD NORML
52   15455 7650        SNA CLA
53   15456 4760        JMS I NORM
54   15457 5632        JMP I FLAD
55
56   15460 0000  FLSU,0
57   15461 4664        JMS I OPMINS
58   15462 4232        JMS FLAD
59   15463 5660        JMP I FLSU
60
61   15464 6200  OPMINS,MINUS2
62
63   15465 0000  EXIT,0
64   15466 1033        TAD JUMP
65   15467 0357        AND MASKT
66   15470 7450        SNA
67   15471 5334        JMP FPEXT
68   15472 1312        TAD ACON6
69   15473 3356        DCA JUMPT
70   15474 1756        TAD I JUMPT
71   15475 3356        DCA JUMPT
72   15476 1755        TAD I FPNTP
73   15477 3041        DCA PC0
74   15500 1037        TAD DF1
75   15501 3040        DCA DF0
76   15502 4756        JMS I JUMPT
77   15503 1041        TAD PC0
78   15504 3755        DCA I FPNTP
79   15505 1040        TAD DF0
80   15506 3037        DCA DF1
81   15507 1037        TAD DF1
82   15510 3777        DCA CDFP+1
83   15511 5665        JMP I EXIT
84
85   15512 6345  ACON6,TABLE6+1
86
87   15513 0000  FLMY,0
88   15514 7201        CLA IAC
89   15515 1024        TAD EX1
90   15516 1020        TAD EXP
91   15517 3020        DCA EXP
92   15520 4751        JMS I MULT
93   15521 5713        JMP I FLMY
94
95   15522 0000  FRNDR,0
96   15523 1021        TAD HORD
97   15524 7710        SPA CLA
98   15525 1345        TAD C1000
99   15526 1344        TAD INCR
100  15527 3331        DCA .+2
```

```
101 15530 4407   JMS I 7
102 15531 1000   FADD 0
103 15532 0000   FEXT
104 15533 5722   JMP I FRNDR
105
106 15534 4764  FPEXT,JMS I DFSET
107 15535 1020   TAD EXP
108 15536 3761   DCA I EXPP
109 15537 1021   TAD HORD
110 15540 3762   DCA I HOAP
111 15541 1022   TAD LORD
112 15542 3763   DCA I LOAP
113 15543 5754   JMP I FPEX
114
115 15544 1346  INCR,FADD FPH
116 15545 1000   C1000,1000
117 15546 0000   FPH,0
118 15547 2000   2000
119 15550 0000   0
120 15551 6021   MULT,DMULT
121 15552 5620   ALGN,ALIGN
122 15553 6365   UNORM,DUNORM
123 15554 5307   FPEX,FOUT
124 15555 5200   FPNTP,FPNT
125 15556 0000   JUMPT,0
126 15557 0017   MASKT,17
127 15560 6400   NORM,DNORM
128 15561 0020   EXPP,LXP
129 15562 0021   HOAP,HORD
130 15563 0022   LOAP,LORD
131 15564 5314   DFSET,CDFP
132
133 15565 0000  PSUNM,0
134 15566 7001   IAC
135 15567 3036   DCA NORML
136 15570 5765   JMP I PSUNM
137
138 15571 0000  PRNM,0
139 15572 3036   DCA NORML
140 15573 5771   JMP I PRNM
141

15577 5315
         5600    *FPNT+400
  1
  2
  3 15600 0000  ACMINS,0
  4 15601 7300   CLL CLA
  5 15602 1023   TAD OVER2
  6 15603 7041   CMA IAC
  7 15604 3023   DCA OVER2
  8 15605 1022   TAD LORD
  9 15606 7040   CMA
 10 15607 7430   SZL
 11 15610 7101   CLL IAC
 12 15611 3022   DCA LORD
 13 15612 1021   TAD HORD
 14 15613 7040   CMA
 15 15614 7430   SZL
 16 15615 7101   CLL IAC
 17 15616 3021   DCA HORD
 18 15617 5600   JMP I ACMINS
 19
 20 15620 0000  ALIGN,0
 21 15621 1024   TAD EX1
 22 15622 7041   CMA IAC
 23 15623 1020   TAD EXP
 24 15624 7450   SNA
 25 15625 5300   JMP DONE
 26 15626 7500   SMA
 27 15627 7041   CMA IAC
 28 15630 3323   DCA AMOUNT
 29 15631 1323   TAD AMOUNT
 30 15632 1324   TAD TEST2
 31 15633 7700   SMA CLA
 32 15634 5242   JMP .+6
 33 15635 4302   JMS OUTGO
 34 15636 7430   SZL
 35 15637 1331   TAD TAG2
 36 15640 1330   TAD TAG1
 37 15641 5311   JMP NOGO
 38 15642 4302   JMS OUTGO
 39 15643 7420   SNL
 40 15644 1331   TAD TAG2
 41 15645 1330   TAD TAG1
 42 15646 3325   DCA TEST3
 43 15647 1323   TAD AMOUNT
 44 15650 7041   CMA IAC
 45 15651 1725   TAD I TEST3
 46 15652 3725   DCA I TEST3
 47 15653 2325   ISZ TEST3
 48 15654 1525   TAD TEST3
 49 15655 3326   DCA TEST4
 50 15656 2326   ISZ TEST4
 51 15657 1326   TAD TEST4
 52 15660 3327   DCA TEST5
 53 15661 2327   ISZ TEST5
 54
 55 15662 7100  SHIFT,CLL
 56 15663 1725   TAD I TEST3
 57 15664 7510   SPA
 58 15665 7020   CML
 59 15666 7010   RAR
 60 15667 3725   DCA I TEST3
 61 15670 1726   TAD I TEST4
 62 15671 7010   RAR
 63 15672 3726   DCA I TEST4
 64 15673 1727   TAD I TEST5
 65 15674 7010   RAR
 66 15675 3727   DCA I TEST5
 67 15676 2323   ISZ AMOUNT
 68 15677 5262   JMP SHIFT
 69
 70 15700 2220  DONE,ISZ ALIGN
 71 15701 5620   JMP I ALIGN
 72
 73 15702 0000  OUTGO,0
 74 15703 1024   TAD EX1
 75 15704 7041   CMA IAC
 76 15705 1020   TAD EXP
 77 15706 7004   RAL
 78 15707 7200   CLA
 79 15710 5702   JMP I OUTGO
 80
 81 15711 3325  NOGO,DCA TEST3
 82 15712 1725   TAD I TEST3
 83 15713 3020   DCA EXP
 84 15714 2325   ISZ TEST3
 85 15715 1725   TAD I TEST3
 86 15716 3021   DCA HORD
 87 15717 2325   ISZ TEST3
 88 15720 1725   TAD I TEST3
 89 15721 3022   DCA LORD
 90 15722 5620   JMP I ALIGN
 91
 92 15723 0000  AMOUNT,0
 93 15724 0030  TEST2,0030
 94 15725 0000  TEST3,0
 95 15726 0000  TEST4,0
 96 15727 0000  TEST5,0
 97 15730 0020  TAG1,EXP
 98 15731 0004  TAG2,EX1-EXP
 99 15732 5305  RETN2,FOO
100
101 15733 1342  ERROR1,TAD GOOF
102 15734 3020   DCA EXP
103 15735 1342   TAD GOOF
104 15736 3021   DCA HORD
105 15737 7040   CMA
106 15740 3022   DCA LORD
107 15741 5732   JMP I RETN2
108
109 15742 3777  GOOF,3777
110
111 15743 0000  SQUARE,0
112 15744 4407   JMS I 0007
113 15745 6353   FPUT FPACX
114 15746 3353   FMPY FPACX
115 15747 0000   FEXT
116 15750 5743   JMP I SQUARE
117
118 15751 0000  EXIT6,0
119 15752 5751   JMP I EXIT6
120
121 15753 0000  FPACX,0
122 15754 0000   0
123 15755 0000   0
124
125 15756 0000  UNORF,0
126 15757 3200   DCA ACMINS
127 15760 1021   TAD HORD
128 15761 7710   SPA CLA
129 15762 4200   JMS ACMINS
130 15763 1376   TAD C27
131 15764 3024   DCA EX1
132 15765 3025   DCA AC1H
133 15766 3026   DCA AC1L
134 15767 4220   JMS ALIGN
135 15770 7000   NOP
136 15771 3023   DCA OVER2
137 15772 1200   TAD ACMINS
138 15773 7640   SZA CLA
139 15774 4200   JMS ACMINS
140 15775 5756   JMP I UNORF
141
142 15776 0027  C27,27

1       6000    *FPNT+600
  2
  3 16000 0000  DIV1,0
  4 16001 7300   CLA CLL
  5 16002 1021   TAD HORD
  6 16003 7510   SPA
  7 16004 7120   CLL CML
  8 16005 7010   RAR
```

```
  9  16006 3021    DCA HORD
 10  16007 1022    TAD LORD
 11  16010 7010    RAR
 12  16011 3022    DCA LORD
 13  16012 1023    TAD OVER2
 14  16013 7010    RAR
 15  16014 3023    DCA OVER2
 16  16015 7100    CLL
 17  16016 2020    ISZ EXP
 18  16017 7000    NOP
 19  16020 5600    JMP I DIV1
 20
 21  16021 0000    DMULT,0
 22  16022 7300    CLA CLL
 23  16023 1365    TAD SMACLA
 24  16024 3351    DCA SNSWIT
 25  16025 4340    JMS SIGN
 26  16026 1026    TAD AC1L
 27  16027 3760    DCA I MP2PT
 28  16030 1022    TAD LORD
 29  16031 4757    JMS I MP4PT
 30  16032 7200    CLA
 31  16033 1761    TAD I MP5PT
 32  16034 3023    DCA OVER2
 33  16035 1021    TAD HORD
 34  16036 3760    DCA I MP2PT
 35  16037 1026    TAD AC1L
 36  16040 4757    JMS I MP4PT
 37  16041 1023    TAD OVER2
 38  16042 3023    DCA OVER2
 39  16043 7004    RAL
 40  16044 1761    TAD I MP5PT
 41  16045 3371    DCA D
 42  16046 7004    RAL
 43  16047 3372    DCA KEEP
 44  16050 1025    TAD AC1H
 45  16051 3760    DCA I MP2PT
 46  16052 1022    TAD LORD
 47  16053 4757    JMS I MP4PT
 48  16054 1023    TAD OVER2
 49  16055 3023    DCA OVER2
 50  16056 7004    RAL
 51  16057 1761    TAD I MP5PT
 52  16060 1371    TAD D
 53  16061 3371    DCA D
 54  16062 7004    RAL
 55  16063 1372    TAD KEEP
 56  16064 3372    DCA KEEP
 57  16065 1021    TAD HORD
 58  16066 3760    DCA I MP2PT
 59  16067 1025    TAD AC1H
 60  16070 4757    JMS I MP4PT
 61  16071 1371    TAD D
 62  16072 3022    DCA LORD
 63  16073 7004    RAL
 64  16074 1761    TAD I MP5PT
 65  16075 1372    TAD KEEP
 66  16076 3021    DCA HORD
 67  16077 4762    JMS I NORMF
 68  16100 3023    DCA OVER2
 69  16101 2367    ISZ SGN
 70  16102 5621    JMP I DMULT
 71  16103 4775    JMS I MINS
 72  16104 5621    JMP I DMULT
 73
 74  16105 0000    FLDV,0
 75  16106 1025    TAD AC1H
 76  16107 7640    SZA CLA
 77  16110 5514    JMP .+4
 78  16111 1026    TAD AC1L
 79  16112 7650    SNA CLA
 80  16113 5776    JMP I ERROR
 81  16114 1024    TAD EX1
 82  16115 7041    CMA IAC
 83  16116 1020    TAD EXP
 84  16117 7001    IAC
 85  16120 3020    DCA EXP
 86  16121 1364    TAD SPACLA
 87  16122 3351    DCA SNSWIT
 88  16123 4340    JMS SIGN
 89  16124 4763    JMS I DIVIDE
 90  16125 7630    SZL CLA
 91  16126 7001    IAC
 92  16127 3026    DCA AC1L
 93  16130 3025    DCA AC1H
 94  16131 2367    ISZ SGN
 95  16132 5335    JMP .+3
 96  16133 5734    JMP I .+1
 97  16134 5437    FLAD+5
 98  16135 4775    JMS I MINS
 99  16136 4773    JMS I MINS2
100  16137 5734    JMP I .-3
101
102  16140 0000    SIGN,0
103  16141 1370    TAD REST
104  16142 3367    DCA SGN
105  16143 1021    TAD HORD
106  16144 7700    SMA CLA
107  16145 5350    JMP .+3
108  16146 4775    JMS I MINS
109  16147 2367    ISZ SGN
110  16150 1025    TAD AC1H
111
112  16151 7700    SNSWIT,SMA CLA
113  16152 5740    JMP I SIGN
114  16153 4773    JMS I MINS2
115  16154 2367    ISZ SGN
116  16155 7000    NOP
117  16156 5740    JMP I SIGN
118
119  16157 6237    MP4PT,MP4
120  16160 6271    MP2PT,MP2
121  16161 6265    MP5PT,MP5
122  16162 6400    NORMF,DNORM
123  16163 6272    DIVIDE,DUBDIV
124  16164 7710    SPACLA,SPA CLA
125  16165 7700    SMACLA,SMA CLA
126  16166 5305    RETURN,FOO
127  16167 0000    SGN,0
128  16170 7776    REST,7776
129  16171 0000    D,0
130  16172 0000    KEEP,0
131  16173 6200    MINS2,MINUS2
132  16174 6220    RAR2,DIV2
133  16175 5600    MINS,ACMINS
134  16176 5733    ERROR,ERROR1

1
  2           6200     *FPNT+1000
  3
  4  16200 0000    MINUS2,0
  5  16201 7300    CLA CLL
  6  16202 1027    TAD OVER1
  7  16203 7041    CMA IAC
  8  16204 3027    DCA OVER1
  9  16205 1026    TAD AC1L
 10  16206 7040    CMA
 11  16207 7430    SZL
 12  16210 7101    CLL IAC
 13  16211 3026    DCA AC1L
 14  16212 1025    TAD AC1H
 15  16213 7040    CMA
 16  16214 7430    SZL
 17  16215 7101    CLL IAC
 18  16216 3025    DCA AC1H
 19  16217 5600    JMP I MINUS2
 20
 21  16220 0000    DIV2,0
 22  16221 7300    CLA CLL
 23  16222 1025    TAD AC1H
 24  16223 7510    SPA
 25  16224 7120    CLL CML
 26  16225 7010    RAR
 27  16226 3025    DCA AC1H
 28  16227 1026    TAD AC1L
 29  16230 7010    RAR
 30  16231 3026    DCA AC1L
 31  16232 1027    TAD OVER1
 32  16233 7010    RAR
 33  16234 3027    DCA OVER1
 34  16235 7100    CLL
 35  16236 5620    JMP I DIV2
 36
 37  16237 0000    MP4,0
 38  16240 3266    DCA MP1
 39  16241 3265    DCA MP5
 40  16242 1270    TAD THIR
 41  16243 3267    DCA MP3
 42  16244 7100    CLL
 43  16245 1266    TAD MP1
 44  16246 7010    RAR
 45  16247 3266    DCA MP1
 46  16250 1265    TAD MP5
 47  16251 7420    SNL
 48  16252 5255    JMP .+3
 49  16253 7100    CLL
 50  16254 1271    TAD MP2
 51  16255 7010    RAR
 52  16256 3265    DCA MP5
 53  16257 2267    ISZ MP3
 54  16260 5245    JMP MP4+6
 55  16261 1266    TAD MP1
 56  16262 7010    RAR
 57  16263 7100    CLL
 58  16264 5637    JMP I MP4
 59
 60  16265 0000    MP5,0
 61  16266 0000    MP1,0
 62  16267 0000    MP3,0
 63  16270 7764    THIR,7764
 64  16271 0000    MP2,0
 65
 66  16272 0000    DUBDIV,0
```

```
67  16273 7300       CLA CLL
68  16274 3031       DCA QUOL
69  16275 1345       TAD MIF
70  16276 3267       DCA MP3
71  16277 5306       JMP DVX
72
73  16300 1022  DV3,TAD LORD
74  16301 7004       RAL
75  16302 3022       DCA LORD
76  16303 1021       TAD HORD
77  16304 7004       RAL
78  16305 3021       DCA HORD
79
80  16306 1026  DVX,TAD ACIL
81  16307 1022       TAD LORD
82  16310 3271       DCA MP2
83  16311 7004       RAL
84  16312 1021       TAD HORD
85  16313 1025       TAD AC1M
86  16314 7420       SNL
87  16315 5321       JMP DV2-1
88  16316 3021       DCA HORD
89  16317 1271       TAD MP2
90  16320 3022       DCA LORD
91  16321 7200       CLA
92
93  16322 1031  DV2,TAD QUOL
94  16323 7004       RAL
95  16324 3031       DCA QUOL
96  16325 1023       TAD OVER2
97  16326 7004       RAL
98  16327 3023       DCA OVER2
99  16330 2267       ISZ MP3
100 16331 5300       JMP DV3
101 16332 1031       TAD QUOL
102 16333 3022       DCA LORD
103 16334 1021       TAD HORD
104 16335 7106       CLL RTL
105 16336 3265       DCA MP5
106 16337 1023       TAD OVER2
107 16340 3021       DCA HORD
108 16341 3023       DCA OVER2
109 16342 1265       TAD MP5
110 16343 1265       TAD MP5
111 16344 5672       JMP I DURDIV
112
113 16345 7751  MIF,7751
114

1
2   16346 5743  TABLE6,SQUARE
3   16347 6475       SQROOT
4   16350 5751       EXIT6
5   16351 5751       EXIT6
6   16352 5751       EXIT6
7   16353 6470       ABSF
8   16354 5751       EXIT6
9   16355 5751       EXIT6
10  16356 5756       UNORF
11  16357 5522       FRNOR
12  16360 5751       EXIT6
13  16361 5600       ACMINS
14  16362 5565       PSUNM
15  16363 5571       PRNM
16  16364 6400       DNORM
17
18  16365 0000  DUNORM,0
19  16366 4220       JMS DIV2
20  16367 4773       JMS I RAR1
21  16370 2024       ISZ EX1
22  16371 7000       NOP
23  16372 5765       JMP I DUNORM
24
25  16373 6000  RAR1,DIV1
26
27

1       6400       *FPNT+1200
2
3   16400 0000  DNORM,0
4   16401 7300       CLA CLL
5   16402 3267       DCA AMT1
6   16403 3266       DCA SIGN1
7   16404 1021       TAD HORD
8   16405 7510       SPA
9   16406 2266       ISZ SIGN1
10  16407 7640       SZA CLA
11  16410 5217       JMP G06
12  16411 1022       TAD LORD
13  16412 7640       SZA CLA
14  16413 5217       JMP G06
15  16414 1023       TAD OVER2
16  16415 7650       SNA CLA
17  16416 5252       JMP EXIT2

18
19  16417 1266  G06,TAD SIGN1
20  16420 7640       SZA CLA
21  16421 4665       JMS I NEG
22
23  16422 1021  LOP,TAD HORD
24  16423 7104       RAL CLL
25  16424 7710       SPA CLA
26  16425 5241       JMP EXIT1
27  16426 1023       TAD OVER2
28  16427 7104       CLL RAL
29  16430 3023       DCA OVER2
30  16431 1022       TAD LORD
31  16432 7004       RAL
32  16433 3022       DCA LORD
33  16434 1021       TAD HORD
34  16435 7004       RAL
35  16436 3021       DCA HORD
36  16437 2267       ISZ AMT1
37  16440 5222       JMP LOP
38
39  16441 1267  EXIT1,TAD AMT1
40  16442 7041       CMA IAC
41  16443 1020       TAD EXP
42  16444 3020       DCA EXP
43  16445 3023       DCA OVER2
44  16446 1266       TAD SIGN1
45  16447 7640       SZA CLA
46  16450 4665       JMS I NEG
47  16451 5600       JMP I DNORM
48
49  16452 3020  EXIT2,DCA EXP
50  16453 5600       JMP I DNORM
51
52  16454 1777  JMSX,TAD JUMP2
53  16455 7700       SMA CLA
54  16456 5776       JMP FCMPC
55  16457 7001       IAC
56  16460 1775       TAD FPNT
57  16461 4774       JMS COFP
58  16462 3435       DCA I ADDR
59  16463 7001       IAC
60  16464 5776       JMP FCMPC
61
62  16465 5600  NEG,ACMINS
63  16466 0000  SIGN1,0
64  16467 0000  AMT1,0
65
66  16470 0000  ABSF,0
67  16471 1021       TAD HORD
68  16472 7710       SPA CLA
69  16473 4665       JMS I NEG
70  16474 5670       JMP I ABSF
71
72  16475 0000  SQROOT,0
73  16476 1021       TAD HORD
74  16477 7710       SPA CLA
75  16500 4665       JMS I NEG
76  16501 4407       FENT
77  16502 7545       FJMP SQUEND
78  16503 0001       ETZ
79  16504 6367       FPUT FPACQ
80  16505 6364       FPUT ITER1
81  16506 0000       FEXT
82  16507 1372       TAD M4
83  16510 3373       DCA CNT
84  16511 1020       TAD FXP
85  16512 7010       RAR
86  16513 7620       SNL CLA
87  16514 5347       JMP EVEN
88  16515 7240       STA
89  16516 1020       TAD EXP
90  16517 7100       CLL
91  16520 7510       SPA
92  16521 7120       STL
93  16522 7010       RAR
94  16523 3364       DCA ITER1
95  16524 1364       TAD ITER1
96  16525 3361       DCA FPOH
97
98  16526 4407  CMMN,FENT
99  16527 5361       FGET FPOH
100 16530 1364       FADD ITER1
101 16531 0000       FEXT
102
103 16532 4407  LOOP,FENT
104 16533 6364       FPUT ITER1
105 16534 5367       FGET FPACQ
106 16535 4364       FDIV ITER1
107 16536 1364       FADD ITER1
108 16537 0000       FEXT
109 16540 7240       STA
110 16541 1020       TAD EXP
111 16542 3020       DCA EXP
112 16543 2373       ISZ CNT
113 16544 5332       JMP LOOP
114
```

```
115  16545 0000    SQUEND,FEXT
116  16546 5675    JMP I SQROOT
117
118  16547 1020    EVEN,TAD EXP
119  16550 7100    CLL
120  16551 7510    SPA
121  16552 7120    STL
122  16553 7010    RAR
123  16554 3361    DCA FPOH
124  16555 7240    STA
125  16556 1361    TAD FPOH
126  16557 3364    DCA ITER1
127  16560 5326    JMP CHMN
128
129
130  16561 0000    FPOH,012000/0
     16562 2000
     16563 0000
131  16564 0000    ITER1,0/0/0
     16565 0000
     16566 0000
132  16567 0000    FPACQ,0/0/0
     16570 0000
     16571 0000
133  16572 7774    M4,-4
134  16573 0000    CNT,0
135
     16574 5314
     16575 5280
     16576 5343
     16577 5357

1              6600    *FPNT+1400                      25
2
3              0117    N,*117
4
5              6600.   VT*,
6
7              0000    VS=0
8              6717    V=VT+N,                          30
9
10             0117    ,REPT N,
11
12                     V+VS
13
14                     VS=VS+3
15                                                      35
16                     ,ENDR
17
18             7032    *V+31+31+31
19
20   17032 0001    1/20001/0                            40
     17033 2000
     17034 0000
21   17035 0004    4/240010
     17036 2000
     17037 0000
22   17040 0007    7/31001/0
     17041 3100
     17042 0000
23   17043 0012    12/371610                            45
     17044 3716
     17045 0000
24   17046 0016    16/234210
     17047 2342
     17050 0000
25   17051 0013    13/372010
     17052 3720
     17053 0000                                         50
26   17054 7777    -1/3146/3146
     17055 3146
     17056 3146
27   17057 0024    24/3641/0770
     17060 3641
     17061 0770
28   17062 0007    7/306010                             55
     17063 3060
     17064 0000
29   17065 0021    21/3032/3700
     17066 3032
     17067 3700
30   17070 0002    2/240010
     17071 2400                                         60
     17072 0000
31   17073 0003    3/300010/312000/0 FOR 8/A
     17074 3000
     17075 0000
32
33                s
                                                        65
```

We claim:
1. A machine tool system comprising a cutting element and workpiece positioning table, and control means for controlling the position of said cutting element with respect to said positioning table, said control means including:

A. means for storing an ordered succession of data sequences, each sequence including:
  i. identification data representative of the relative position of said sequence in said ordered succession,
  ii. coordinate data representative of an associated spatial point measured with respect to said positioning table,
  iii. path data representative of a selected path type for said cutting element to approach said associated spatial point,
  iv. offset data representative of an offset path which is parallel to and offset from a direct path of the selected type which intersects said associated spatial point, said offset data characterizing a magnitude and direction for the offset of said offset path,
  v. sequence type data representative of the type of said sequence, said sequence being a start/stop type when said sequence is the first of a contiguous group of sequences in said succession, said contiguous group being terminated by the sequence immediately preceding the next start/stop type sequence, and said sequence being an intermediate type when said sequence is one of the other sequences in said contiguous group,
    wherein the associated spatial points of said group define a shape, said shape being a closed shape when the spatial points associated with the first and last sequences in said group are identical, and said shape being an open shape otherwise,
B. means for selecting one of said succession of sequences as a current sequence,
C. path determining means responsive to said selected sequence, said path determining means including means for determining a tool path to be followed by said cutting element for a current sequence, said tool path comprising a line segment extending from the current coordinates of said cutting element to a final point, wherein:
  i. when said current sequence is a start/stop type, and
    a. when the shape defined by said contiguous group is open, said final point is defined by the intersection of a next subsequent offset path and a straight line segment,
      said next subsequent sequence offset path being uniformly separated from a direct path of the type specified by the path data of the next subsequent sequence, said separation being in accordance with the offset data of said next subsequent sequence, and
      said direct path intersecting the spatial points associated with the current sequence and next subsequent sequence in said succession, and
      said straight line segment being perpendicular to said direct path at the spatial point associated with the current sequence, and
    b. when the shape defined by said contiguous group is closed,
      said final point is defined by the intersection of a next subsequent sequence offset path and a last sequence offset path, said next subsequent sequence offset path being uniformly separated from a first direct path of the type specified by the path data of the next subsequent sequence, said separation being in accordance with the offset data of said next subsequent sequence, and said first direct path intersecting the spatial points associated with the current and next subsequent sequences, and said last sequence offset path being uniformly separated from a second direct path of the type specified by the path data of the last sequence in said contiguous group, said separation being in accordance with the offset data of said last sequence, and said second direct path intersecting the spatial points associated with said last sequence and the sequence immediately preceding said last sequence, and ii. when said current sequence and next subsequent sequence are intermediate types, and said final point is defined by the intersection of a current sequence offset path and a next subsequent sequence offset path, said current sequence offset path being uniformly separated from a first direct path of the type specified by said path data of said current sequence, said separation being in accordance with the offset data of said current sequence, said first direct path intersecting the spatial points associated with the current sequence and next previous sequence, and said next subsequent sequence offset path being uniformly separated from a second direct path of the type specified by said path data of said next subsequent sequence, said separation being in accordance with the offset data of said next subsequent sequence, said second direct path intersecting the spatial points associated with the current sequence and next subsequent sequence, and iii. when said current sequence is an intermediate type and the next subsequent sequence is a start/stop type, and a. when the shape defined by said contiguous group of said current sequence is open:

said final point is defined by the intersection of a current sequence offset path and a straight line segment, said current sequence offset path being uniformly separated from a direct path of the type specified by the path data of said current sequence, said separation being in accordance with the offset data of said current sequence, said direct path intersecting the spatial points associated with the current sequence and said next previous sequence, said straight line being perpendicular to said direct path at the spatial point associated with said current sequence, and b. when the shape defined by said contiguous group of said current sequence is closed:

said final point is defined by the intersection of a current sequence offset path and a first intermediate sequence offset path, said current sequence offset path being uniformly separated from a first direct path of the type specified by the path data of said current sequence with said separation being in accordance with the offset data of said current sequence, said first direct path intersecting the spatial points associated with the current sequence and next previous sequence, said first intermediate sequence offset path being uniformly separated from a second direct path of the type specified by the path data of the first intermediate sequence of the contiguous group of said current sequence with said separation being in accordance with the offset data of said first intermediate data, said second direct path intersecting the spatial points associated with the current sequence and said first intermediate sequence, D. drive means responsive to said path determining means for a current sequence to control the relative motion of said cutting element along said determined tool path.

2. A machine tool system according to claim 1 wherein said offset data and sequence type data are related, whereby said sequence is a start/stop type when said offset magnitude is zero, and said sequence is an intermediate type when said offset magnitude is non-zero.

3. A machine tool system according to claim 2 wherein said means for storing said ordered succession of sequences comprises:

an operator controlled means selectively operative to generate and store a set of n consecutive repeat sequences in said succession corresponding to a set of n consecutive and previously stored in sequences of said succession, each intermediate type sequence of said repeat sequences having selected offset data associated therewith, said selected offset data differing from the offset data associated with the corresponding previously stored sequence.

4. A machine tool system according to claim 3 wherein said selected offset data for each intermediate type sequence of said repeat sequences characterizes a selected magnitude for the associated offset path which differs by a selected increment from that for said corresponding sequence, said direction for offset being the same as that for said corresponding sequence.

5. A machine tool system according to claim 3 wherein said selected offset data for each intermediate type sequence of said repeat sequences characterizes a selected identical magnitude for the associated offset path which differs from that for said corresponding sequence, said direction for offset being the same as that for said corresponding sequence.

6. A machine tool system according to claim 1 wherein said line segment extending from the current coordinates of said cutting element to said final point is co-linear with said current sequence offset path when said current sequence is an intermediate type and the current coordinates of said cutting element are the same as the final point associated with the next previous sequence.

7. A machine tool system according to claim 6 wherein said path data determines said path type to be straight line.

8. A machine tool system according to claim 6 wherein said path data selectively determines said path type to be straight line or circular, said path data specifying a center point and radius when representative of a circular path type.

9. A machine tool system according to claim 1 wherein said cutting element is adapted for rotation, said cutting element having a cutting surface substantially symmetrically disposed about the cutting element rotational axis, and wherein said control means is selectively operable to move said cutting element with respect to the spatial points associated with said ordered succession data sequences, whereby for ones of said spatial points lying in a plane perpendicular to said rotational axis said cutting surface has a point in common with a contact point path approximating a desired path defined by a succession of line segments connecting adjacent ones of said co-planar spatial points, said contact point path being substantially coincident with said desired path for locally convex portions of said desired path, said control means being responsive to a succession of four of said data sequences associated with three successive points ($A_1$, $A_2$ and $A_3$, respectively) of said co-planar spatial points which defines a locally convex portion of said desired path, said four data sequences including coordinate data representative of spatial points $A_1$, $A_2$, $A_2$ and $A_3$, respectively, offset data representative of the radius R of said cutting surface and a predetermined offset direction, path data defining a circular path for the third of said four data sequences, said circular path having center point $A_2$ and a zero radius, and path data for said first, second and fourth of said four data sequences defining either straight line or circular paths, to successively:

i. in response to selection of the first of said four data sequences as said current sequence, position said cutting element to have its axis at a point $I_1$, point $I_1$ lying on a first offset path, said first offset path being parallel to, and offset in said predetermined direction by R, from a first predetermined path connecting points $A_1$ and $A_2$, said first predetermined path being defined by the spatial points associated with the first and second of said four data sequences, ii. in response to selection of the second of said four data sequences as said current sequence, move said cutting element so that its axis moves from $I_1$ along said first offset path to a point $I_2$, point $I_2$ being offset from point $A_2$ by R in said predetermined direction and lying along a second straight line extending from point $A_2$, said second straight line being perpendicular to said first predetermined path at point $A_2$, iii. in response to selection of the third of said four data sequences as said current sequence, move said cutting element so that its axis moves along a circular path having radius R and extending from point $I_2$ to point $I_3$, point $I_3$ being offset from point $A_2$ by R in said predetermined direction and lying along a third straight line extending from point $A_2$, said third straight line being perpendicular to a second predetermined path connecting points $A_2$ and $A_3$ at point $A_2$, said second predetermined path being defined by the spatial points associated with the second and fourth of said four data sequences, iv. in response to selection of the fourth of said four data sequences as said current sequence, move said cutting element so that its axis moves from point $I_3$ along a second offset path parallel to and offset by R in said predetermined direction from said second predetermined path.

10. A machine tool system according to claim 1 wherein said means for storing said ordered succession of sequences comprises:
an operator controlled means selectively operative to generate and store a set of n consecutive repeat sequences in said succession corresponding to a set of n consecutive and previously stored in sequences of said succession,
each intermediate type sequence of said repeat sequences having selected offset data associated therewith, said selected offset data differing from the offset data associated with the corresponding previously stored sequence.

11. A machine tool system according to claim 10 wherein said selected offset data for each intermediate type sequence of said repeat sequences characterizes a selected magnitude for the associated offset path which differs by a selected increment from that for said corresponding sequence, said direction for offset being the same as that for said corresponding sequence.

12. A machine tool system according to claim 10 wherein said selected offset data for each intermediate type sequence of said repeat sequences characterizes a selected identical magnitude for the associated offset path which differs from that for said corresponding sequence, said direction for offset being the same as that for said corresponding sequence.

13. A machine tool system comprising a workpiece positioning table and a rotating cutting element, said cutting element having a cutting surface substantially symmetrically disposed about the cutting element rotational axis, and further comprising a control means for controlling translational motion of said cutting element with respect to said workpiece table in a plane perpendicular to said rotational axis, said control means including:
selectively operable means to move said cutting element with respect to an ordered succession of spatial points in said plane, whereby said cutting surface has a point in common with a contact point path approximating a desired path defined by a succession of line segments connecting adjacent ones of said succession of spatial points, said contact point path being substantially coincident with said desired path for locally convex portions of said desired path, said selectively operable means including:
means responsive to a succession of four data sequences associated with three successive points ($A_1$, $A_2$ and $A_3$, respectively) of said succession of ordered spatial points which define a locally convex portion of said desired path to successively:
i. in response to the first of said four data sequences, position said cutting element to have its axis at a point $I_1$, point $I_1$ lying in a first offset path, said first offset path being parallel to, and offset in a predetermined direction by the radius R of said cutting surface, from a first predetermined path connecting points $A_1$ and $A_2$, said first predetermined path being defined by the spatial points associated with the first and second of said four data sequences,
ii. in response to the second of said four data sequences, move said cutting element so that its axis moves from $I_1$ along said first offset path to a point $I_2$, point $I_2$ being offset from point $A_2$ by R in said predetermined direction and lying along a second straight line extending from point $A_2$, said second straight line being perpendicular to said first predetermined path at point $A_2$, iii. in response to the third of said four data sequences, move said cutting element so that its axis moves along a circular path having radius R and extending from point $I_2$ to point $I_3$, point $I_3$ being offset from point $A_2$ by R in said predetermined direction and lying along a third straight line extending from point $A_2$, said third straight line being perpendicular to a second predetermined path connecting points $A_2$ and $A_3$ at point $A_2$, said second predetermined path being defined by the spatial points associated with the second and fourth of said four data sequences, iv. in response to the fourth of said four data sequences, move said cutting element so that its axis moves from point $I_3$ along an offset path parallel to and offset by R in said predetermined direction from said second predetermined path, wherein said control means further comprises:
selectively operable means to move said cutting element with respect to an ordered succession of spatial points in said plane, whereby said cutting surface has a point in common with a contact point path approximating a desired path defined by a succession of line segments connecting adjacent ones of said succession of spatial points, said contact point path being substantially coincident with said desired path for locally convex portions of said desired path, said selectively operable means including:

means responsive to a succession of three data sequences associated with three successive points ($A_{11}$, $A_{22}$ and $A_{33}$, respectively) of said succession of ordered spatial points which define a locally convex portion of said desired path to successively:

i. in response to the first of said three data sequences, position said cutting element to have its axis at a point $I_{11}$, point $I_{11}$ lying in a first offset path, said first offset path being parallel to, and offset in a predetermined direction by the radius R of said cutting surface, from a first predetermined path connecting points $A_{11}$ and $A_{22}$, said first predetermined path being defined by the spatial points associated with the first and second of said three data sequences, ii. in response to the second of said three data sequences, move said cutting element so that its axis moves from $I_{11}$ along said first offset path to a point $I'_{22}$, point $I'_{22}$ being defined by the intersection of said first offset path and a second offset path, said second offset path being parallel to and offset by R in said predetermined direction from a second predetermined path connecting points $A_{22}$ and $A_{33}$, said second predetermined path being defined by the spatial points associated with the second and third of said three data sequences, iii. in response to the third of said three data sequences, move said cutting element so that its axis moves from point $I'_{22}$ along said second offset path parallel to and offset by R in said predetermined direction from said second predetermined path.

14. A machine tool system comprising a cutting element and workpiece positioning table, and control means for controlling the position of said cutting element with respect to said positioning table, said control means comprising:

A. means for storing an ordered succession of data sequences, each sequence being associated with a spatial point, and said succession including at least one contiguous group of sequences having data representative of a path offset from a reference path connecting adjacent ones of a succession of said spatial points, each of said spatial points being associated with a sequence in said group, said reference path defining a closed shape when the first and last spatial points in said succession are identical, and defining an open shape otherwise, B. means for selecting one of said succession of sequences as a current sequence, C. path determining means responsive to said selected sequence, said path determining means including means for determining a tool path to be followed by said cutting element for a current sequence
said tool path extending from the current coordinates of said cutting element to the point of intersection of the offset paths associated with the reference paths connecting the spatial point associated with said current sequence,
when the spatial point of said current sequence corresponds to the first and last spatial points associated with one of said groups representing a closed shape, or
when the spatial point of said current sequence corresponds to one of the intermediate spatial points associated with one of said groups,
said tool path extending from the current coordinates of said cutting element to the point of intersection of the offset path associated with the reference path connecting the spatial point associated with said current sequence and a line segment perpendicular to said reference path and passing through said spatial point,
when the spatial point of said current sequence corresponds to the first or last spatial point associated with one of said groups representing an open shape, D. drive means responsive to said path determining means for a current sequence to control the relative motion of said cutting element along said determined tool path.

* * * * *